United States Patent [19]

Matsuo et al.

[11] Patent Number: 5,731,116

[45] Date of Patent: Mar. 24, 1998

[54] ELECTROSTATIC INFORMATION RECORDING MEDIUM AND ELECTROSTATIC INFORMATION RECORDING AND REPRODUCING METHOD

[75] Inventors: Makoto Matsuo; Minoru Utsumi; Masayuki Iijima; Yukio Taniguchi; Hiroyuki Obata; Seiji Take, all of Tokyo, Japan

[73] Assignee: Dai Nippon Printing Co., Ltd., Tokyo, Japan

[21] Appl. No.: 451,158

[22] Filed: May 26, 1995

Related U.S. Application Data

[60] Division of Ser. No. 616,445, Nov. 20, 1990, Pat. No. 5,439,768, which is a continuation-in-part of Ser. No. 353,084, May 17, 1989, abandoned.

[30] Foreign Application Priority Data

Mar. 8, 1990 [JP] Japan ..................... 2-57351

[51] Int. Cl.[6] .................................. G03G 15/00
[52] U.S. Cl. ................. 430/56; 430/48; 430/60; 430/66
[58] Field of Search ................. 430/56, 45, 46, 430/48, 60, 66; 355/77, 217, 218

[56] References Cited

U.S. PATENT DOCUMENTS

| | | |
|---|---|---|
| 4,410,614 | 10/1983 | Lelental et al. |
| 4,628,017 | 12/1986 | Tagoku |
| 4,769,303 | 9/1988 | Ueno et al. |
| 4,965,152 | 10/1990 | Keys et al. |
| 5,161,233 | 11/1992 | Matsuo et al. .......... 430/48 |

*Primary Examiner*—S. Rosasco
*Attorney, Agent, or Firm*—Armstrong, Westerman, Hattoir, McLeland & Naughton

[57] ABSTRACT

The present invention relates to an electrostatic information recording medium in which a charge retaining layer having high insulating properties is laminated on an electrode, and an electrostatic information recording/reproducing process wherein, while said electrostatic information recording medium is positioned in opposition to a photosensitive member on which a photoconductive layer is laminated, the recording medium is subjected to information exposure with the application of voltage between both electrodes to accumulate electrostatic charges thereon depending upon the dosage of said information exposure, and the electrostatic information thus accumulated is reproduced by potential reading.

The present electrostatic information recording medium has an information density as expressed in terms of a high recording capacity of the order of $8 \times 10^8$ bits/cm$^2$, and makes it possible to process information in a planar state so that analog or digital information such as characters, line pictures, images, (0·1) information and sounds can be accumulated in the form of electrostatic charges. With the present electrostatic information recording medium, it is possible to obtain information of high quality and resolving power because of the information being accumulatable in electrostatic charge units. Due to its high charge retainability, it is further possible to store information permanently. Still further, it is possible to make inexpensive and simple recording/ reproducing systems, since information can be output by reading local potentials of electrostatic latent images at any time and any scanning density.

37 Claims, 42 Drawing Sheets

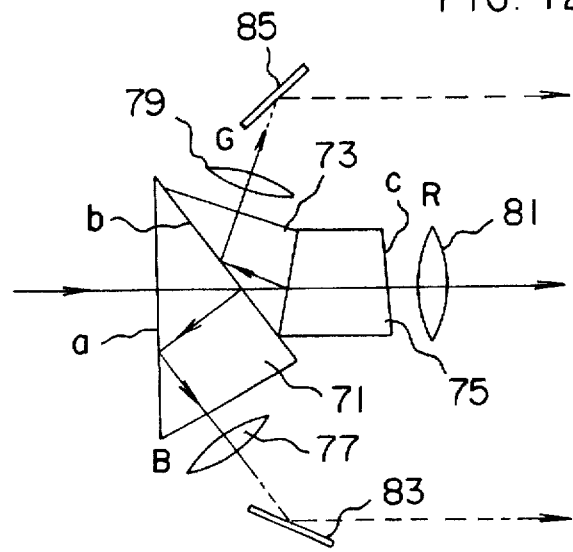
FIG. 12(a)
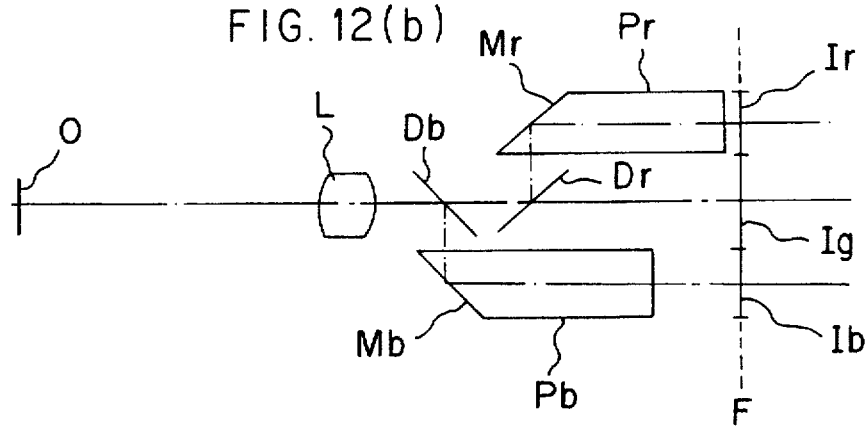
FIG. 12(b)
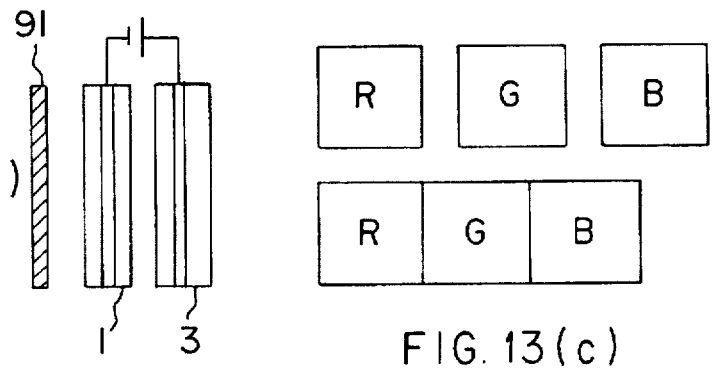
FIG. 13(a)
FIG. 13(b)
FIG. 13(c)

FIG. 21
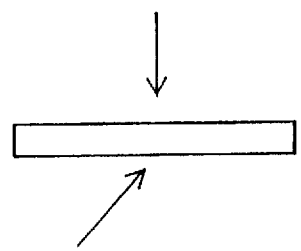
FIG. 22
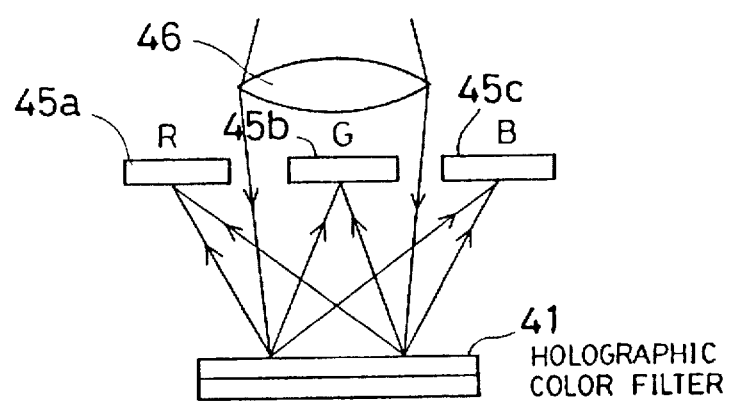
FIG.23(a)   FIG.23(b)   FIG.23(c)
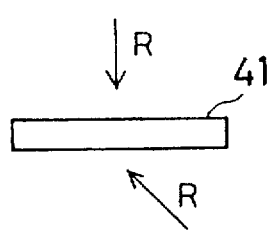 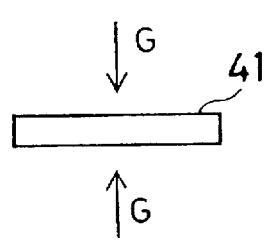 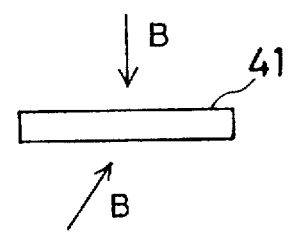
FIG.24(a)   FIG.24(b)   FIG.24(c)
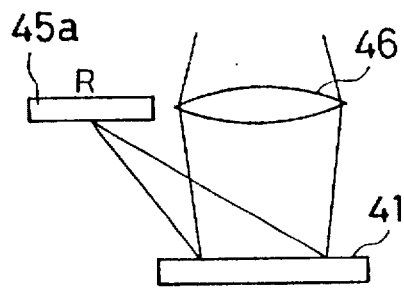 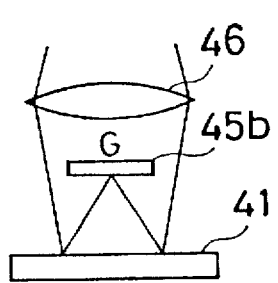 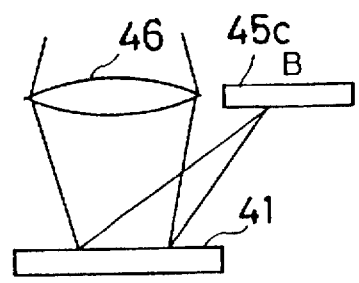

FIG. 28
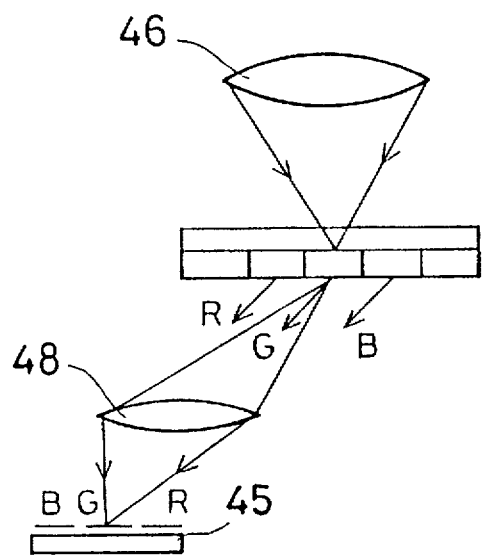
FIG. 29
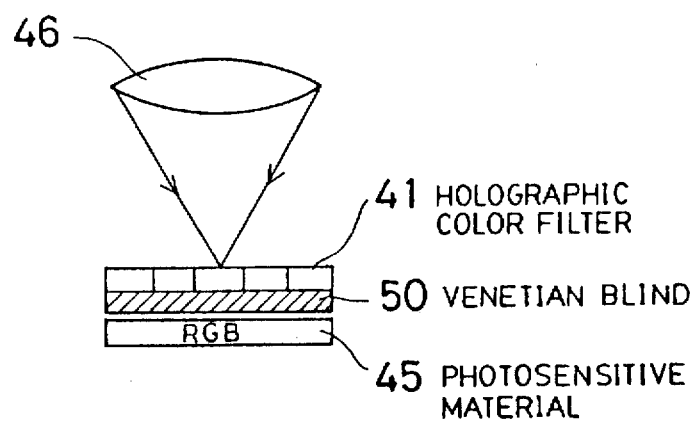
FIG.30(a)     FIG.30(b)     FIG.30(c)
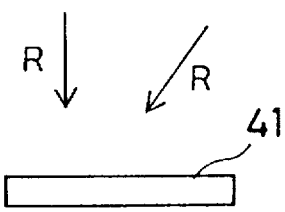 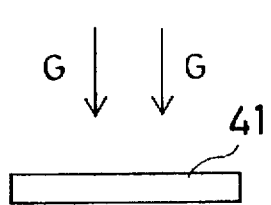 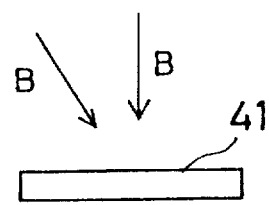

ELECTROSTATIC INFORMATION RECORDING MEDIUM AND ELECTROSTATIC INFORMATION RECORDING AND REPRODUCING METHOD

This is a divisional of application Ser. No. 07/616,445, now U.S. Pat. No. 5,439,768 filed Nov. 20, 1990, which was a continuation-in-part of Ser. No. 07/353,084 filed on May 17, 1989, now abandoned.

BACKGROUND OF THE INVENTION

The present invention relates to an electrostatic information recording medium and an electrostatic information recording and reproducing method, by which the information can be electrostatically recorded and reproduced at any desired time.

Conventionally, silver salt photographing method is already known as a technique for high sensitivity photographing. In this photographing method, the photographed image is recorded on film through the development process, and silver salt emulsion (such as photographic paper) is used for reproducing the image or it is reproduced on cathode ray tube (CRT) by optically scanning the developed film.

There is also an electronic photographing technique, in which an electrode is deposited on photoconductive layer by evaporation and the surface of photoconductive layer is electrically charged by corona charging in dark place. Then, it is exposed to intensive light to make the exposed photoconductive layer electrically conductive. By removing the electric charge on that portion by leaking it to form electrostatic latent image on the surface of the photoconductive layer, and the toner is attached, which has electric charge with the polarity opposite to that of the remaining electrostatic charge. This technique is mostly used for duplication purpose and is not generally suitable for photographing because of low sensitivity. Since electrostatic charge retaining time is short, toner development is usually performed after electrostatic latent image is formed.

Further, there is the method for TV photographing technique, in which photographing is performed by the image pickup tube and the image information obtained by optical semiconductor are taken out as electric signal. This is directly outputted on CRT or is recorded on video by magnetic recording and the image is reproduced on CRT when desired.

Also, a method is known, in which thermoplastic materials having electric charge carrying property are laminated on transparent electrode and selenium particles are deposited by vacuum evaporation on the surface of the thermoplastic material and is infiltrate to prepare the recording medium. To record the information on this recording medium, the surface of the thermoplastic material is electrically charged by corona charging, and the image is exposed to light by applying voltage between the electrodes disposed at face-to-face positions. Thus, optical carrier is generated on the photoconductive particles in the exposure portion to form the latent image. For the development, the thermoplastic material is softened by heating, and only the photoconductive particles generating optical carrier are migrated in the thermoplastic material layer. The information thus developed are reproduced as visible information according to the quantity of transmission light. (U.S. Pat. Nos. 3,520,681, 4,101,321 and 4,496,642).

Silver salt photographing method is an excellent means to preserve the image of the object, but it requires a development process to form the silver salt image and also the complicated optical, electrical and chemical processings are involved in reproducing the image to hard copy and soft copy (CRT output), etc.

The electronic photographing technique is more simple and quick than the silver salt photographing method in reproducing the electrostatic latent image, whereas the latent image can be preserved only for short period, and the dissociation of the development, image quality, etc. are inferior to those of silver salt method.

TV photographing technique requires linear sequential scanning to take out and record the electric image signals obtained by the pickup tube. Linear sequential scanning is performed by electron beam in the pickup tube and by magnetic head in video recording. Since resolution depends upon the number of scanning lines, it is extremely inferior to the planar analog recording such as silver salt photographing.

The recently developed TV image pickup technique using solid-state image sensor (such as CCD) is also essentially the same with regard to the resolution.

The problems involved in these techniques lie in the fact that the processing becomes more complicated if higher quality and resolution are required in the image recording and the memory function is lacking or image quality is basically poor if the processing is simplified.

There is another technique, in which thermoplastic material layer containing selenium particle layer is provided on the transparent electrode and it is electrically charged by corona charging. After the image is exposed, thermoplastic material is softened and the image is heat-developed, and the information are reproduced as visible information. In this case, the electric charge information thus accumulated can be preserved for long period (10 years or more), whereas the application is limited as information recording means by camera because corona charging is needed for information recording. Also, on the surface of thermoplastic resin softened during heat development, the so-called frost phenomenon occurs, in which fine irregularities are caused by the repulsion between the surface electric charge, when it is electrically charged to higher potential. As the result, when the accumulated information are detected as surface potential, noise occurs and the resolution is adversely affected.

SUMMARY OF THE INVENTION

The present invention is to solve the problems as described above, and it is to offer a new electrostatic information recording medium and an electrostatic information recording and reproducing method, which can produce the image of high quality at high resolution and the processing is simple and easy, whereby the recording can be achieved for long time and the characters, line drawings, images, codes and (1, 0) information can be reproduced arbitrarily in appropriate quality.

Therefore, the first object of this invention is to provide an electrostatic information recording medium having excellent charge retainign property.

The second object of the present invention is to provide a photosensitive member to be used for the electrostatic information recording and reproducing method, by which it is possible to use high-speed shutter, to discharge sufficiently even with slight incident optical image, to produce electrostatic latent image and to reproduce color image.

Further, the third object of this invention is to offer an electrostatic information recording and reproducing method to reproduce the information accumulated on the electrostatic information recording medium as the electrostatic information.

The fourth object of this invention is to provide an electrostatic information recording medium, by which audio information can be recorded together with the characters, line drawings, codes and (1, 0) information.

The fifth object of the invention is to offer an electrostatic recording card of high quality and high resolution using the electrostatic information recording medium.

To meet the first object, the invention offers 7 types of electrostatic information recording medium as described below.

The first electrostatic information recording medium is characterized in that the electric charge retaining layer with high insulating property is laminated on the electrode.

This electric charge retaining layer consists of macromolecular material with insulating property and is characterized in that the glass transition temperature of said macromolecular material is higher than the environmental temperature and/or the water absorption ratio of said macromolecular material is 0.4 weight % or less.

The electric charge retaining layer must have the thickness of at least 0.1 μm or more from the viewpoint of the insulating property and it is preferably 100 μm or less from the viewpoint of flexibility.

The electric charge retaining layer of the electrostatic information recording medium must be composed of macromolecular material with high insulating property in order to suppress the migration of electric charge, and it must have specific resistance of $10^{12}$ Ω·cm or more. Also, it is necessary the glass transition temperature of macromolecular material constituting the electric charge retaining layer should be higher than the environmental temperature. The glass transition temperature is the temperature, at which the gradient of the decrease of specific volume when the molten macromolecular materials is cooled down shows discontinuous change. In general, macromolecular material has the glass transition temperature peculiar to its material property. Below the glass transition temperature, one segment of molecular chain cannot migrate as a whole because heat energy is too low. On the other hand, if it is above the glass transition temperature, heat energy is increased and several or more atoms constituting the molecular chain can migrate, thus giving strong influence on specific heat, specific volume, toughness, brittleness temperature, etc.

Based on the innovative concept different from the conventional mode of thinking, the present inventors have found that, in using the insulating material as the electrostatic information recording medium, it is necessary to use it at less than the glass transition temperature to suit the property of macromolecular materials constituting it.

In order to prevent the leakage of the information electric charge, which is accumulated as macromolecular materials constituting the electric charge retaining layer, it is essential that water absorption ratio of macromolecular material is low. If water absorption ratio is higher than 0.4 weight %, the resistivity is decreased by the influence of moisture content adsorbed in the resin and this leads to poor insulation. We also found that the electric charge retaining property is lowered by the diffusion of electric charge toward the directions of volume and surface area.

The second electrostatic information recording medium is characterized in that its electric charge retaining layer consists of mono layer or built-up layers with insulating property.

The mono layer as used in the present invention must have specific resistance of $10^{12}$ Ω·cm or more, and it is laminated on the electrode by the well-known Langmuir-Blodgett's technique. The molecules in mono layer are arranged in such manner that molecular chains are regularly disposed perpendicular to the electrode surface. Accordingly, the accumulated electric charge does not permeate to the direction of electrode plane, and it is maintained in stable condition. In addition, the film is very thin and of sufficient strength suitable for the use as an electrostatic information recording medium.

The third electrostatic information recording medium is characterized in that the electric charge retaining layer consists of light electret or thermal electret.

With the electric charge retaining layer consisting of electret material, electric charge can be distributed and polarized by exposure to light under voltage application, and this contributes to the permanent preservation of electrostatic information.

The fourth electrostatic information recording medium has the charge retaining layer which may be the combination of the charge retainability-reinforced layer and the thick insulating layer without electric charge injection. It may be built up in such manner that an charge retainability-reinforced layer is first formed on the electrode, and the thick insulating layer without electric charge injection is then formed, or that thick insulating layer without electric charge injection is first formed on the electrode, and then, the charge retainability-reinforced layer is formed.

This charge retainability-reinforced layer is characterized in that it consists of inorganic insulating film, organic macromolecular insulating film, mono layer with organic insulating property or built-in layers, that its film thickness is within the range of 10–1000 Å, and that the thickness of the insulating layer without electric charge injection is 100 Å or more.

By adjusting the material quality and film thickness of the charge retainability-reinforced layer so that electric charge is migrated under high electric field, the information electric charge is migrated toward the boundary surface with the insulating layer and it is preserved in stable condition in the insulating layer without electric charge injection.

Further, the fifth electrostatic information recording medium is characterized in that its charge retaining layer consists of an insulating resin layer containing conductive or photoconductive particles and electric charge is accumulated at said particles.

The photoconductive or electrically conductive particles are present at the vicinity of the surface of the electric charge retaining layer as single particle layers or multiple particle layers, or the photoconductive or electrically conductive particles are dispersed in the insulating resin layer and are laminated on the insulating resin layer on the electrode. Or, the photoconductive or electrically conductive particles are dispersed in the insulating resin layer and are laminated on the electrode, and the information electric charge can be maintained in stable condition in the insulating resin layer.

The sixth electrostatic information recording medium is characterized in that its electric charge retaining layer consists of photoconductive particles or electrically conductive particles laminated in single layers or multiple layers, that the electric charge transport layers having the function primarily to transport a part of electric charge are sequentially laminated on said particle layer and it is laminated on the electrode from the side of insulating layer.

When the particle layer in this sixth electric charge retaining layer consists of photoconductive particles, the information electric charge with reverse polarity to transport carrier of the electric charge transport layer is first formed on the surface, and the light with the wavelength to absorb the photoconductive particles is uniformly irradiated. Then, both positive and negative carriers are generated on the particle layer of the portion with the information electric charge, and the carrier with reverse polarity to that of the information electric charge accumulated on the surface moves the electric charge transport layer and neutralizes the surface potential, and the electric charge with the same polarity as that of the surface electric charge is accumulated at the photoconductive particles as the information electric charge. Also, the electric charge transport layer does not transport the electric charge accumulated on the particle layer, and the electric charge once accumulated will be permanently preserved.

When the particle layer consists of the electrically conductive particles, the electric charge on the surface of the electric charge transport layer accumulated as described above is migrated toward the electric charge transport layer without uniform exposure and is accumulated at the conductive particle layer and is preserved permanently on the conductive particle layer as the information electric charge. The information electric charge thus accumulated is extremely stabilized because it is accumulated within the insulating layer.

The seventh electrostatic information recording medium is characterized in that its electric charge retaining layer is laminated so that the photoconductive layer is detachably laminated on the insulating layer, or the photoconductive layer remains laminated by etching the photoconductive layer and by forming for each picture element. Or, the photoconductive layer consists of the material with the orientation to the direction of film thickness, or it consists of the photoconductive particle dispersion layer.

This electrostatic information recording medium is formed by disposing the insulating layer and the photoconductive layer sequentially on the electrode baseplate, whereas, unlike the information recording method to the first–sixth electrostatic information recording media as described above, it is disposed at face-to-face position to the transparent electrode instead of photosensitive member.

When information light is entered from the side of transparent electrode with voltage applied between both electrodes, carrier is migrated toward the electrode of electrostatic information recording medium in the photoconductive layer, on which the information light is irradiated, and the information electric charge is accumulated on the insulating layer. Although the photoconductive material constituting the photoconductive layer has generally the insulating property, its electric charge retaining property is low. Thus, the electric charge accumulated in the photoconductive layer is migrated in the photoconductive layer as time elapses. As the result, the phenomenon such as bleeding occurs on the image when it is reproduced. The bleeding of the accumulated information electric charge can be prevented by detaching the photoconductive layer in the electrostatic information recording medium from the insulating layer at the stage when the information electric charge is accumulated in the electric charge retaining layer. Also, bleeding can be prevented by performing etching on the photonductive layer for each picture element. Accordingly, the migration of electric charge in the photoconductive layer can be prevented and the bleeding of the reproduced information can be avoided eitehr by forming the photoconductive layer with the photoconductive material having the orientation toward the direction of film thickness or by forming the photoconductive particles by the photoconductive particle dispersion material with dispersed binder.

Next, description is given on the electrostatic information recording and reproducing method according to the present invention. In the electrostatic information recording apparatus, the photosensitive member consisting of photoconductive layer with electrode and the electrostatic information recording medium consisting of electric charge retaining layer mounted on the electrode are provided in such manner that the surface of photoconductive layer in the photosensitive member and the surface of the electric charge retaining layer in the electrostatic information recording medium are disposed at face-to-face position. This photosensitive member and the electrostatic information retaining medium may be brought into direct contact or they may be disposed through a spacer on non-contact basis.

The photosensitive member to be used for the electrostatic information recording and reproducing method based on this invention is characterized in that an electrode is provided on the support member and the photoconductive layer is laminated on said electrode.

When the information light enters from the side of photosensitive member, it is better to have transparent support member and transparent electrode. Or, light reflection preventive film may be laminated on the opposing surface where the electrode is furnished.

It is preferable that the discharge reinforced layer is laminated on the photoconductive layer in the photosensitive member.

The photosensitive member is disposed at face-to-face position to the electrostatic information recording medium, and it is used for the electrostatic information recording and reproducing method with the incoming information light and under voltage application between both electrodes. It is provided with the function to discharge the electric charge corresponding to the information light to the electrostatic information recording medium and to accumulate it by electric charge injection. It does not have the electrostatic charge retaining property by itself.

Therefore, it is preferable that the photosensitive member has the property to discharge at high sensitivity corresponding to the information light or to inject the electric charge. For example, when the discharge reinforced layer is furnished on the photoconductive layer of the photosensitive member, electrostatic latent image is formed at low voltage and the effective external voltage can be reduced. This makes it possible to use the shutter at high speed. Even with weak incident light, the information electric charge is accumulated on the insulating layer, and the responsiveness to light is also increased. Accordingly, it is possible to record the electrostatic image on the electrostatic information recording medium at high sensitivity.

Further, a screen unit may be disposed in the optical path on a part of the photosensitive member, or a photoconductive layer cutaway portion may be formed on a part of the electrode and the electrode may be exposed to said cutaway portion of the photoconductive layer. Or, a screen unit may be furnished on a part of electrode, and the cutaway portion of the photoconductive layer may be formed on a part of said electrode. Or, the electrode may be exposed at the cutaway portion of said photoconductive layer.

In the information light exposure and reproduction in the electrostatic information recording and reproducing method, the darkest value, i.e. fogging electric charge, can be determined and the exposure value can be adjusted by the electric charge formed on the corresponding electric charge retaining layer when the screen unit is formed. Also, by forming a cutaway portion of photoconductive layer in the photosensitive member and by disposing the electrode surface of the photosensitive member directly to the electric charge retaining layer, the lightest value can be recorded on the corresponding electric charge retaining layer. Thus, it is possible to adjust the amplification ratio in the information reproduction and/or to use it as reference to the stability of the information potential accumulated on the electrostatic information recording medium as time elapses.

Also, it is possible to dispose a color filter on the support member of the photosensitive member or on the reflection preventive film. The color filter may be a dyeing type color filter, a pigment type color filter, an inorganic interference type color filter, or a holographic color filter recording interference fringes of 3 primaries, and it can be arranged as stripe type, plane division type, mosaic type, etc. The color filter may be disposed separately from the support member or it may be piled up on the support member.

Next, the recording method to the electrostatic information recording medium according to the invention will be described.

The recording method is characterized in that the information light exposure is performed from the side of photosensitive member or electrostatic information recording medium under voltage application between two electrodes.

There are the other methods such as the method to record using an electrode needle head or an ion flow head or the method to accumulate the information electric charge directly on the electrostatic information recording medium using optical printer such as laser printer, but the preferable method is the electrostatic information recording method using the photosensitive member. In this case, electrostatic information can be recorded by disposing the surface of the electrostatic information recording medium at face-to-face position to the surface of the photoconductive layer of the photosensitive member on contact or non-contact basis.

In the fifth and sixth electrostatic information recording medium of this invention when photoconductive particles are contained, uniform exposure is performed on the electrostatic information recording medium by the light with the wavelength to absorb the photoconductive particles after pattern exposure. Thus, it is possible to maintain the electrostatic information at the particles and to keep the information in stable condition.

The electrostatic information recording method on the seventh electrostatic recording medium is performed by using transparent electrode as photosensitive member.

On this seventh electrostatic information recording medium, voltage is applied between transparent electrode and the electrode layer of the electrostatic information recording medium with the medium and the transparent electrode placed at face-to-face position, and information exposure is performed. In this case, on the portion exposed to light of the photoconductive layer on the surface of the electrostatic information recording medium, photo carriers are generated in the photoconductive layer, and resistance is decreased. The voltage distributed to the photoconductive layer is redistributed to the air gap and to the insulating layer (electric charge retaining layer). As the result, discharge occurs at the air gap according to Paschen's law, and the electric charge in form of the image corresponding to the exposure intensity is accumulated on the surface between the insulating layer (electric charge retaining layer) and the photoconductive layer. In this case, if the photoconductive layer is continuous, i.e. it is continuous in lateral direction, the electric charge in form of the image is diffused through the photoconductive layer, and electric charge image is disturbed. This is because insulating property is still too low to retain electric charge for long period although the photoconductive layer has insulating property in dark place. To avoid this, it may be necessary to detach the photoconductive layer, which causes the diffusion of electric charge after the image-like electric charge is recorded, or to eliminate the lateral continuation of the photoconductive layer in advance.

For this purpose, it is preferable that etching is performed at least on the photoconductive layer on each independent unit in order to eliminate the continuation in lateral direction. As the result, the electric charge accumulated on the insulating layer (electric charge retaining layer) can retain the image-like electric charge under the condition that one independant unit is turned to one pixel although diffusion occurs within each independent unit. When the material having electric charge retaining property as described in the present specification is used as the insulating layer (electric charge retaining layer), the image-like electric charge is retained for long period, and it can be read at any time as potential.

In the following, description is given on the electrostatic information recording and reproducing method according to the present invention.

This invention is characterized in that the information recorded by electrostatic information recording method is reproduced and outputted as the electrostatic charge information.

In reproducing the recording, the potential difference from surface potential at the electrode and electrostatic information recording medium can be easily determined. For example, the generated potential can be detected by electric charge induced on the detection electrode.

A guard electrode may be furnished around the detection electrode, or an insulating film may be provided on the surfaces of the detection electrode and the guard electrode.

Another method may be used, in which the detection electrode is a long thin rod type electrode and the distribution of the potential is determined by CT technique over the surface of the electrostatic information recording medium.

There is a further method, in which the detection electrode is disposed on the electrostatic information recording medium on contact or non-contact basis and the accumulated electric charge is detected by potential or current value.

Or, the potential of electric charge may be read by the method, in which the electrostatic information recording medium is processed by toner development, the light beam is irradiated, and the reflected light is converted photoelectrically.

In the electrostatic information recording and reproducing method based on this invention, the electrostatic information is converted to position information of the particles in the insulating layer and is recorded, and a mixed layer consisting of the thermoplastic insulating resin material and of the electric charge transport material to transport a part of electric charge is laminated, and the photoconductive particle layer is disposed near the surface of this mixed layer in single or multiple layers.

In this case, the particles are migrated to the interior of the insulating layer in accordance with the electric field strength by the accumulated electrostatic information, and the electrostatic information can be converted to the position information and recorded. When this electrostatic information recording medium is used in the electrostatic information recording and reproducing method of this invention, the potential generated on the surface of electric charge retaining layer at the information recording is about 200 V. The frost phenomenon occurs only slightly on the surface of the insulating layer softened at thermal development. When the information is reproduced as electric charge potential, the influence to the resolution by the irregularities of the surface can be avoided, and the reproduction at high resolution can be achieved.

In the electrostatic information recording medium of the invention as described above, the protective film may be arranged to increase the electric charge retaining property.

The protective film may be the insulating plastic film or the film produced by coating of the insulating plastic solution, or the film produced by the melting transfer of the insulating melting plastics.

The electric charge recorded on the electrostatic information recording medium of this invention is gradually attenuated by moisture in the air or the like. Or, it may be destroyed by the damage from outside. To prevent this, the surface of the electric charge retaining layer is covered by the insulating coating to preserve the electrostatic information on the electrostatic information recording medium for long period.

In case no protective layer is furnished, electric charge is reduced or disappears if the surface of the electric charge retaining layer is brought into physical contact with the conductive material, whereas, if protective layer is provided, the surface potential is not reduced even when the conductive material is brought into contact. When electrostatic charge is generated on the surface of protective film by friction, it can cleaned away easily with the conductive substance such as water, and the electric charge can be protected. In reproducing the information, the protective film may be detached and the information electric charge accumulated on the electric charge retaining layer may be reproduced, or it can be reproduced through the protective film.

As described above, the electrostatic information recording medium of this invention can accumulate the analog information such as characters, line drawings, images, (0, 1) information, etc. or digital information by making it an electric charge carrying layer with high charge carrying property. Thus, the information can be permanently preserved. The information of high quality and high resolution can be accumulated because the information is accumulated in electrostatic electric charge, and it can be preserved for long period as electrostatic latent image.

The information memory capacity in the electrostatic information recording medium of this invention is: 175 lines/in., 2R (4 picture elements/mesh point), i.e. 350 picture elements/in.=14 dots/mm. Under the condition of A4 size, it is: 297 mm×14 dots/in.×210 mm×14 dots/in.×4 colors. The information quantity in the publication in A4 size is 50 MB, while the information quantity in 1 cm² of the electrostatic information recording medium of this invention is 1 μm×1 μm. If one picture elements has 256 gradations (The information quantity of one picture element=1B) (analog recording), it is 1000 picture elements×1000 picture elements with the information density of 1 MB/mm². Accordingly, for 1 cm² of the electrostatic information recording medium, it is possible to enter the information as much as a color publication with 175 lines in A3 size. Compared with the information density of $3 \times 10^3$ bit/cm² of a 8-inch 1 MB floppy disk, $10^6$ bits/cm² of a high density floppy disk, $7.5 \times 10^6$ bits/cm² of a digital audio tape (DAT) and $2 \times 10^8$ bits/cm² of an optico-magnetic disk, the information density of the electrostatic information recording medium of this invention is as high as $8 \times 10^8$ bits/cm².

Because the accumulated information cna be obtained at any scanning density by reading and outputting the local potential of the electrostatic latent image at any desired time, the image of high image quality can be obtained in exactly the same way as in the silver salt photographing and in reproducing it by optical scanning. Since physical or chemical means such as the development means is not required for the direct potential detection, inexpensive and convenient recording and reproducing system can be actualized.

In the electrostatic information recording medium of this invention, audio information can also be recorded at the same time.

A part of the information recording region of the electrostatic information recording medium is allocated for audio information recording, and audio information may be recorded. In the electrostatic information recording method of the invention, voice and sound can be converted to optical information and recorded, and this audio information recording region is disposed on the periphery of the electrostatic information recording medium. Accordingly, the electrostatic information recording medium is provided with audio information recording region in addition to the information recording region for characters, line drawings, images, codes and (1, 0) information.

Also, the electrostatic information recording medium according to the present invention can be formed as an electrostatic information recording card by laminating it on the card base material such as the prepaid card, credit card, etc. In this case, the surface of the electric charge retaining layer is exposed and embedded in the card base material or laminated by attaching on the card base material.

In laminating it on the card base material, it may be laminated on the electrostatic information recording medium with or without the recorded information, or the recording form of information may be electric charge or the toner by toner development. To record the information after it is formed in the form of a card, a part of the electrode of the electrostatic information recording medium is to be exposed from appropriate point of the card base material and to connect it with the electrode of the photosensitive member. This makes it possible to record the information not only in case the medium with the recorded information is turned to the card form but also in case the electrostatic recording medium without the recorded information is turned to the card form and the information can be recorded on it. In this case, protective film may be detachably laminated on the electric charge retaining layer, or the protective film may be formed in thin film and recording may be made through the protective film. Especially, when digital information such as (0, 1) information is recorded by scanning through beam irradiation, the recorded electric charge can be preserved as it is or by toner development, and it is possible to display it on CRT by the potential reading means or by the reproducing means or to output it on printer. Also, it is possible to utilize the reading means, which is used for optical card.

BRIEF DESCRIPTION OF THE DRAWINGS

FIG. 12 is a drawing giving the configuration of color-separating optical system;

FIG. 13 is an explanatory view of the case where color electrostatic latent image is formed;

FIG. 21 is a drawing illustrating another embodiment of the method to prepare the holographic color filter;

FIG. 22, FIG. 23 and FIG. 24 are the drawings showing the reproduction method of holographic color filter of FIG. 21;

FIG. 27 and FIG. 28 are the drawings illustrating the reproduction method of the holographic color filter prepared in FIG. 26;

FIG. 29 is a drawing showing an embodiment using Venetian blind;

FIG. 30 is a drawing giving another embodiment of the method to prepare the holographic color filter;

DESCRIPTION OF THE PREFERRED EMBODIMENT

Figure 1A:
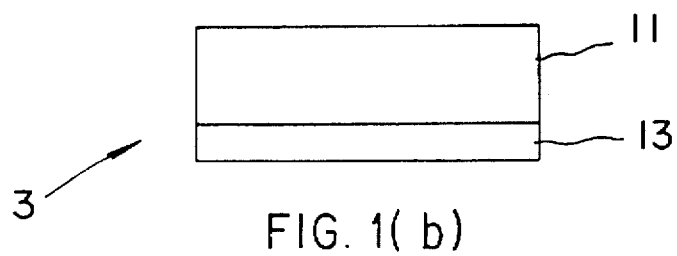
FIG. 1 is a cross-sectional view of the electrostatic information recording medium according to the present invention.

The first electrostatic information recording medium of the present invention will be explained in connection with FIG. 1.

The electric charge carrying layer 11 consists of macromolecular material with high insulating property to suppress the migration of electric charge, and it must have specific resistance of $10^{12}$ Ω·cm or more.

As the macromolecular material to constitute the electric charge carrying layer, it is essential that glass transition temperature is higher than the operating environmental temperature, and it is preferable that glass transition temperature is 20°–100° C. at normal operating environment.

As the macromolecular material to constitute the electric charge retaining layer, it is necessary that the water absorption ratio is lower than 0.4% to prevent the leakage of the accumulated information electric charge by the influence of humidity.

As such macromolecular materials, thermoplastic resin, thermosetting resin, ultraviolet setting resin, electron beam setting resin or engineering plastics can be used.

As thermoplastic resin, the following compounds may be used: Polyethylene, vinyl chloride resin, polypropylene, styrene resin, ABS resin, polyvinyl alcohol, acryl resin, acrylonitrile-styrene resin, vinylidene chloride resin, AAS (ASA) resin, AES resin, cellulose derivative resin, thermoplastic polyurethane, polyvinyl-butyral, poly-4-methylpentene-1, polybutene-1, rosin ester resin, etc. Further, polyetheretherketone resin or polyparaxylylene expressed by the following structural formulae can be used:

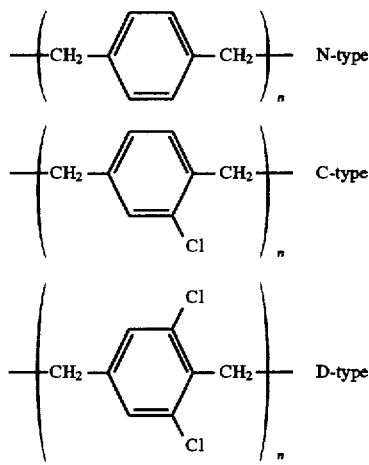

(C-type as described above may be, in addition to the compounds of the above structure, the compounds, in which one of the sites other than the main chain bonding site in benzene ring is substituted by chlorine, or D-type may be the compound, in which two of such sites are substituted by chlorine).

Also, fluorine-containing resin, e.g. fluororesin such as poly-(tetrafluoroethylene) (PTFE), tetrafluoroethylene-perfluoroalkylvinylether copolymer (PFA), tetrafluoroethylene-hexafluoropropylene copolymer (FEP), tetrafluoroethylene-hexafluoropropylene-perfluoroalkylvinylether copolymer (EPE), tetrafluoroethylene-ethylene copolymer (ETFE), poly-(chlorotrifluoroethylene) (PCTFE), chlorotrifluoroethylene-ethylene copolymer (ECTFE), etc. or thermoplastic resin, thermosetting resin or energy beam setting resin such as ultraviolet setting resin, electron beam setting resin, etc., engineering plastics, etc., in which hydrogen atoms are partially or totally substituted by fluorine atoms, or fluorine-containing resin may be mixed and used.

Or, fluorine-containing thermoplastic resin may be used, which has molecular weight with intrinsic viscosity of 0.1 at 50° C. and consists of the repeating unit of cyclic structure given by a general formula:

and/or by a general formula:

(where n is 1 or 2), or fluorine-containing thermoplastic resin may be used, which has molecular weight with intrinsic viscosity of 0.1 at 50° C. and consists of the repeating unit (a) expressed by a general formula:

and/or by a general formula:

(where n is 1 or 2)
and by the repeating unit (b) given by a general formula:

(where X is F, Cl, —O—CF$_2$CF$_2$CF$_3$, —O—CF$_2$CF(CF$_3$) OCF$_2$CF$_2$SO$_3$F, —O—CF$_2$CF$_2$CF$_2$COOCH$_3$) and containing at least the repeating unit (a) by 80 wt %.

The repeating unit (a) can be obtained by radical cyclic polymerization of perfluoroallylvinylether or perfluorobutenylvinylether given by a general formula:

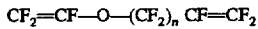

(where n is 1 or 2). Also, those containing the repeating unit (a) and the above repeating unit (b) can be obtained by radical polymerization with perfluorovinylether given by a general formula:

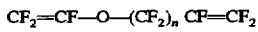

(where n is 1 or 2) and the monomer given by a general formula:

(where X is F, Cl, —O—CF$_2$CF$_2$CF$_3$, —O—CF$_2$CF(CF$_3$) OCF$_2$CF$_2$SO$_3$F, —O—CF$_2$CF$_2$CF$_2$COOCH$_3$). These resins are described for example, by the Japanese Provisional Patent Publication No. 1-131215.

As thermosetting resin, the following compounds can be used: Unsaturated polyester resin, epoxy resin, phenol resin, urea resin, melamine resin, diallyl phthalate resin, silicone resin, etc.

As energy ray setting resins such as ultraviolet setting resin, electron beam setting resin, etc., there are radical polymerized acrylate compounds, e.g. ester compounds of acrylate, metacrylate or their derivatives and having hydroxyl groups on both ends, e.g. hydroxyethyl acrylate, hydroxypropyl acrylate, hydroxybutyl acrylate, hydroxyethyl metacrylate, hydroxypropyl metacrylate, hydroxybutyl metacrylate, 4-hydroxy-cyclohexyl acrylate, 5-hydroxy-cyclooctylacrylate, 2-hydroxy-3-phenyloxypropyl acrylate, (meta) acrylic acid ester compound having one polymerized unsaturated group, and the compound having two polymerized unsaturated groups expressed by the following formula:

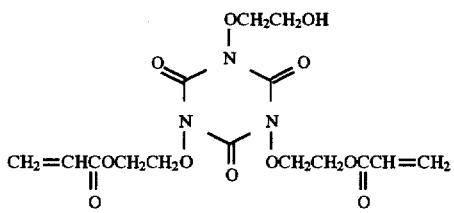

As the setting compounds having two hydroxyl groups and one or two or more radical polymerized unsaturated groups, glycerol metacrylate or the acrylates expressed by the formula:

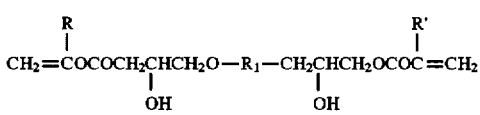

may be used. (Here, R and R' refer to methyl group or hydrogen, and $R_1$ to short-chain diol residual group such as ethyleneglycol, propylene glycol, diethyleneglycol, butanediol, 1,6-hexanediol, etc.

As engineering plastics, polycarbonate, polyamide, acetal resin, polyphenyleneoxide, polybutylene terephthalate, polyethylene terephthalate, polyethylene naphthalate, polyphenylene sulfide, polyimide resin, polysulfone, aromatic polyester, polyacrylate, etc. can be used.

In the resins as described above with high water absorption ratio, the absorption ratio can be decreased by introducing the atoms or substituents furnished with water non-absorbing property. Or, such resin may be used by mixing with the resin with lower water absorption ratio. The materials with high water absorption ratio such as polyether sulfone, polyimide, polyparabanic acid, etc. can be used by laminating the protective film of the resin with lower water absorption ratio.

Figure 1B:
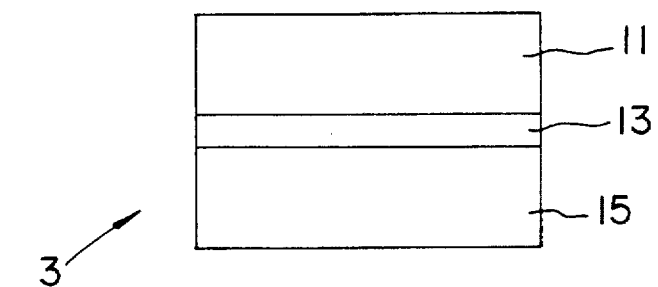
Figure 1C:
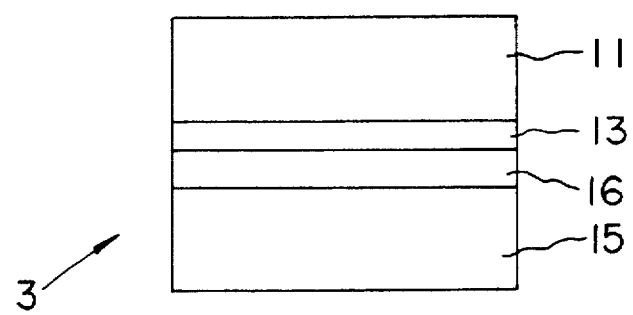
Figure 2A:
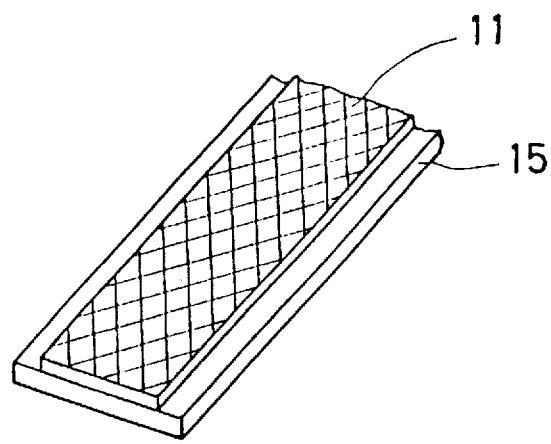
FIG. 2 is a perspective view of various types of flexible electrostatic information recording medium of this invention.
Figure 2B:
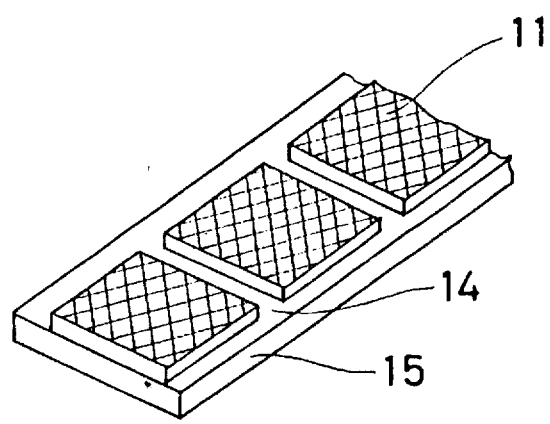
Figure 2C:
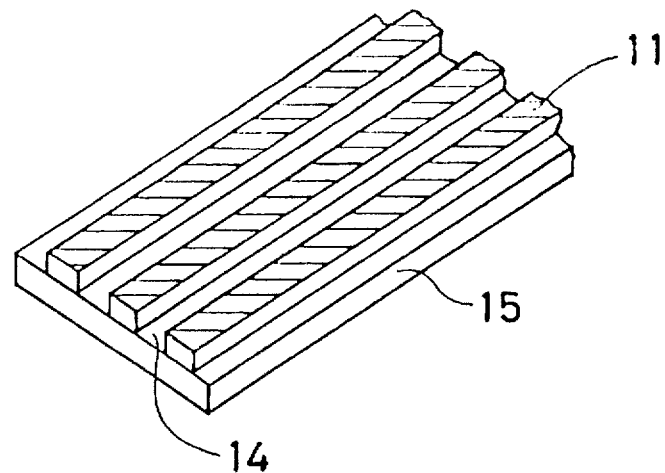
Figure 2D:
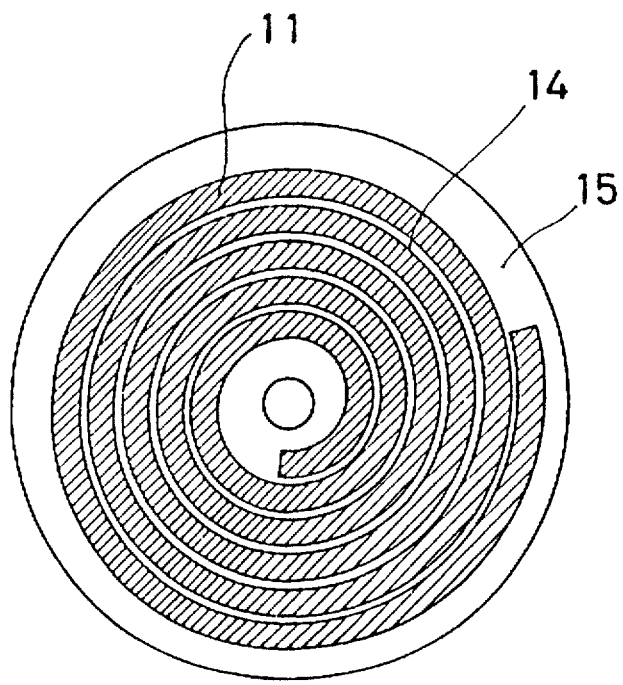

As the laminating method of electric charge retaining layer, there are the methods to laminate the layers by depositing resin or rubber on the electrode 13 by vacuum evaporation, by coating or dipping or by sputtering in case of electrostatic information recording medium as shown in FIG. 1 (a). In case the above cyclic polymer consisting of the repeating unit (a) given by the above general formula (1) and/or by (2) of copolymer consisting of the repeating unit (a) and the repeating unit (b) are used, it is preferable that fluorine type solvent such as perfluoro-(2-butyltetrahydrofuran), etc. is dissolved and coated.

For the electric charge retaining layer 11, silicon film, polyester film, polyimide film, fluorine-containing polymer film, polyethylene film, polypropylene film, polyparabanic acid film, polycarbonate film, polyamide film, etc. may be bonded with bonding agent to form the laminate layers. Or, the electrode layer may be formed on one side of the film by vacuum evaporation, sputtering or coating. In this case, the layer to protect the electrode layer may be provided. If mechanical strength is required, the film or the like with higher mechanical strength may be bonded with it.

It is preferable that the thickness of the electric charge retaining layer is 0.1–100 μm. If it is less than 0.1 μm, electric charge leaks even when electric charge is retained. If it is more than 100 μm, flexibility is lost when flexibility is needed.

The electrode 13 is laminated on the support member 15 as shown in FIG. 1 (b) or on the support member 15 as shown in FIG. 1 (c) through the bonding layer 16, and there is no restriction of the material except that it must have specific resistance of $10^6$ Ω·cm or less. It should be inorganic metal conductive film, inorganic metal oxide conductive film, or organic conductive film such as tertiary ammonium salt. Such electrode of electrostatic information recording medium is formed on the support member by various methods such as vacuum evaporation, sputtering, CVD, coating, metalplating, dipping, electrolytic polymerization, etc. It is necessary to change the film thickness according to electrical property constituting the electrode or by the applied voltage at the recording of information. For example, it is 100–3000 Å in case of aluminum, and it is determined according to the pattern of the total surface between the support member and the electric charge retaining layer or to the pattern of the electric charge retaining layer. As shown in FIG. 1 (a), the film may be laminated by the same procedure as the electric charge retaining layer if the electric charge retaining layer has a constant strength. The support member is not required in this case. Or, the electrode may be detached after the information has been recorded on the electric charge retaining layer and it may be laminated again at the time of information reproduction.

The support member 15 is to support the electrostatic information recording medium 3, and there is no restriction to its material and thickness, provided that it has the strength enough to support the electric charge retaining layer. For example, flexible plastic film, metal foil, paper or rigid substances such as glass, plastic sheet, metal plate (also to be used as electrode) may be used, and light transmission property is also required. Actually, when the electrostatic information recording medium 3 takes the form of flexible film, tape or disk, the flexible plastic film is used. In case higher strength is required, inorganic material with rigidity such as sheet, glass, etc. are used.

In case light transmission property is required, the anti-reflection film may be provided or the film thickness of electrode layer or electric charge retaining layer may be adjusted, or the reflection protective effect may be given by combining both.

The electrostatic information recording medium 3 is to record the information on the electric charge retaining layer 11 as the distribution of electrostatic charge. Therefore, the electrostatic information recording medium may take various forms according to the information to be recorded or the recording method. For example, when it is used for electrostatic camera, it takes the form of normal film (for single frame or continuous frame) or disk. When digital information or analog information is recorded by laser or the like, it takes the form of tape, disk or card.

In the following, description is given for the case where the electrostatic information recording medium 3 takes the form of flexible film, tape or disk. FIG. 2 (a) shows a type of the medium, in which the recording portion, i.e. the electric charge retaining layer 11, is continuous.

This is formed by providing the electric charge retaining layer on the support member such as plastic film equipped with the electrode layer, leaving only both edges of it. This electrostatic information recording medium has the length at least longer than that of one picture to be recorded (e.g. one frame in case of camera photographing, or track width in case of digital information recording). Naturally, this includes the combination or bonding of two or more electrostatic information recording media in longitudinal direction. In this case, there may be a slit zone between the adjacent electric charge retaining layers, where the retaining layer is partially lacking.

On the other hand, there is discontinuous type, as shown in FIG. 2 (b), where the electric charge retaining layer 11 is discontinuous in longitudinal direction.

This is formed by providing the electric charge retaining layer discontinuously on the support member such as plastic film in longitudinal direction, leaving both edges of the support member or without leaving them. On the support member, two or more electric charge retaining layers are formed in a certain size. The size of the electric charge retaining layer differs according to the image or the exposure method of the information input unit. In case of camera photographing, it is 35 mm×35 mm, and it is the track width of the digital information recording in case of the spot input such as laser beam. In case of digital information recording, the cutaway portion of the electric charge retaining layer formed between the adjacent electric charge retaining layers can be utilized as the tracking zone for input/output of the information. Naturally, this includes the combination or bonding of two or more electrostatic information recording media in longitudinal direction. In such case, there may be a slit zone between the adjacent electric charge retaining layers, lacking a part of it.

As shown in FIG. 2 (c), there is the case where the electric charge retaining layer is discontinuous to lateral direction.

In such case, the electric charge retaining layer is formed discontinuously in lateral direction on the support member such as plastic film equipped with electrode layer, leaving both edges of the support member or without leaving them. Thus, two or more band-like electric charge retaining layers are formed on the support member. The width of the electric charge retaining layer is equal either to the track width of digital information to be recorded or to the width multiplied by integral number, and the cutaway portion of the electric charge retaining layer formed between the adjacent electric charge retaining layers is utilized as the tracking zone for input/output of the information.

As shown in FIG. 2 (d), there is also a disk type.

In this case, the electric charge retaining layer is provided totally on the support member such as circular plastic film equipped with electrode layer either totally or leaving spiral cutaway portion of continuous spiral electric charge retaining layer. In such electrostatic information recording medium, circular cutaway portion may be formed for the driving of input/output device. In case of digital information recording, the cutaway portion of the electric charge retaining layer in continuous and spiral form can be used as the tracking zone for input/output of the information.

Next, description is given on the second electrostatic information recording medium of this invention.

In this case, the electric charge retaining layer of the electrostatic information recording medium is formed by single mono layer or built-up layers.

Because LB film 11 is to record the information on its surface or in the interior as the distribution of electrostatic charge, high insulating property is required to suppress the migration of electric charge and must have the insulating property of $10^{12}$ Ω·cm or more in specific resistance.

As the organic compounds forming the mono layer or built-up layers, the organic compounds capable to form LB film with specific resistance of $10^{12}$ Ω·cm or more, e.g. carbonic acids, amines, alcohols, silicon compounds, phosphoric acid derivatives, sulfonic acids, cellulose derivatives, polymers, etc. can be used.

As the carbonic acids, for example, there are tetradecyl benzoate, 2-nitro-5 (N-methyl) aminobenzoate, 2-nitro-5 (N-octadecyl) aminobenzoate, vinyl stearate, β-parinallic acid, trans-13-docosenoic acid, ω-tricosenic acid, glycine-octadecyl alcohol ester, 2,4-octadecadienic acid, octadecyl fumaric acid, octadecyl maleic acid, ω-tricosenic acid, perfluorodecanic acid, perfluorononaic acid, perfluorooctanic acid, perfluoroheptanic acid, cartinonic acid, 2-hexadecanic acid, n-octadecylacrylate, vinyl stearate, octadecyl acrylate, glycine octadecyl ester, alamine octadecylester, 2-lysine, and the substances having the following structural formulae:

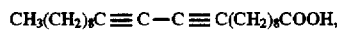 (1)      (2)

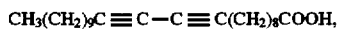 (3)

 (4)

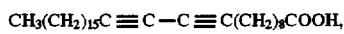 (5)     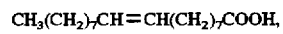 (6)

 (7)      (8)

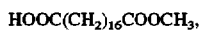 (9)

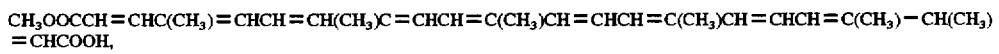 (10)

 (11)     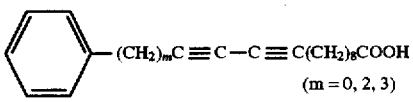 (12)

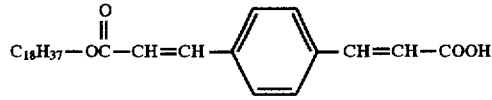 (13)     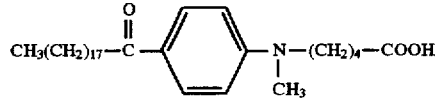 (14)

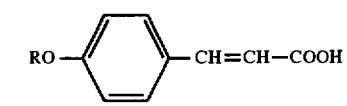 ⑮

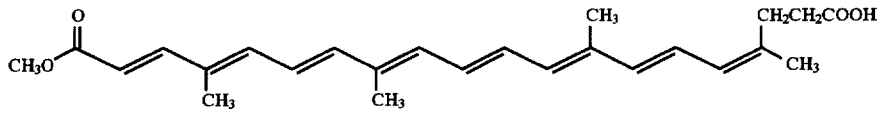 ⑯ ⑱

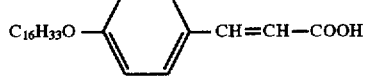 ⑰

⑲

Of the carbonic acids as described above, its salt also can be used if the substance is acid.

As the phosphate derivatives, the following substances can be used: Distearoyl-phosphatidyl-choline, dipalmitoyl-phosphatidylcholine, cholesterol, 1-palmitoyl-2-oleyl-SN-glycel-3-phosphacholine, L-α-dimyristyl-phosphatidic acid, L-α-dilauryl-phosphatidic acid, DL-α-dimyristoyl-phosphatidyl-ethanolamine, DL-α-dilauryl-phosphatidylcholine, DL-α-dipalmitoylnitrobenzoxadiazole-phosphatidylethanolamine, dioleoylphosphatidyl-choline, dipalmitoyl-lecithine, dimyristyl-lecithine, dipalmitoyl-phosphatidylethanolamine, dipalmitoyl-phasphatidylethanolamine, dipalmitoyl-phosphatidylcholine and the substances expressed by the following structural formula:

$$CH_3(CH_2)_{17}OPO(OH)_3$$

As the cellulose derivatives, the following substances can be used: Cellulose triacetate, cellulose tricaprylate, cellulose tricaprate, cellulose trilaurate, cellulose dilaurate, and cellulose tripalmitate. As the polymers, there are: Poly-1-benzyl-L-histidine, poly-γ-benzyl-1-glutamate, polyoctadecyl-metacrylate, polyoctadecyl-acrylate, polymethyl-metacrylate, poly-γ-methyl-L-glutamate, polyimide, poly (n-octadecylvinylether/maleic acid anhydride), poly (octadecene-1/maleic acid anhydride), poly (styrene/maleic acid anhydride), poly-γ-methyl-L-glutamate, polystyrene, and the substances expressed by the following formulae:

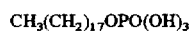

①

②

③

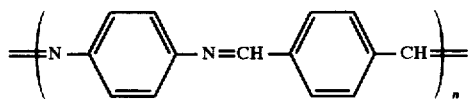 ④

⑤

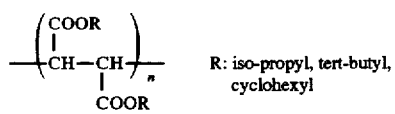 ⑥

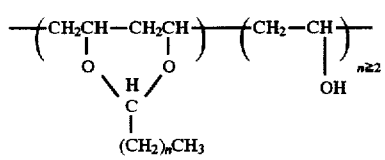 ⑦

As cyloxanes, the substances given by the following formulae can be used:

① $CH_3(CH_2)_{17}Si(Cl)_3$
② $CH_3(CH_2)_{17}Si(OH)_3$
③ $CH_3(CH_2)_7CH=CH(CH_2)_7Si(Cl)_3$
④ $CH_3(CH_2)_7CH=CH(CH_2)_7Si(OH)_3$
⑤ $CH_3OCO-(CH_2)_{22}Si(Cl)_3$
⑥ $CH_3OCO-(CH_2)_{22}Si(OH)_3$

Or the substances expressed by the following structural formula can be used:

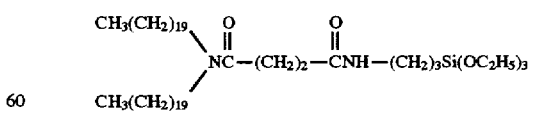

In addition, the substances given by the following structural formulae can be used:

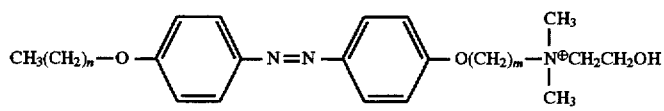 (1)
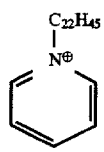 (2)
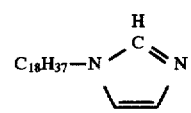 (3)
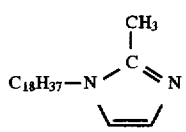 (4)
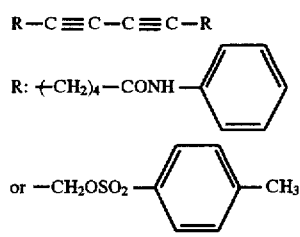 (5)
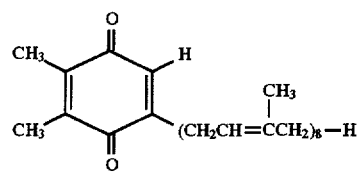 (6)
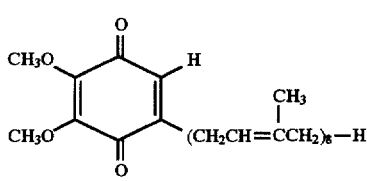 (7)
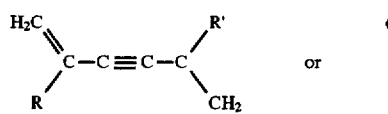 or 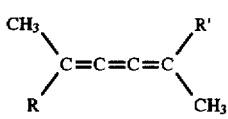 (8)
R and R' as described above are:
wherein R=R',
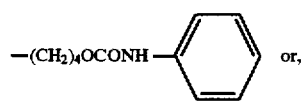 or,
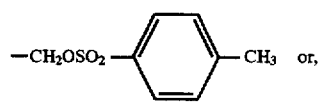 or,
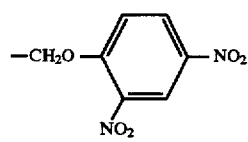
Or, when R≠R',
R is:
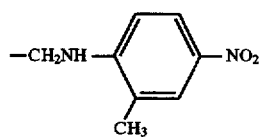
R' is: —(CH$_2$)$_5$CONH C$_2$H$_5$
Or,
R is:
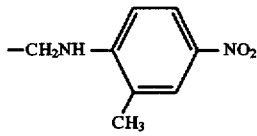
R' is: —(CH$_2$)$_2$CONH C$_2$H$_5$
Or,
R is:
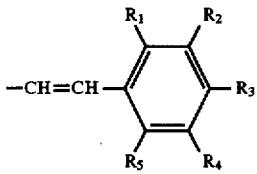
R' is:
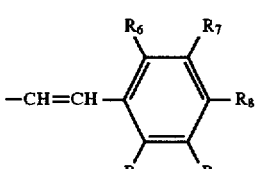
To form mono layer on the electrode surface, the solution of the above compounds in organic solvent is dropped onto water by Langmuir-Blodgett's method to deposit and form mono layer on aqueous phase. Thus, the following substances can be used: The substances formed by shifting the mono layer to the surface of clean electrode under the constant superifical pressure when monomolecules are lined up along the interface, the substances formed by immersion of electrode plate in the solution such as silane coupling agent already known and used for chemical combination of organic polymer and inorganic material, and the substances formed by the known means to form mono layer film such as the deposition of organic compounds on the surface of the electrode and the adsorption of the mono layer. The thickness of mono layer is the size of the constituent molecule, i.e. about 20–100 Å. In case of built-up layer, the layers thickness is a multiple of the thickness of mono layer corresponding to the cumulative frequency.

In forming the mono layer or built-up layers by LB method, it is formed, for example, by general means as described in "The New Experimental Chemistry Course: Vol. 18; Interface and Colloids", pp. 498–507 (Maruzen). As the method to align monomolecules in the built-up layers, there are the method to adsorb the lipophilic group on electrode surface, the method to adsorb the hydrophilic group on electrode surface, or the method to laminate on these monomolecular films from the side of lipophilic group or from hydrophilic group (the so-called, X, Y or Z-type).

The above polymers without hydrophilic group can be formed by placing LB film on the baseplate. In case of polystyrene, for instance, it is dropped on water surface and mono layer is formed, and the attached baseplate is brought into contact with water surface in parallel.

In the following, description is given on the third electrostatic information recording medium of this invention.

As the electrostatic charge recording method, there is the electret to provide the distribution of electric charge and polarization inside the insulating medium in addition to the so-called free electric charge recording method to accumulate the surface electric charge as described above.

In the optical electret, the electrode is formed on the support member such as film, and ZnS, CdS, ZnO, etc. are furnished on the electrode plate with each layer of 1–5 µm by vacuum evaporation, sputtering, CVD, coating, etc., and the electrode is laid upon this photosensitive layer on contact or non-contact basis.

As the materials for thermal electret, there are polyvinylidene fluoride (PVDF), poly (VDF/ethylene trifluoride), poly (VDF/ethylene tetrafluoride), polyvinyl fluoride, polyvinylidene chloride, poly-acrylonitrile, poly-α-chloroacrylonitrile, poly (acrylonitrile/vinyl chloride), polyamide 11, polyamide 3, poly-m-phenylene-isophthalamide, polycarbonate, poly (vinylidenecyanide vinyl acetate), PVDF/PZT complex, etc., and the material is furnished on the electrode baseplate in single layer of 1–50 µm or two or more materials are laminated.

Figure 3A:
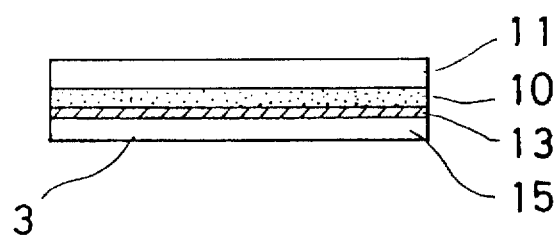
FIG. 3 is a cross-sectional view of the fourth electrostatic information recording medium of this invention.
Figure 3B:
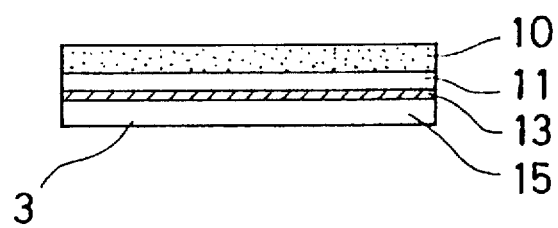

The fourth electrostatic information recording medium of this invention is described in connection with FIG. 3.

The electric charge retainability reinforced layer 10 of the electrostatic information recording medium consists of inorganic insulating film, organic mono insulating layer, organic insulating mono layer or built-up layers with film thickness within the range of 10–1000 Å. It should have such film thickness and material quality that the information electric charge accumulated by electrode or discharge goes into it by the action of the electric field generated by the information electric charge. The insulating layer 11 without electric charge injection is formed by the insulating material and must have film thickness of 100 Å or more, and it should have such film thickness or material quality that the information electric charge does not go into it by the action of the electric field generated by the information electric charge.

The electric charge retainability reinforced layer 10 is defined as the layer, into which electric charge enters when strong electric field ($10^4$ V/cm or more) is applied but it does not enter when low electric field (less than $10^4$ V/cm) is applied. As the electric charge retainability reinforced layer, $SiO_2$, $Al_2O_3$, SiC, SiN, etc. can be used. As organic substances, polyethylene vacuum-deposited film or polyparaxylylene vacuum-evaporated film can be used. Also, as organic insulating monomolecular film or monomolecular built-up film, aromatic compounds with specific resistance of $10^{12}$ Ω·cm or more, e.g. carbonic acid derivatives of styrene, ω-phenylic acid, or cadmium arachidiate, are laminated in 1–10 layers by Langmuir-Blodgett's technique and used.

In order to stabilize the electrostatic charge, it is preferable to add the substance having electron donating property (donor material) or the substance with electron accepting property (acceptor material) to the insulating layer 11 without electric charge injection. As donor materials, there are the compounds such as styrene, pyrene, naphthalene, anthracene, pyridine, azine, etc. Actually, the compounds such as tetrafluvalene (TTF), polyvinylpyridine, polyvinylnaphthalene, polyvinylanthracene, polyazine, polyvinylpyrene, polystyrene, etc. are used in single compound or in mixture. As the acceptor materials, there are halogen compounds, cyanide compounds, nitro compounds, etc. Actually, the compounds such as tetracyanoquinodimethane (TCNQ), trinitrofluorenone (TNF), etc. are used in single compound or in mixture. Donor material or acceptor material is added to resin by about 0.001–10%.

In order to stabilize the electrostatic charge, single element particles may be added to the insulating layer. As the single element, the following elements are used: I A group (alkali metals), I B group (copper group), II A group (alkali earth metals), II B group (zinc group), III A group (aluminum group), III B group (rare earth group), IV B (titanium group), V B group (vanadium group), VI B group (chromium group), VII B group (managanese group), VIII group (iron group and platinum group), or silicon, germanium, tin, lead as IV A group (carbon group), antimony, bismuth as V A group (nitrogen group), sulfur, selenium and tellurium as VI A group (oxygen group). These are used in fine powder. Of the elements as described above, the metals can be used in the forms of metallic ions, fine powder alloy, organic metal or complex. Further, the above elements can be used in the forms of oxides, phosphates, sulfonated compounds or halogenated compounds. These additives may be added in small quantity to the electrostatic information recording medium made of resin, rubber, etc., and the added quantity may be 0.01–10 weight % to the electrostatic information recording medium.

The insulating layer must have the thickness of at least 1000 Å (0.1 µm) from the viewpoint of insulation and less than 100 µm from the viewpoint of flexibility.

Next, description is given on the fifth electrostatic information recording medium of this invention.

The particles to store the electric charge are composed of photoconductive materials and the electrically conductive materials. As the materials for the photoconductive particles, there are inorganic photoconductive materials such as amorphous silicon, crystal silicon, amorphous selenium, crystal selenium, cadmium sulfide, zinc oxides, and organic photoconductive materials such as polyvinylcarbazole, phthalocyanine, azo pigment, etc. or triphenylmethane, pyrylium salt, xanthene or basic dyes are used.

As the electrically conductive materials, the following elements are used in fine powder: I A group (alkali metals)

in periodic table, I B group (copper group), II A group (alkali earth metals), II B group (zinc group), III A group (aluminum group), III B group (rare earth metals), IV B group (titanium group), V B group (vanadium group), VI B group (chromium group), VII B group (manganese group), VIII group (iron group and platinum group), carbon, silicon, germanium, tin and lead as IV A group (carbon group), antimony and bismuth as V A group (nitrogen group), and sulfur, selenium and tellurium as VI A group (oxygen group).

Of the above elements, the metals can be used in the form of fine powder alloy, organic metal or complex. Further, they can be used in the form of oxides, phosphates, sulfonated compounds or halogenated compounds. Above all, carbon, gold, copper, aluminum, etc. are preferably used.

Next, the method to form the particle layer is described.

Figure 4A:
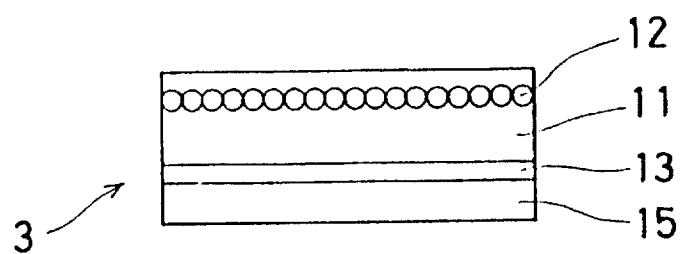
FIG. 4 is a cross-sectional view of the fifth electrostatic information recording medium of this invention.
Figure 4B:
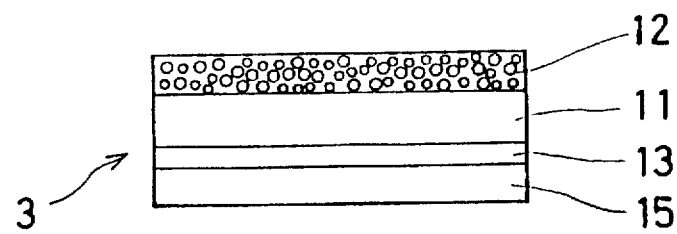
Figure 4C:
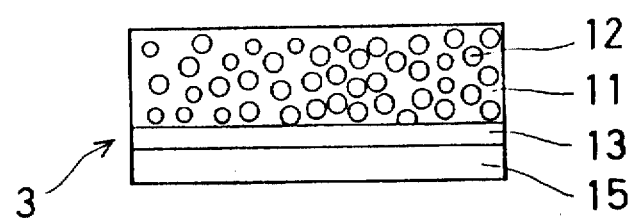

First, the electrostatic information recording medium as shown in FIG. 4 (a) is formed by depositing the particle layer forming materials on the resin layer 11, which is in unhardened molten or softened conditions and is laminated on the support member, by means of a vacuum evaporation unit of low vacuum.

When vaporized under low vacuum condition of 10 Torr–$10^{-3}$ Torr, the particle layer forming material is aggregated and is turned to fine particles of 10–0.1 μm. If the resin layer is softened by heating during vacuum evaporation, the particles 12 are laminated in arranged conditions in single layer or multiple layers. If the resin layer is made of thermoplastic resin, the resin layer is softened by heating the electrode layer by resistance heating or it is softened by directly heating the baseplate by heater. If the resin layer is made of thermosetting resin, ultraviolet setting resin or electron beam setting resin, the particle layer forming material is deposited by vacuum evaporation in the unhardened condition and it is hardened by appropriate hardening means after the particle layer is formed.

There is another method to form the fine particle layer in the vicinity of the interior surface of the resin layer. By this method, the particle layers 12 are deposited on the support member, which is formed by hardening said resin layer on the electrode baseplate in advance, in single layer or in multiple layers by vacuum evaporation. In this case, the particle layer is formed in the vicinity of the interior surface of the resin layer. Then, the same resin as the resin used for the formation of said resin layer or the different insulating resin is laminated within the range of 0.1 μm–30 μm. As the laminating methods, there are the dry methods such as vacuum evaporation or sputtering to directly form the resin layer, or the wet methods, by which, resin is first dissolved by solvent, and, after forming the film by spinner coating, dipping, blade coating, etc., the solvent is dried up. To ensure the uniform particle size during the formation of the particle layer, the baseplate may be heated up to the temperature, at which the resin layer is not melted.

The resin layer 11 and the particle layer 12 are sequentially laminated on the support member as shown in FIG. 4 (b). To attain this, the particle layer forming material in fine particles is dispersed in the resin layer forming material by adding the suitable hardening agent and solvent, and this is coated on the resin layer 11, formed on the support member in advance, by coating and dipping.

Further, the material to form the particle layer 12 in fine particles is dispersed in the resin layer 11 as shown in FIG. 4 (c). To form this, the particle layer forming material is dispersed in the resin layer forming material by adding the suitable hardening agent and solvent and by coating it on the support member by coating and dipping.

Next, description is given on the sixth electrostatic information recording medium of this invention.

The sixth electrostatic information recording medium is characterized in that the electric charge transport layer 19 is laminated on the electric charge retaining layer of the fifth electrostatic information recording medium as described above as shown in FIG. 5.

The electric charge transport layer 19 is provided with the function to primarily transport the electric charge on one side. As the materials to form the hole transport layer, the electric charge transport material can be used, which is formed by dispersing the following substances into resin: Amorphous silicon, amorphous selenium doped with B, Al, Ga, In, etc. or oxadiazole, pyrazoline, hydrazone, polyvinylcarbazole, stilbene, anthracene, naphthalene, tridiphenyl-methane, triphenylmethane, azine, amine, aromatic amine, etc.

As the materials to form the electron transport layer, the following substances can be used: Amorphous silicon doped with P, N, As, Sb, Bi, etc. or ZnO, polyvinylcarbazole-trinitrofluorene electric charge migration complex.

To laminate the electric charge transport material, there is the dry method to form the electric charge transport layer directly on the fine particle layer by vacuum evaporation, sputtering method, etc. or the wet method to dissolve or suspend the photoconductive material in solvent and, after forming the film by spinner coating method, the solvent is dried up. The material may be laminated with the thickness of 0.5 μm–50 μm. If film thickness is less than 0.5 μm, the accumulated information electric charge may be adversely affected by the trouble such as the approach of the opposite electric charge to the surface of the electrostatic image recording medium. If film thickness is 50 μm or more, trouble may be caused in reproducing the information.

Next, the seventh electrostatic information recording medium of this invention is described.

When light is irradiated on the photoconductive layer laminated on the insulating layer, optical carriers (electrons and positive holes) are generated on the irradiated portion. When the conductive layer has such width as to facilitate the migration of these carriers or when an electric field is present, the effects are especially conspicuous. The materials are composed of inorganic photoconductive materials, organic photoconductive materials, organic and inorganic composite type photoconductive materials, etc.

The photoconductive layer 9 is laminated on the insulating layer 11 as shown in FIG. 6 (a). This is formed by coating the inorganic photoconductive material, organic photoconductive material or organic and inorganic composite type photoconductive material by coating, vacuum evaporation, sputtering or CVD method.

The medium having the picture elements 24 as shown in FIG. 6 (b) is formed by sequentially laminating the electrostatic information recording medium electrode 13, the insulating layer 11, photoconductive layer 9 on the support member 15 of the insulating layer. After the resist pattern for each picture element is formed on the photoconductive layer by photo resist, etching is performed on the photoconductive layer under acidic or alkaline atmosphere.

There are various etching methods. Because one unit obtained by etching is turned to one pixel, the resolution of the image is determined by its fineness. Therefore, it is desirable to perform as fine etching as possible and to have finer unit.

As a method to provide fine etching, there is photolithography using resist. After pattern exposure is performed using resist, there are the processes of resist development, etching and removing. As the etching methods, there are a method to use alkaline or acidic chemical solution or to perform dry etching under the atmosphere of oxygen or fluorine type gas in plasma. As the exposure method to resist, there is a method to directly draw by electron beam or to use X-ray.

As the photoconductive material, for which etching is achievable, it is preferable to use inorganic materials among the materials as described in the present specification, such as amorphous silicon, amorphous selenium, cadmium sulfide, zinc oxide, etc. Above all, amorphous silicon or amorphous selenium, for which etching can be performed, are desirable.

In case amorphous silicon is used, it is possible to control p-type having excellent hole transporting property or n-type having excellent electron transporting property by doping. Dopant gives no influence to etching because it is used in very small quantity, while it is necessary to take the polarity of the applied voltage into account when voltage application or image exposure is performed. Doping may be performed for amorphous selenium to improve spectral sensitivity or heat-resistant property, but there is no problem also in this case.

On the other hand, if the fineness of pixel unit does not become an issue, one unit can be formed by masking when photoconductive film is deposited by dry or wet method. In addition, there are various methods to form one unit, whereas any method may be used if fine fabrication can be achieved.

Also, it is possible to give orientation to the photoconductive layer 9 as shown in FIG. 6 (c). To form this, cadmium sulfide (CdS), zinc oxide (ZnO), etc. are used as photoconductive material, and it is piled up on the insulating layer in argon plasma using CdS or ZnO as target. Then, the film with crystal orientation oriented toward the direction of film thickness can be obtained by selecting the sputtering conditions.

Further, as shown in FIG. 6 (d), the photoconductive layer 9 is obtained as follows: The particles of cadmium sulfide (CdS) or zinc oxide (ZnO) (particle size: 1–100 μm) are dispersed in the binder. Then, by adding the solvent and by coating it on the baseplate, the photoconductive layer with dispersed photoconductive particles can be obtained.

The electrostatic information recording and reproducing or playing-back processes according to the present invention will not be explained.

Basically, the electrophotographic information recording system used to this end comprises an electrostatic information recording medium and a photosensitive member located in opposition thereto.

Figure 7:
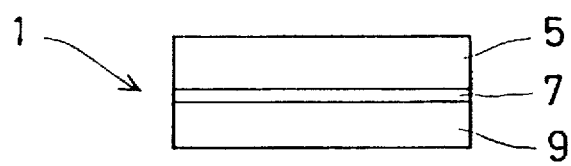
FIG. 7 is a cross-sectional view of a photosensitive member in the electrostatic information recording apparatus of this invention.

Upon irradiated with light, a photoconductive layer 9 forming a photosensitive member 1, as shown in FIG. 7, generates light carriers (electrons, positive holes) from the irradiated region, which can migrate widthwisely therethrough. The layer 9 is more effective esp. in the presence of an electric field. The layer 9 may be formed of an inorganic photoconductive material, an organic photoconductive material, a composite type of inorganic/organic photoconductive material thereof and so on.

Such photoconductive materials and the formation of the photoconductive layers will now be explained.

(A) Inorganic Photosensitive Member (Photoconductor)

Inorganic photosensitive materials used may include amorphous silicon, amorphous selenium, cadmium sulfide, zinc oxide and so on.

(a) Amorphous Silicon Photosensitive Member

The amorphous silicon photosensitive member may be formed of:

(i) Hydrogenated amorphous silicon (a—Si:H), and (ii) Fluorinated amorphous silicon (a—Si:F) which is not doped with impurities, is doped with B, Al, Ga, In, Tl or the like into a p-type (a hole transfer type), or is doped with P, Ag, Sb, Bi or the like into an n-type (an electron transfer type).

For the formation of a photosensitive layer, silane and impurity gases may be introduced with a hydrogen gas, etc. into a low vacuum atmosphere ($10^{-2}$ to 1 Torr) to deposit them on an electrode substrate heated or not heated by glow discharge into a film, or may be formed on a simply heated electrode substrate through thermochemical reactions. Alternatively, the starting solid material may be formed into a film by vapor deposition or sputtering. The obtained film may be used in the form of a single or laminated layers. The film may have a thickness of 1 to 50 μm.

A transparent electrode 7 may be provided on its surface with a charge blocking layer which, when not exposed to light, serves to prevent charges from being injected from the transparent electrode 7, as if exposed to light. For that purpose, an insulating layer or layers such as a—SiN, a—SiC, $SiO_2$ and $Al_2O_3$ layers may be formed on one or both of the electrode substrate and the uppermost (surface) layer of the photosensitive member by glow discharge, vapor deposition, sputtering or other suitable means. The insulating layer(s) is (are) required to have a thickness of at least 3000 Å or below, since too an increased thickness prevents charges formed by exposure from passing through the insulating layer, with the result that they are accumulated in the photosensitive member in the form of space charges. It is preferred that the insulating layer(s) has (have) a thickness of 100 to 1000 Å by reason that it (they) is (are) then easy to prepare.

Preferably, the electrode substrate may be formed as the charge blocking layer with a charge transport layer capable of transporting charges of polarity opposite to that of the electrode substrate, making use of a rectifying effect. If the electrode is negative, a hole transport layer may then be provided, and if the electrode is positive, an electron transport layer may then be provided. For instance, a—Si:H ($n^+$) wherein Si is doped with boron has hole transport properties so increased that it produces a rectifying effect, and so functions as a negative charge blocking layer.

(b) Amorphous Selenium Photosensitive Member

Photosensitive amorphous selenium includes (i) amorphous selenium (a—Se), (ii) amorphous selenium tellurium (a—Se—Te), (iii) amorphous arsenic selenium (a—As—Se), (iv) amorphous arsenic selenium Te (a—As—Se—Te) or the like.

This photosensitive film may be prepared by vapor deposition or sputtering, and an $SiO_2$, $Al_2O_3$, SiC or SiN layer may be formed on an electrode substrate as the charge blocking layer by vapor deposition, sputtering, glow discharge or other suitable means. Alternatively, the above substances (i) to (iv) may be used in combination and formed into a laminated type of photosensitive member. The photosensitive member may have a similar film thickness as stated in connection with the amorphous silicon photosensitive member.

(c) Cadmium Sulfide (CdS)

This photosensitive member may be prepared by coating, vapor deposition or sputtering. For vapor deposition, solid particles of CdS may be placed on a tungsten boat and vapor-deposited thereon by resistance heating or EB (electron beams). For sputtering, a CdS target may be used to deposite on a substrate in argon plasma. In this case, CdS is usually deposited in an amorphous state, but it may be possible to obtain a crystalline oriented film (oriented in the thickness direction) by selecting the conditions for sputtering. For coating, CdS particles (having a particle size of 1 to 100 μm) dispersed in a binder with the addition of a solvent may be coated on a substrate.

(d) Zinc Oxide (ZnO)

This photosensitive member may be prepared by coating or CVD. For coating, ZnO particles (having a particle size of 1 to 100 μm) dispersed in a binder with the addition of a solvent may be coated on a substrate. For CVD, an organic metal such as diethyl zinc or dimethyl zinc is mixed with an oxygen gas in low vacuum ($10^{-2}$ to 1 Torr) and subjected to chemical reactions on an electrode substrate heated (to 150° to 400° C.), whereby it is deposited thereon in the form of a zinc oxide film, which is again oriented in the thickness direction.

(B) Organic Photosensitive Member

The organic photosensitive member is broken down into single-layer and function-separated types.

(a) Single Layer Type of Photosensitive Member

The single layer type of photosensitive member comprises a mixture of a charge generator substance with a charge transporter substance.

[Charge Generators]

The charge generators are substances having the property of absorbing light to generate charges and transmitting such charges to the charge transporter substances. Used to this end are substances based on azo pigments, bis-azo pigments, trisazo pigments, phthalocyanine pigments, perylene pigments, triphenylmethane dyes, styryl dyes, azulenium salt pigments, squalenium salt pigments, methine pigments, pyrylium dyes, cyanine dyes and methine dyes.

[Charge Transporters]

The charge transporters are substances capable of satisfactorily transporting ionized charges. Used to this end are substances based on hydrazones, pyrazolines, polyvinyl carbazoles, carbazoles, stilbenes, anthracenes, naphthalenes, tridiphenylmethanes, azines, amines, aromatic amines, oxadiazoles, triazoles, polycyclic aromatics and the like.

A charge-transfer complex may also be formed from the charge-generating and transporting substances.

Usually, photosensitive members have their photosensitive characteristics determined by the light absorption properties of the charge-generating substances. However, the complexes obtained by mixing the charge generating substances with the charge transporting substances have their light absorption properties varied. For instance, polyvinyl carbazole (PVK) is only sensitive in an ultraviolet region and trinitrofluorenone (TNF) is only sensitive in the vicinity of a 400-nm wavelength region, but a PVK-TNF complex is sensitive even to wavelength regions of up to 650 nm.

Preferably, such a single layer type of photosensitive member has a film thickness of 10 to 50 μm.

(b) Function-Separated Type of Photosensitive Member

The charge-generating substances tend to absorb light to generate charges but have the property of trapping charges, whereas the charge-transporting substances have superior charge-transporting characteristics but are inferior in the charge-generating properties due to light absorption. For that reason, both the substances are separated from each other to make much use of their individual properties. A charge generating layer is thus laminated on a charge transporting layer, and vice versa.

In order to make the function-separated type of photosensitive member, the charge-generating substance is first dissolved or dispersed with a binder in a solvent and the resulting coating solution is spread on an electrode to form a charge generating layer. Then, the charge transporting substance is likewise dissolved or dispersed with a binder in a solvent and the resulting coating solution is spread and then dried on the charge generating layer to form a charge transporting layer. Preferably, the charge generating layer may have a film thickness of 0.1 to 10 μm, while the charge transporting layer may be of 10 to 50 μm in film thickness.

Binders used for both the single-layer and function-separated types of organic photosensitive members may include, for instance, silicone resins, styrene/butadiene copolymer resins, epoxy resins, acrylic resins, saturated or unsaturated polyester resins, polycarbonate resins, polyvinyl acetal resins, phenolic resins, polymethyl methacrylate (PMMA) resins, melamine resins and polyimide resins. For facilitated deposition, the binder may be used in an amount of 0.1 to 10 parts per part of each of the charge-generating and transporting layers. For coating, use may be made of dipping, vapor deposition, sputtering or other suitable means.

(c) Inorganic/Organic Laminated Type of Photosensitive Layer

The member may be formed (1) using the above inorganic photoconductive layer such as a—Si, a—Se, CdS and ZnO layers for the charge generating layer and the above organic charge transporting layer for the charge transporting layer or (2) using the above organic charge generating layer for the charge generating layer and the above inorganic photoconductive layer for the charge transporting layer.

Referring to the film thickness, the charge-generating and transporting layers may be 0.1 to 10 μm and 10 to 50 μm, respectively, as is the case with the above function-separated type of organic photosensitive member.

The charge blocking layer will now be explained in more detail.

The charge blocking layer may be provided to prevent a dark current from occurring on at least one or both sides of the photoconductive layer 9 (the injection of charges from the electrode) at the time when voltage is applied, viz., a phenomenon where, as if exposed to light, charges migrate through the photoconductor even when not actually exposed to light.

The charge blocking layer is of two types, one making use of a so-called phenomenon where charge transfer occurs in the presence of a high electric field and the other the rectifying effect. With the layer making use of such a phenomenon a current does neither pass through the photoconductive layer nor reach the surface of the insulating layer. When light is incident upon that layer, however, a high electric field is applied to its region on which light is incident due to the presence of one (electron or hole) of charges generated in the photoconductive layer, so that a current can pass through the charge blocking layer through the resulting charge transfer effect. Such a charge blocking layer may be formed of an inorganic insulating film, an organic insulating polymeric film, an insulating mono layer and so on, which may be used alone or laminated. The inorganic insulating film may be obtained from $As_2O_3$, $B_2O_3$, $Bi_2O_3$, CdS, CaO, $CeO_2$, $Cr_2O_3$, CoO, $GeO_2$, $HfO_2$, $Fe_2O_3$, $La_2O_3$, MgO, $MnO_2$, $Nd_2O_3$, $Nb_2O_5$, PbO, $Sb_2O_3$, $SiO_2$, $SeO_2$, $Ta_2O_5$, $TiO_2$, $WO_3$, $V_2O_5$, $Y_2O_5$, $Y_2O_3$, $ZrO_2$, $BaTiO_3$, $Al_2O_3$, $Bi_2TiO_5$, CaO—SrO, CaO—$Y_2O_3$, Cr—SiO, $LiTaO_3$, $PbTiO_3$, $PbZrO_3$, $ZrO_2$—CO, $ZrO_2$—$SiO_2$, AlN, BN, NbN, $Si_3N_4$, TaN, TiN, VN, ZrN, SiC, TiC, WC, $Al_4C_3$ and so on by glow discharge, vapor deposition, sputtering or other suitable means. It is noted that the thickness of this film may be determined for each material, while taking into consideration the insulating properties for preventing the injection of charges and the charge transfer effect. For the charge injection-preventing layer making use of the rectifying effect, there is provided a charge transporting layer capable of transporting charges and having polarity opposite to that of the electrode substrate. Thus, such a charge injection-preventing layer is formed of an inorganic photoconductive layer, an organic photoconductive layer or a composite inorganic/organic type of photoconductive layer, and has a film thickness of about 0.1 to 10 μm. More specifically, when the electrode is negative, use may be made of an amorphous silicon photoconductive layer doped with B, Al, Ga, In and so on as well as an organic photoconductive layer obtained by dispersing throughout resins amorphous selenium or oxadiazole, pyrazoline, polyvinyl carbazole, stilbene, anthracene, naphthalene, tridiphenylmethane, triphenylethane, azine, amine, aromatic amine or the like. When the electrode is positive, use may be made of an amorphous silicon photoconductive layer doped with P, N, As, Sb, Bi or the like as well as a ZnO photoconductive layer or the like formed by glow discharge, vapor deposition, CVD, coating or other suitable means.

Figure 8:
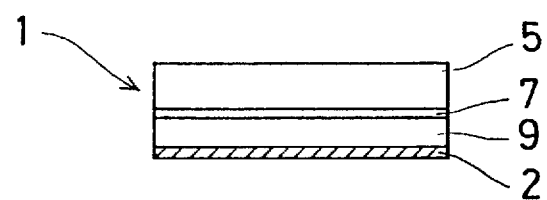
FIG. 8 and FIG. 9 are to explain another photosensitive member in the electrostatic information recording apparatus of this invention.

The photosensitive member used in the present invention is also characterized in that a discharge-reinforcing layer 2 in the form of a film is formed on the above photoconductive layer 9, as illustrated in FIG. 8.

As the discharge-reinforcing materials, use may be made of metal compounds of high electron emissivity such as BaO, CaO, SrO, MgO, CeB$_6$, CsSb, Sb—Rb—Cs, Ag—O—Cs, W—Th, TiC, TiO, Y$_2$O$_3$, La$_2$O$_3$, Dy$_2$O$_3$ and ThO$_2$ or metal oxides.

The discharge-reinforcing layer 2 may be formed on the surface of the photoconductive layer 9 by conventional film-forming techniques such as vapor deposition, sputtering, plasma CVD or coating using a binder, and have a film thickness of preferably 50 to 5000 Å, more preferably 100 to 1000 Å.

The electrode 7 is provided on a support 5, except that the support is formed of a metal, and may be formed of any material having a specific resistance value of $10^6$ Ω·cm or below. Usable to this end are, e.g., an inorganic metal film, an inorganic metal oxide film or an organic film such as a quarternary ammonium salt film, all being electrically conductive. Such an electrode 7 may be formed on the support 5 by vapor deposition, sputtering, CVD, coating, plating, dipping, electrolytic polymerization or other suitable means. The thickness of the electrode 7 has to be varied depending upon the electrical properties of the material forming it and the voltage to be applied for recording information, but may be on the order of 100 to 3000 Å where it is formed of aluminium, for instance. As is the case with the photoconductive layer support 5, the electrode 7 is required to have such optical properties as mentioned above, when it is necessary for information-bearing light to be incident thereon. For instance, if the information-bearing light is visible light (400 to 700 nm), use may then be made of transparent electrodes obtained by the vapor deposition or sputtering of, e.g., ITO (In$_2$O$_3$—SnO$_2$) or SnO$_2$ or the coating of finely divided powders thereof formed with a binder into an ink, semi-transparent electrodes obtained by the vapor deposition or sputtering of, e.g., Au, Al, Ag, Ni or Cr, or organic transparent electrodes obtained by the coating of, e.g., tetracyanoquinodimethane (TCNQ) or polyacetylene.

The above electrode material may also be used in the case where the information-bearing light is infrared light (700 nm or more). In some cases, a colored electrode capable of absorbing visible light may be used so as to cut off visible light.

Basically, the above electrode material may be also used in the case where the information-bearing light is ultraviolet light (400 nm or below). However, an electrode substrate material absorbing ultraviolet light (such as an organic polymeric material and soda glass) is unpreferred. Thus, preferable is a material such as quartz glass, which can transmit ultraviolet light therethrough.

No particular limitation is imposed on the material and thickness of the support 5 of the photosensitive member, as long as it has strength sufficient to support the photosensitive member. For instance, use may be made of flexible plastic films, metal foils, paper, glass, plastic sheets or rigid materials such as metal sheets (which may also serve as electrodes). However, when the support is used for a system for recording information with light incident from the photosensitive member, it is essentially required to transmit that light. For the support employed with a camera using natural light incident from the photosensitive member, use may be made of a transparent sheet or plastic film or sheet, all having a thickness of about 1 mm.

Where the support is required to be transparent to light incident from the photosensitive member for information recording, a anti-reflection layer may be provided thereon and/or the thickness of the electrode layer or the photoconductive layer may be adjusted, thereby achieving the desired anti-reflection effect.

Figure 9A:
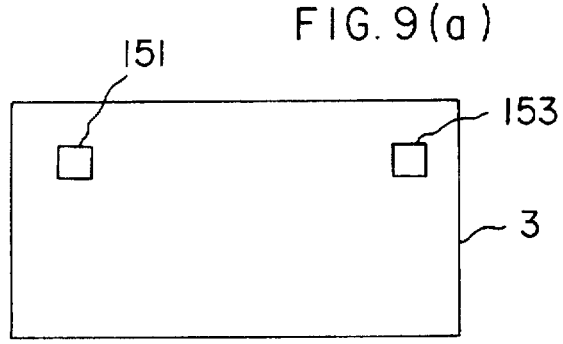
Figure 9B:
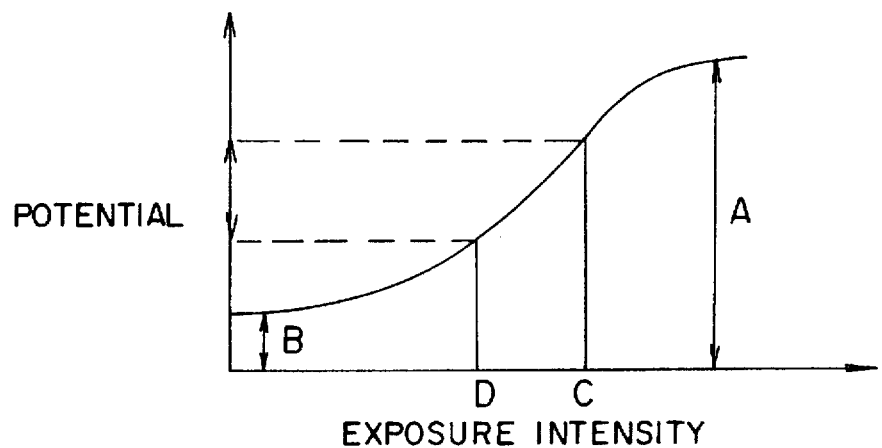
Figure 9C:
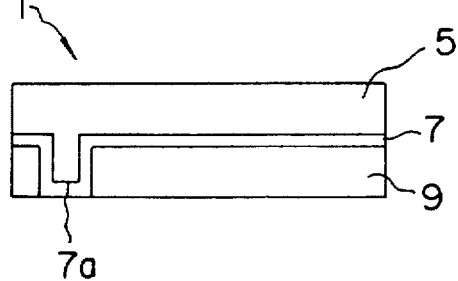
Figure 9D:
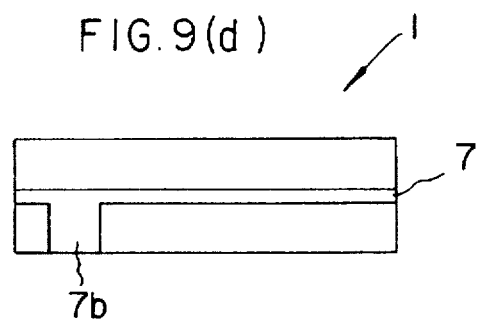
Figure 9E:
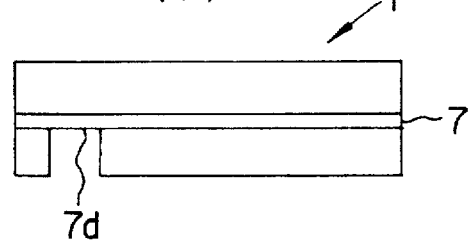
Figure 9:
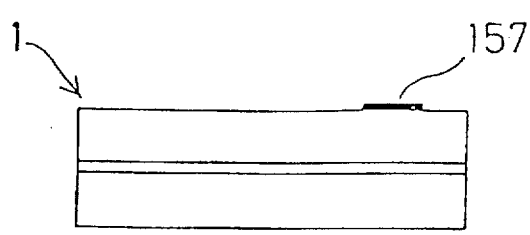
Figure 9:
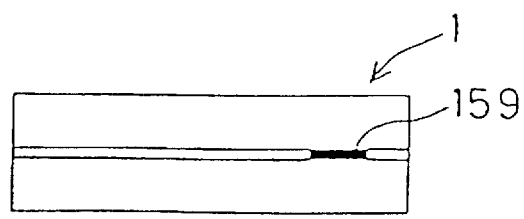
Figure 9:
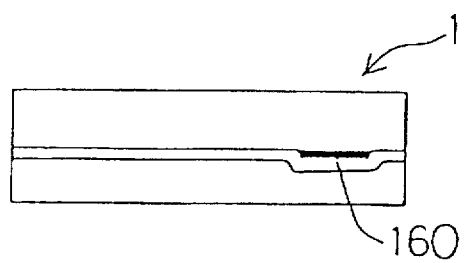
Figure 9:
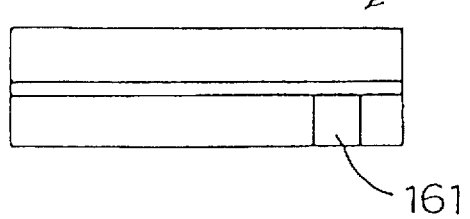

Next, description is given by FIG. 9 on the photosensitive member used for correcting the electrostatic information potential to be recorded on the electrostatic information recording medium.

In the figure, 1 is a photosensitive member, 3 an electrostatic information recording medium, 151 an exposed portion, 153 a non-exposed portion, 155 an illuminating light source, 157 and 160 are light screening unit, 159 a non-transparent electrode unit, and 161 a lacking portion of photoconductive layer.

In the electrostatic information recording method of this invention, information exposure is performed with voltage applied between the photosensitive member and the electrode of the electrostatic information recording medium, and the potential distribution corresponding to the exposure intensity as given in FIG. 9 (b) occurs on the electrostatic information recording medium. When exposure intensity is increased, this potential is raised, while there is maximum potential, which is saturated at more than the predetermined value and defined by supply voltage. On the contrary, if exposure intensity is decreased, the potential is also decreased, whereas it is not ultimately turned to 0. Dark current flows between two electrodes even when not exposed, and there is minimum potential based on this. Even when maximum potential and minimum potential are generated on the electric charge retaining medium and are used as reference potential and exposure is performed between the exposure quantity C and D in FIG. 9 (b), it is possible on the photosensitive member of this invention to correct the image potential according to this potential.

FIG. 9 (a) shows the exposed portion 151 where maximum potential is generated and the non-exposed portion 153 where minimum potential is generated on the electrostatic information recording medium 3.

First, description is given on the photosensitive member used to form the exposed portion 151 in FIG. 9 (a) in connection with FIGS. 9 (c)–(e).

In FIG. 9 (c) a part of the electrode 7 of the photosensitive member 1 is bent to form the exposed portion 7a so that exposure is performed on the surface of the photoconductive layer placed face-to-face to the electrostatic information recording medium. When information exposure is performed with the photosensitive member and the electrostatic information recording medium at face-to-face position, maximum electric field locally determined by supply voltage is applied on the region of the electrostatic information recording medium opposing to the exposed portion 7a of the electrode, and electric charge is accumulated on the opposing electrostatic information recording medium to reach the maximum potential.

In FIG. 9 (d), an exposed portion 7b of the electrode is formed, on the surface of photoconductive layer by increasing the thickness of a part of the electrode, and maximum potential is generated as in the case of (c).

In FIG. 9 (e), a part of the photosensitive member 1 is removed by masking, etching, solvent, etc. to expose the electrode 7d. In this case, unlike the cases of (c) and (d), it is necessary to correct in advance the difference of maximum potential on the electrostatic information recording medium caused by the difference of gap distance according to Paschen's law on discharge.

Next, description is given on the method to form the non-exposed portion 153 in connection with FIGS. 9 (f)–(i).

In FIG. 9 (f), a light screening unit 157 is masked on the surface of the electrode support member. When such photosensitive member is placed face-to-face to the electrostatic information recording medium and exposure is performed, the portion facing to the light screening unit 157 is not exposed to light, and minimum potential corresponding locally to dark current is generated on the electrostatic information recording medium.

In FIG. 9 (g), a part of the transparent electrode is masked by aluminum to make it non-transparent, and minimum potential is generated as in FIG. 9 (f).

In FIG. 9 (h), non-transparent portion is formed on a part of the support member by aluminum vapor deposition and transparent electrode is evaporated on it, and minimum potential is generated as in the case of FIGS. 9 (f) and (g). In this case, it is necessary to decrease the film thickness obtained by vapor deposition in comparison with the thickness of the photosensitive member.

In FIG. 9 (i), a portion 161 lacking photoconductive property, i.e. non-photoconductive portion, is formed on a part of the photoconductive layer so that carriers are not generated even when irradiated by light. On the non-photoconductive portion, the carrier injection from the electrode occurs in the same degree as on the photoconductive layer in dark state. The transport property of the injected carriers occurs in the same degree as on the photoconductive layer in dark state. Any material can be used if it is not photoconductive to wavelength of the light for exposure. In other words, any material will do if it gives the same effect as the photoconductive layer in non-exposed state even when it is exposed to light. As an example such material, PVK/TNF may be used as the photoconductive layer, or PVK is used as non-photoconductive portion, or the portion not containing electric charge generating agent on a part of electric charge generation layer is furnished on the function-separated type photosensitive member, where electric charge generation layer and the electric charge transport layer are laminated, to provide non-photoconductive portion. Also, it is possible to use insulating polymer material with adjusted resistance value.

When it is supposed that maximum potential and minimum potential on the electrostatic information recording medium are A and B respectively as given in FIG. 9 (b) in case the exposed portion and the non-exposed portion are provided using such photosensitive member, the potential of the portion where the image is recorded will take the value between A and B. The fluctuation of initial image voltage caused by the property of photosensitive member, thickness, applied voltage, and environmental conditions can be easily corrected if the potential on the exposed portion and the non-exposed portion is measured. In case the image potential is decreased due to the changes over time, the potential on the exposed portion and the non-exposed portion is also attenuated. Therefore, the potential of the exposed portion can be easily corrected by measuring the potential on the exposed portion and the non-exposed portion in advance. The above description has been given on an example where both the exposed portion and the non-exposed portion are provided, whereas one of them will suffice.

Figure 10:
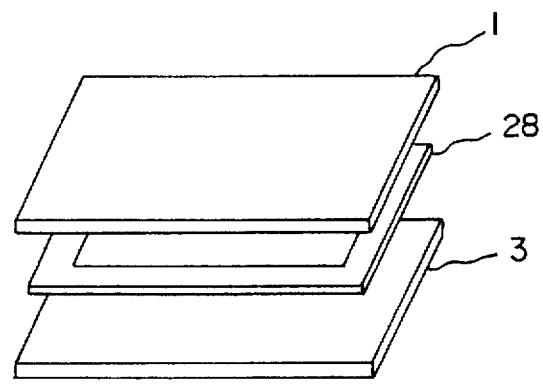
FIG. 10 is a schematical drawing of the electrostatic information recording apparatus of this invention.

In the electrostatic information recording system according to the present invention, a photosensitive member 1 is laminated on a electrostatic information recording medium 3 in opposite relation through or not through a spacer 28, as illustrated in FIG. 10. With a voltage impression type of switch (not shown), charges are accumulated on the insulating layer depending upon the quantity of incident light to form an incident optical image on the charge-retaining layer.

Where the spacer is used, the space between the photosensitive member and the electrostatic information recording medium is suitably in a range of 1 to 50 µm. The spacer may be formed of an organic material such as plastics or an inorganic material such as glass and laminated in place with an insulating solvent such as silicone oil.

Referring to possible exposure manners, planar exposure may basically be applied. However, scanning exposure recording may also be possible with, e.g., laser. For laser recording systems, argon laser (514, 488 nm), helium-neon laser (633 nm) or semiconductor laser (780 nm, 810 nm, etc.) may be used as the light sources. Voltage is then applied with the photosensitive member being brought in close planar contact with or in opposition to the electrostatic information recording medium at a constant interval. In this case, the electrode may be of the same polarity as that of the carrier of the photosensitive member. In that state, laser exposure corresponding to picture image, character, cord or line signals is carried out by scanning. Analog recording for information such as picture images is carried out by the modulation of the light intensity of laser, while digital recording for characters, cords or line pictures is effected by the on-off control of laser beams. Dotted imaging may also be carried out under the dot generator on-off control of laser beams. It is noted that the spectral properties of the photoconductive layer in the photosensitive member need not be panchromatic, and may be sensitive to the wavelength of the laser beam source.

Figure 11:
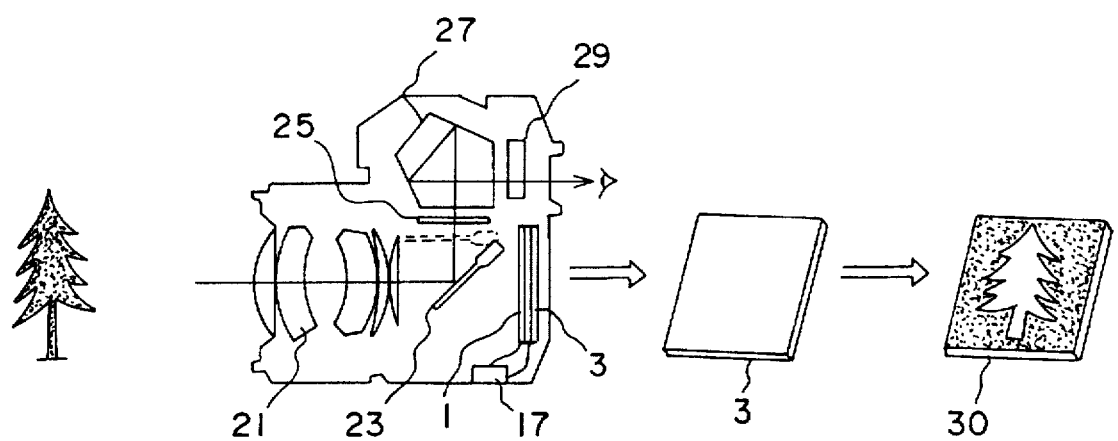
FIG. 11 is a drawing to show approximate configuration when the electrostatic information recording apparatus is used as an electrostatic camera.

A schematic view of an electrostatic camera to which the electrostatic information recording system of the present invention is applied is illustrated in FIG. 11, in which reference numerals common to FIG. 10 stand for like parts. It is noted that reference numeral 21 denotes a photographing lens, 23 a mirror, 25 a focusing screen, 27 a pentagonal prism, 29 an eye lens and 30 a negative image.

In this electrostatic camera, the photosensitive member 1 and electrostatic information recording medium 3, shown in FIG. 1, are used in place of films for signel-lens reflex cameras. Upon a power source 17 put on or off with a switch not shown, the mirror 23 is jumped up to a position shown by a dotted line to form an electrostatic latent image of a subject on the electrostatic information recording medium 3. If required, the toner development of the electrostatic information recording medium gives the negative image 30. The electrostatic potential may also be read to produce electrical signals for display on CRT₃ or recording on other recording medium such as magnetic tapes.

Next, description is given on the method to form color image using color filter.

A prismatically optical system for color separation is illustrated in FIG. 12 (a), wherein reference numerals 71, 73 and 75 stand for prisms, 77, 79 and 81 filters and 83 and 85 reflectors.

The prismatically optical system for color separation comprises three prismatic blocks. Optical information incident from a plane a of the prismatic block 71 is partly separated and reflected from a plane b and then reflected from the plane a to obtain an optical component of B color through the filter 77. The rest of the optical information is incident on the prismatic block 73 and reaches a plane c from which it is partly separated and reflected. Another portion reaches directly the filters 79 and 81 from which optical components of G and R colors are obtained. The optical components of G and B colors may then be reflected from the reflectors 83 and 85 to obtain the R, G and B light components in the form of parallel light beams.

FIG. 12 (b) is a schematical drawing of a 3-plane division optical system, in which Pr and Pb represent prisms, Mr and Mb represent total reflection planes, Dr and Db represent dichroic mirrors, and Ir, Ib and Ig are image forming planes.

Now, description is given on 3-plane division optical system. The prism Pr has a total reflection plane Mr and is furnished in an optical path of blue light. Dichroic mirror Db is provided in good balance with the total reflection plane Mb and reflects blue light and transmits red light and green light. The dichroic mirror Dr is provided in good balance with the total reflection plane Mr, reflects red light, and transmits green light and blue light. By extending the optical path of red light by prism Pr and the optical path of blue light by prism Pb, the optical image of red color component of the object, formed on the image forming plate Ir, and the optical image of blue color component of the object, formed on the image forming plane Ib, are formed on the same plane as the optical image of green color component of the object, formed on the image forming plate Ig, in form of a straight line at the positions closer to each other.

By disposing such a filter 91 in front of the photosensitive member 1 for photographing as illustrated in FIG. 13 (a), one frame may be formed either by three sets of electrostatic information recording media separated into the R, G and B colors, as shown in FIG. 13 (b), or by a set of R, G and B images formed on one plane, as illustrated in FIG. 13 (c).

Description is now given on color filter.

Figure 14:
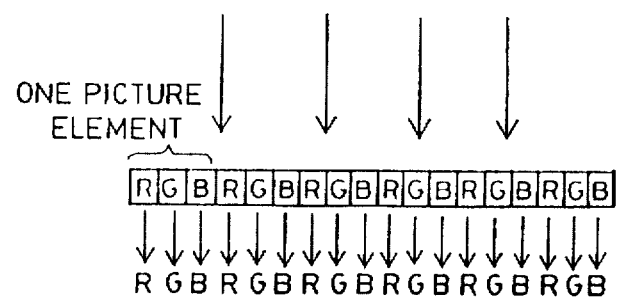
FIG. 14 is a drawing illustrating an example of the fine color filter.

FIG. 14 is a fine color filter. For instance, this may be formed, e.g., by exposing a resist-coated film to light through a mask pattern to form striped patterns of R, G and B, which are then dyed in R, G and B; passing the light components separated with the system of FIG. 12 through fine slits to obtain interference fringes of R, G and B, which are then recorded in a hologram recording medium; or exposing a photoconductor to light while a mask is brought in close contact therewith to form striped patterns of R, G and B defined by electrostatic latent images, which are then toner-developed and transferred three times for color compounding, thereby forming toner stripes. In the filter formed as mentioned just above, a set of R, G and B forms one picture element as fine as about 10 μm. If this filter is used as the filter 91 of FIG. 13, it is then possible to form an electrostatic latent image broken down into colors. In this case, the filter may be spaced away from or made integrate with the photosensitive member.

Figure 15:
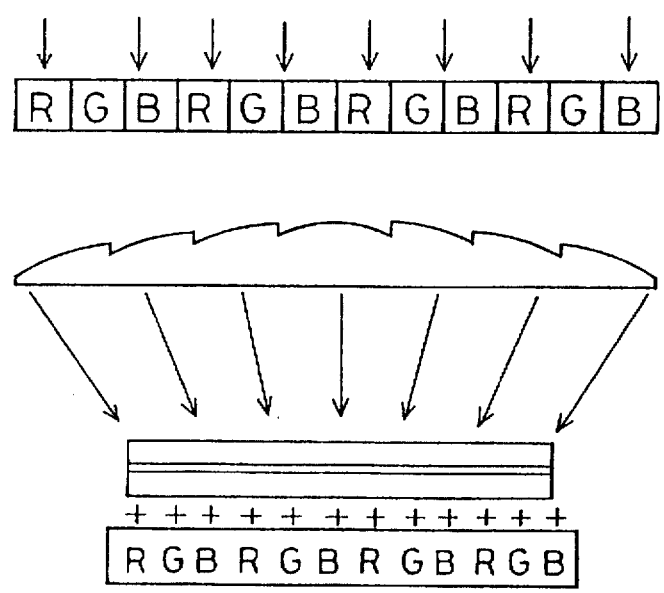
FIG. 15 is a drawing showing an example, in which the fine color filter and a Fresnel lens are combined together.

FIG. 15 is a view showing an example of a combination of the fine color filter with a Fresnel lens, in which patterns R, G and B can be reduced in size by the Fresnel lens for recording and a lens design may be made more compact and thinner than conventional lens designs.

Figure 16:
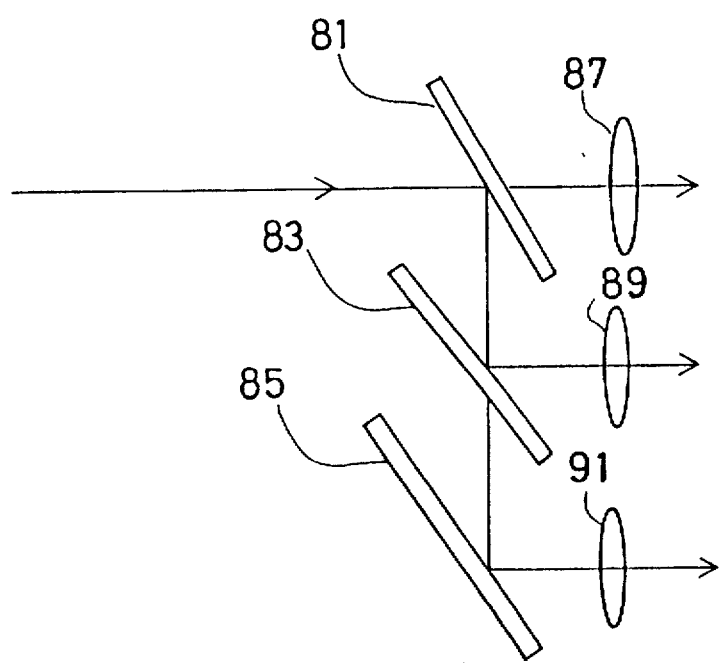
FIG. 16 is a drawing giving 3-plane division by the simultaneous use of ND filter and the filters for R, G and B.

FIG. 16 is a view showing an example of three-plane splitting in which an ND (natural density) filter is used in combination with R, G and B filters. Indicent light is split into three portions through ND filters 81 and 83 and a reflector 85, which are then allowed to pass through an R filter 87, a G filter 89 and a B filter 91 to obtain R, G and B components of light as parallel light beams.

Also, it is possible to use normal holographic color filter as color filter. For example, a filter can used, by which interference fringes are formed and recorded by irradiating two beams consisting of monochromatic light to the photosensitive material from the same side or from opposite side and on which interference fringes are recorded to that the diffraction wavelength by two beams is turned to 3 primary colors by providing a mask on one side of the photosensitive material and by deviating the mask position sequentially. Further, 3 primary colors may be recorded by using the light of the same wavelength and by changing the thickness of the photosensitive material by chemical processing before or after the exposure.

In this case, at least one of two beams irradiated from the same sides or from the opposite sides may be irradiated diagonally to the photosensitive material.

Further, the interference fringes where diffracwavelength of two beams becomes 3 primary colors may be recorded by changing the irradiation angle to the photosensitive material for each exposure without using the mask, or two beams may be a combination of divergent light and convergent light.

According to this holographic color filter, when two beams of each of 3 primary colors are irradiated from the opposite side of the photosensitive material, of which a mask is disposed on one side and interference fringes are formed and recorded, the primary diffraction light of R, G and B is obtained during reproduction, and the light of C, M and Y is obtained as transmission light. The light of R, G and B can form the image on off-line basis by releasing it in lateral direction using half mirror or by inclining the irradiation angle of the light during exposure. Also, when interference fringes are formed and recorded by irradiating 3 primary colors to the same photosensitive material through mask from the same side to the photosensitive material, the light of R, G and B can be obtained as the transmission primary diffraction light, and only the light of the predetermined direction can be selected by simultaneously using venetian blind. The primary diffraction light can be obtained in different direction for each of 3 primary colors through the formation of interference fringes by irradiating at different angles for each of 3 primary colors. The holographic color filter thus formed can be easily manufactured because single development process will suffice. This results in low cost production, and the diffraction light of pure color can be obtained.

Now, description is given on the method to form such holographic color filter and the application to the electrostatic information recording and reproducing method.

Figure 17:
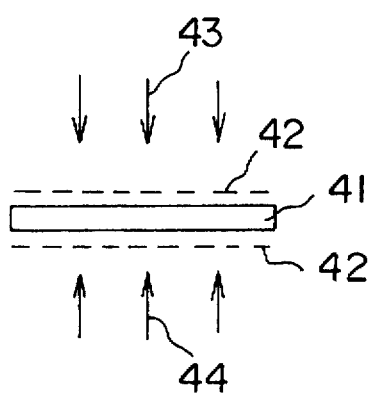
FIG. 17 is a drawing illustrating an embodiment of the manufacturing method of holographic color filter.
Figure 18:
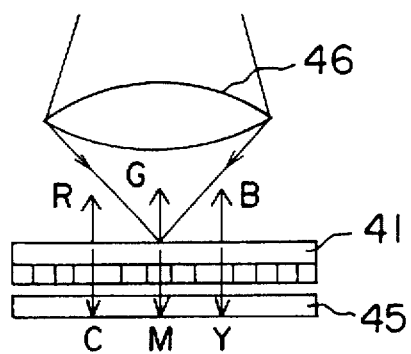
FIG. 18, FIG. 19 and FIG. 20 are the drawings showing the reproduction method of holographic color filter of FIG. 17.

FIGS. 17 and 18 are views showing one embodiment of the holographic color filter, in which reference numeral 41 stands for a photosensitive material, 42 a mask, 43 and 44 monochromatic light beams, 45 a photosensitive material and 46 a lens.

As illustrated in FIG. 17, the mask 42 slitted, e.g., in the striped form is positioned in place on both sides of the photosensitive material 41, which is then irradiated with monochromatic light, e.g., R light from the opposite directions to record an interference pattern due to the R light. Then, interference patterns are recorded in superposed relation by G light with the mask 42 displaced by a given distance and then B light with the mask 42 similarly displaced by a given distance. Subsequent development of the interference patterns thus subjected to triple exposure gives a color hologram.

Then, while the formed color hologram 41 is brought in close contact with the photosensitive material 45, it is irradiated with light through the lens 46 from the opposite direction, as illustrated in FIG. 18. Thereupon, the reflected light beams of R, G and B are obtained as regenerated light beams, while the transmitted light beams of C, M and Y are obtained as the complementary colors of R, G and B. Obtained in this case is a striped color filter in which one picture element is defined by R, G and B.

In the instant embodiment, only one development is need for each R, G and B. And, since R, G and B are in principle subjected to total reflection with no possibility of color mixing, it is possible to obtain the transmitted light beams of pure C, M and Y and use the holographic color filter at 100% efficiency.

Figure 19:
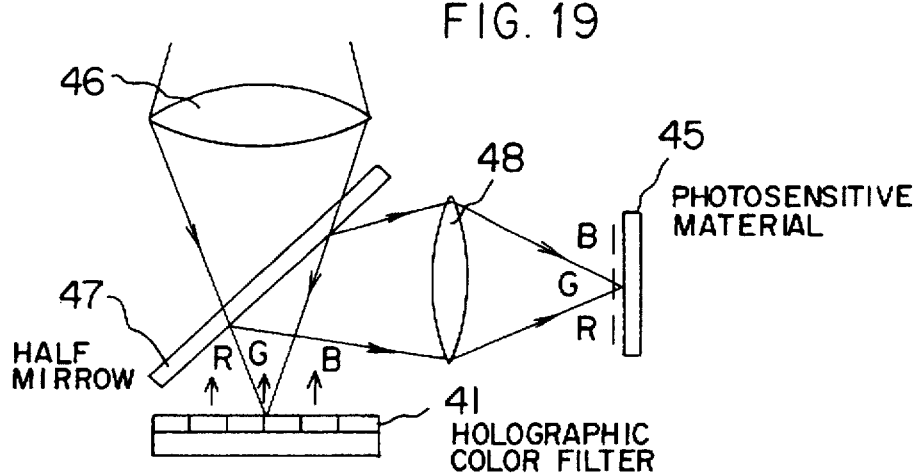

FIG. 19 is a view showing another embodiment. Throughout FIGS. 17-19, the same parts are indicated by the same reference numerals. It is noted, however, that 47 and 48 stand for a half mirror and a lens, respectively.

In the instant embodiment, a holographic color filter is prepared in a similar manner as illustrated in FIG. 17 to make use of R, G and B light components appearing on the incident side.

The R, G and B light components, which appear on the incident side, cannot be used as such. For that reason, they are guided sideways by the half mirror 4 and condensed for use. More exactly, upon light striking upon the hologram 41 through the lens 46, R, G and B light components are reflected from the hologram 41 and then the half mirror 47 to form R, G and B images on the photosensitive material 45 under the condensing action of the lens. It is here to be noted that the lens 48 is used for condensing purposes, since the photosensitive material 45 cannot be brought in close contact with the film, unlike the system of FIG. 18.

Figure 20:
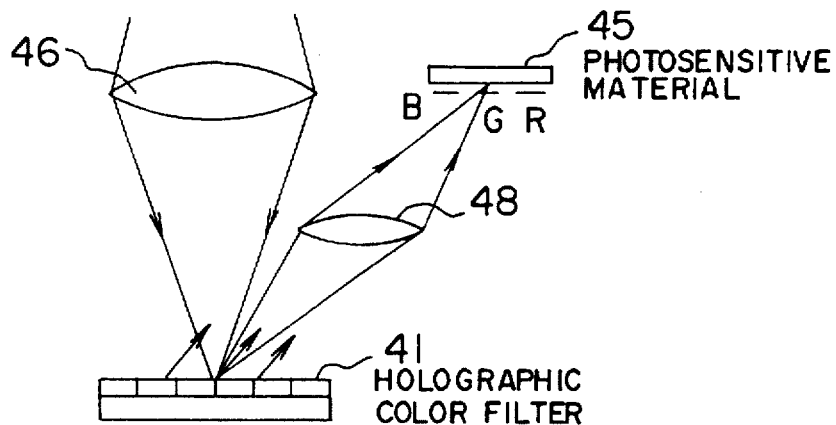

FIGS. 20 and 21 are views showing still another embodiment. Throughout FIGS. 19 to 21, like reference numerals stand for like parts.

In the embodiment of FIG. 19, the use of the half mirror 47 leads to light losses, so that the resulting images tend to become dim. In the instand embodiment, therefore, one monochromatic light is caused to be obliquely incident so as to form a hologram. Upon light striking upon a holographic color filter comprising this hologram, R, G and B light components are reflected therefrom at angles. Hece, the R, G and B light components are deflected sideways for focusing on the photosensitive material 45.

FIGS. 22 and 23 are views illustrating a further embodiment, wherein each of R, G and B is exposed to light to form a holographic color filter.

As illustrated in FIGS. 23 (a), (b) and (c), a holographic color filter is subjected to triple exposure with R light, G light and B light. As illustrated, this holographic color filter is then irradiated with the light through a lens 46, whereby R, G and B images can be formed on an off-line. In other words, the R, G and B images are reflected in different directions, as shown in FIG. 14, whereby they can be formed on the respective photosensitive materials 45a, 45b and 45c.

Figures 25A, 25B:
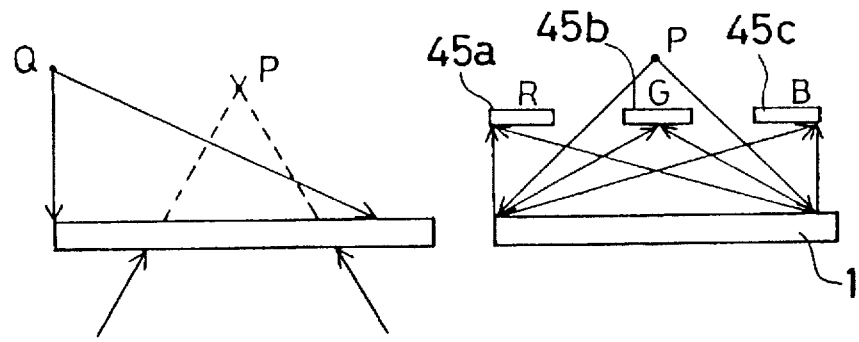
FIG. 25 is a drawing illustrating the exposure method by divergent and convergent lights.

It is understood that in the exposure system of FIG. 23, monochromatic light diverging from a point P may be focused on a point Q by the interference of monochromatic light condensing at the point P with the monochromatic light diverging from the point Q, as illustrated in FIG. 25 (a). It is thus possible to form the R, G and B images on the photosensitive materials 45a, 45b and 45c in a lensless manner by varying the point Q for each R, G and B light to form interference fringes as illustrated in FIG. 25 (a), whereby the filter is irradiated with the light diverging from the point P, as shown in FIG. 25 (b).

With a system of such a structure as illustrated in FIG. 25, a lenslike action can be imparted to a holographic color filter. When this holographic color filter is applied to the electrostatic information recording and reproducing processes of the present invention, it is possible to increase the dosage per unit area and condense light with high resolution, thus making high-quality recording possible. The foregoing refers to a reflection type of holographic color filter. In what follows, reference will now be made to a transmission type of holographic color filter.

Figure 26:
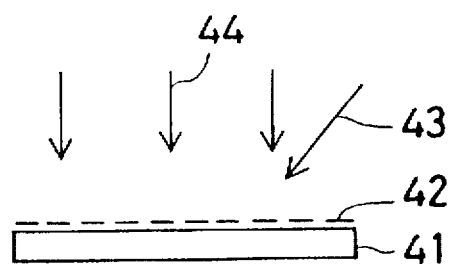
FIG. 26 is a drawing illustrating a further embodiment of the method to prepare the holographic color filter.

As illustrated in FIG. 26, monochromatic light beams 43 and 44 are caused to be incident on a photosensitive material 41 with the given angles being made therebetween. With a mask 42 displaced for each R, G and B, interference fringes are recorded in the photosensitive material 41 to form a holographic color filter.

Figure 27:
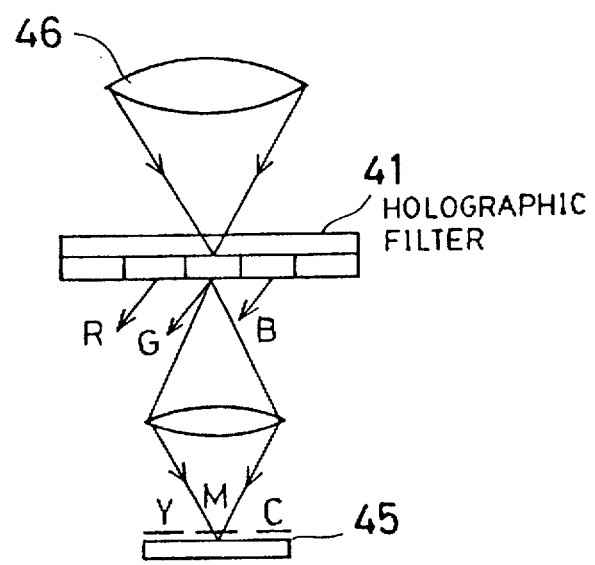

FIG. 27 is a view showing an example of the thus prepared transmission type of holographic color filter making use of zero-order light.

In the instant embodiment, primary diffracted light beams of R, G and B are generated in the same direction as the incident light 43, so that zero-order light beams of C, M and Y are obtained as transmitted light beams, which may then be focused on a photosensitive material 45 to form a color image.

FIG. 28 is a view showing a further embodiment of the present invention, wherein the primary diffracted light beams of R, G and B of FIG. 27 are designed to be focused on a photosensitive material 45 through a lens 48.

FIG. 29 is a view showing a further embodiment of the present invention using a Venetian blind, wherein a holographic color filter 41, a Venetian blind 50 and a photosensitive material 45 are brought in close contact with one another to make use of diffracted light in a predetermined direction. The Venetian blind 50 is only transparent to light in its crystal direction and serves to select only zero-order transmitted light or primary diffracted light to form an image defined by such light on the photosensitive material 45.

Figure 31:
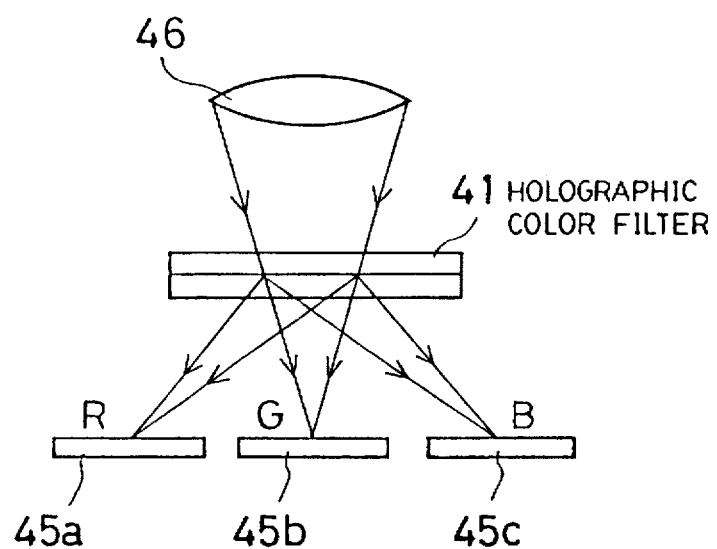
FIG. 31 is a drawing illustrating the reproduction method of holographic color filter of FIG. 30.

FIG. 30 is a view showing a further embodiment wherein a photosensitive material 41 is subjected to triple exposure with monochromatic light beams of R, G and B from the same direction, as shown in FIGS. 30 (a), 30 (b) and 30 (c). In this case, the angles of both beams of each monochromatic light are varied, as illustrated in FIG. 31, whereby the transmitted primary diffracted light components of R, G and B are separated during the irradiation of light.

Figure 32:
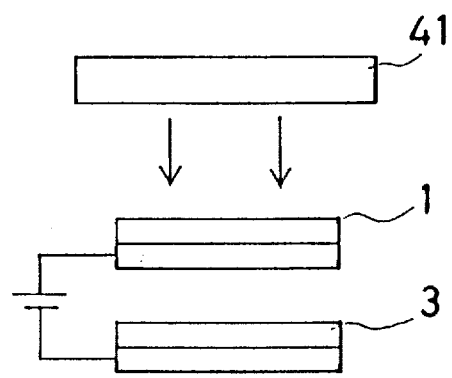
FIG. 32 is a drawing illustrating an example applying the electrostatic information recording and reproducing method of this invention.
Figure 33A:
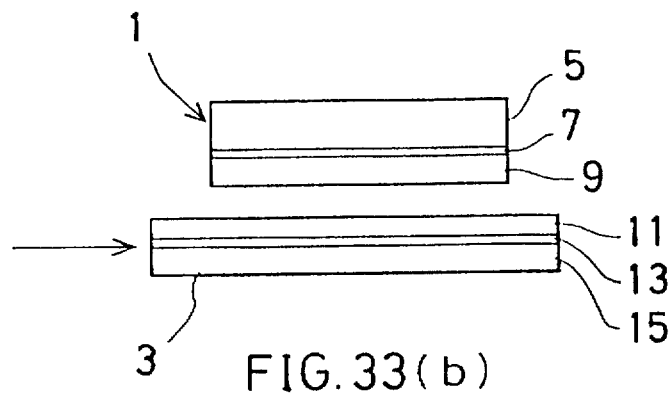
FIG. 33 is a drawing to explain the electrostatic information recording and reproducing method of this invention.
Figure 33B:
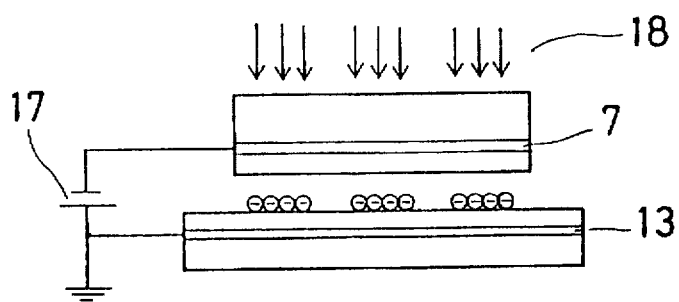
Figure 33C:
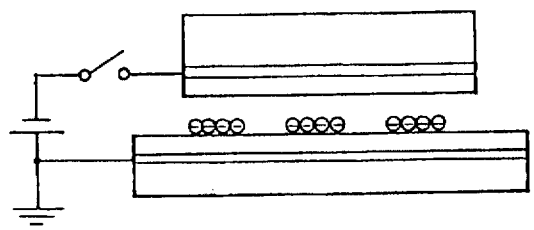
Figure 33D:
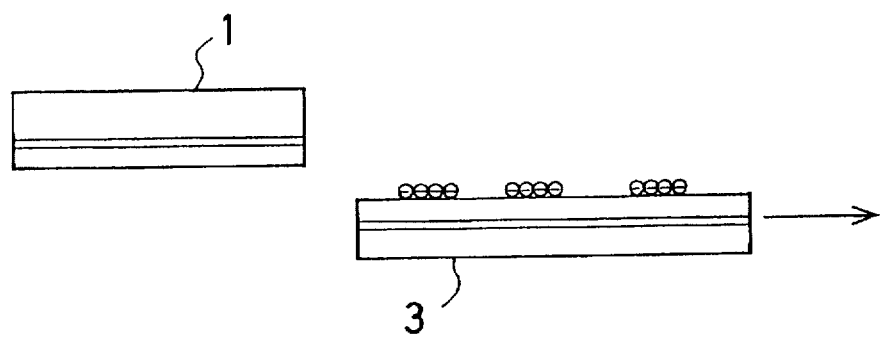

FIG. 32 is a view illustrating the application of a holographic color filter to the electrostatic information recording and reproducing processes of the present invention. If the photosensitive member 1 is exposed to light through this holographic color filter, it is then possible to increase the dosage per unit area and hence obtain sufficient brightness, and conduct color exposure of high resolution with the application of voltage.

Reference will now be made to the electrostatic information recording process according to the present invention.

This process is illustrated in FIG. 33 in which reference numeral 1 denotes a photosensitive member 1, 3 an electrostatic information recording medium, 5 a support, 7 an electrode, 9 a photoconductive layer, 11 a charge retaining layer (an insulating layer), 13 an electrode, 15 a support and 17 a power source.

In the embodiment of FIG. 33, exposure is carried out from the photosensitive member 1. The photoconductive layer support 5 formed of 1 mm thick glass is first provided thereon with the transparent electrode 7 formed of 1000 Å thick ITO, on which the photoconductive layer 9 of about 10 µm in thickness is formed to obtain the photosensitive member 1. With respect to this photosensitive member 1, the electrostatic information recording medium 3 is arranged through a gap of about 10 µm. The electrostatic information recording medium 3 is obtained by the vapor deposition of an aluminium electrode of 1000 Å in thickness on the insulating layer support 15 formed of 1 mm thick glass, followed by the formation of a 10 µm thick charge retaining layer (an insulating layer) on that electrode.

As illustrated in FIG. 33 (a), the recording medium 3 is first arranged with respect to the photosensitive member 1 through a gap of about 10 µm. Then, voltage is applied from the power source 17 between the electrodes 7 and 13, as illustrated in FIG. 33 (c). Since the photoconductive layer 9 is a high resistor in a dark place, no change takes place between the electrodes, if the voltage applied to the gap is lower than the firing voltage according to the Paschen's law. As a voltage higher than the firing voltage is applied to the gap from an external power source, discharge occurs to build up charges on the surface of the electrostatic information recording medium and that state continues until the firing voltage is reached, thus resulting in a background potential. When light 18 is incident from the photosensitive member 1, a portion of the photoconductive layer 9, on which the light strikes, is made so electrically conductive that discharge takes place through the air layer to accumulate charges on the electrostatic information recording medium. If microparticles of photoconductivity and electrical conductivity are incorporated in the charge retaining layer, information-bearing charges migrate into such microparticles by an electric field defined by the built-up charges and, optionally, by exposure, and are then stabilized in the insulating layer. Even when there are previously uniform background charges further accumulation of charges takes place on the portion of the photoconductive layer 9 on which the light strikes. After the completion of the exposure, the voltage is shut off as illustrated in FIG. 33 (c), and the electrostatic information recording medium 3 is then removed out, whereby the formation of an electrostatic latent image is completed.

The photosensitive member 1 may be brought in contact (as mentioned above) or no contact with the electrostatic information recording medium 3. In the contact type system, positive or negative charges are injected from the electrode 7 of the photosensitive member into the portion of the photoconductive layer 9 exposed to light. While attracted by the electrode 13, the injected charges pass through the photoconductive layer 9 and reach the surface of the insulating layer 11 where they stop and are accumulated. Then, with the photosensitive member 1 separated from the electrostatic information recording medium 3, the insulating layer 11 is separated while the charges remain accumulated thereon.

The voltage applied and exposure time are arbitrarily determined where the quantity of incident light is in proportion to the amount of charge transfer and before the amount of charge transfer is saturated. In the present invention, however, it is preferred that a voltage of 100 V to 2000 V is applied as a voltage shutter for $10^{-6}$ to 10 seconds so as to achieve electrostatic recording of high sensitivity. With the first and second electrostatic recording media, electrostatic information may be recorded in this manner.

Figure 34A:
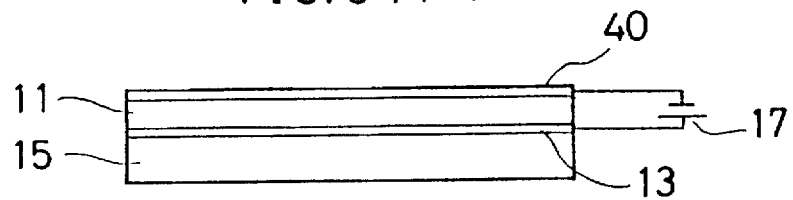
FIG. 34 is a drawing to explain the electrostatic information recording method to thermal electret.
Figure 34B:
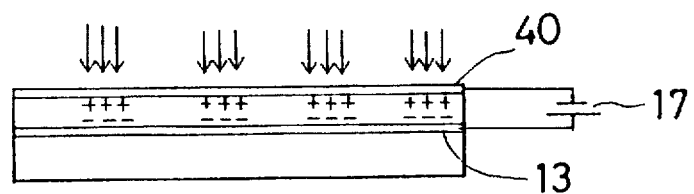
Figure 34C:
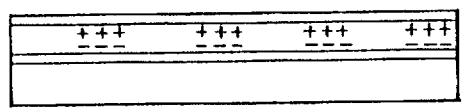

In order to record information in a photoelectret that is the third electrostatic information recording medium, a transparent electrode 40 is superposed on the surface of a phtosensitive layer of the electret in contact or non-contact relationship, as shown in FIG. 34 (a). Upon exposed to light with the application of voltage as shown in FIG. 34 (b), charges are generated by light from the exposed region and polarized by an electric field. Even when the electric field is removed off, the charges remain trapped in that position, as illustrated in FIG. 34 (c). Thus, an electret corresponding to the dosage is obtained. It is noted that this electrostatic information recording medium is advantageous in that any separate photosensitive member is not needed.

Figure 35A:
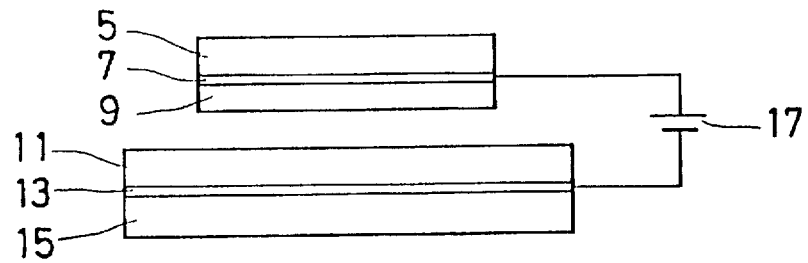
FIG. 35 is a drawing to explain the electrostatic information recording method to optical electret.
Figure 35B:
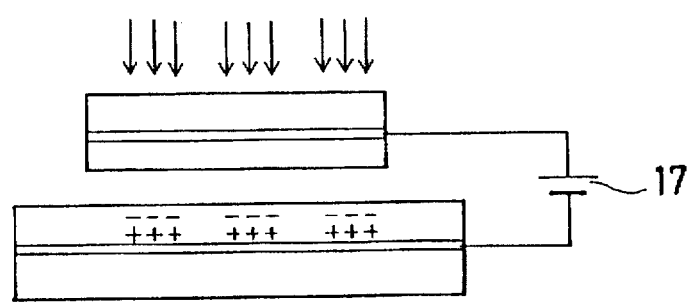
Figure 35C:
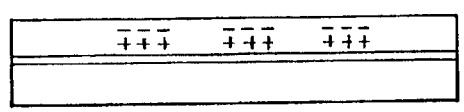
Figure 36A:
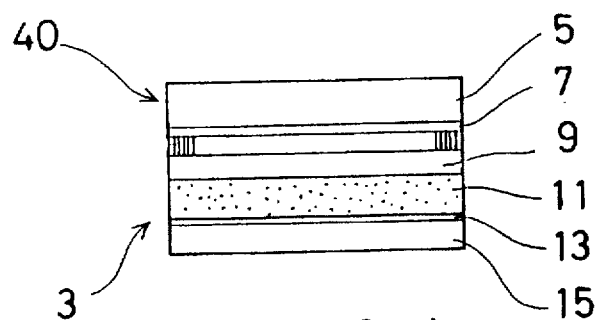
FIG. 36 and FIG. 37 are the drawings to explain the electrostatic information recording method for the sixth electrostatic information recording medium of this invention.
Figure 36B:
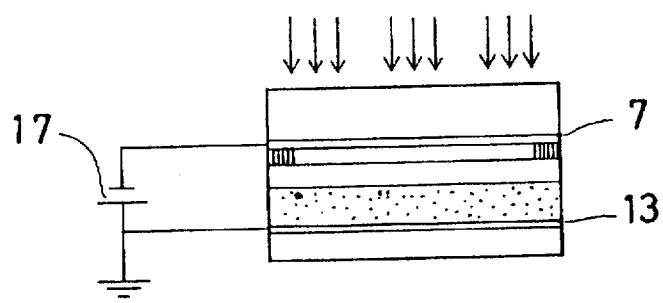
Figure 36C:
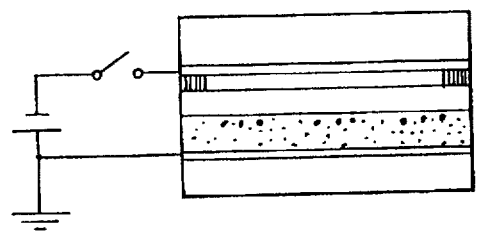
Figure 36D:
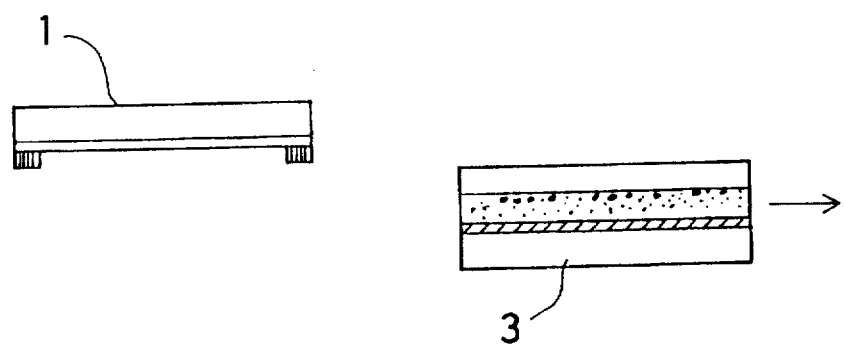

In order to record information in a thermoelectret, it is heated to a temperature higher than the glass transition temperature of the material forming it by resistance heating or other suitable means prior to exposure, as shown in FIG. 35. In that state, the electret is exposed to light with the application of voltage, as illustrated in FIG. 35 (b). At high temperatures, the mobility of ions is so increased that a high electric field is applied to an insulating layer in the exposed region. Of the thermally activated ions, negative and positive charges are attracted to the positive and negative electrodes, respectively, thereby forming space charges for polarization. Subsequent cooling of the medium allows the generated charges to be trapped in such positions, even when the electric field is removed off, thus yielding an electret corresponding to the dosage, as shown in FIG. 35 (c).

Referring to the fourth and fifth electrostatic information recording media wherein microparticles are photoconductive, the recording media are exposed on their overall surfaces to light after exposed to information-bearing light, as is the case with the first recording medium, whereby information-bearing charges can be stably retained in the microparticles.

Figure 37A:
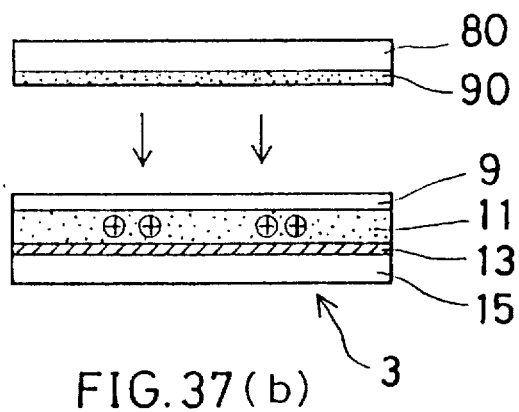
Figure 37B:
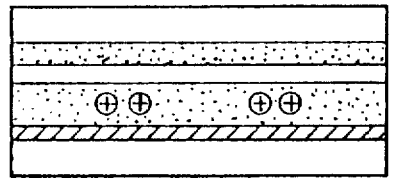
Figure 37C:
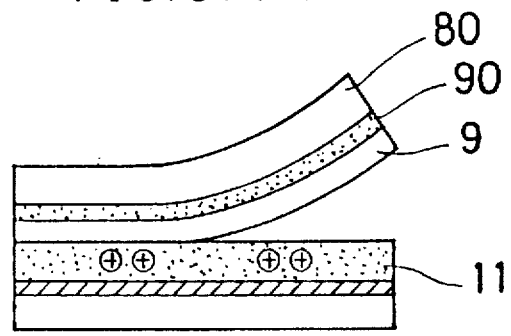

Referring to the sixth electrostatic information recording medium, it is exposed to information-bearing light while located in opposition to a transparent electrode 40, as illustrated in FIG. 36. When a photoconductive layer 9 is to be laminated on the recording medium, however, information is first recorded in the electrostatic information recording medium. Then, a plastic film 80 coated with, e.g., an adhesive agent 90 is applied on the photoconductive layer 9, as shown in FIG. 37. By releasing the plastic film 80, the photoconductive layer 9 is bonded to the plastic film adhesive layer to release a charge retaining layer as shown in FIG. 37 (c), thereby stabilizing information-bearing charges. This is because the information-bearing charges tend to diffuse through the photoconductive layer with the lapse of time.

Figure 38A:
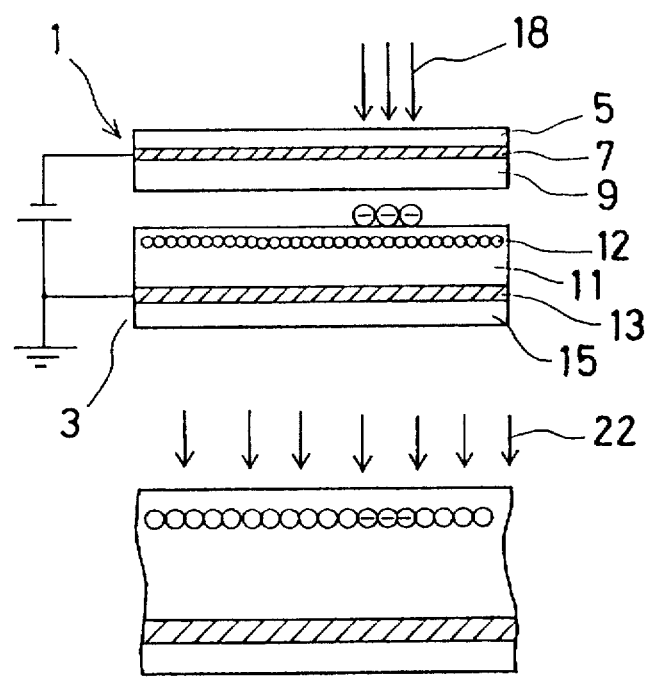
FIG. 38 and FIG. 39 are the drawings to explain the information recording method to the electrostatic information recording medium according to the present invention, in which the electrostatic information is converted to the position information.
Figure 38B:
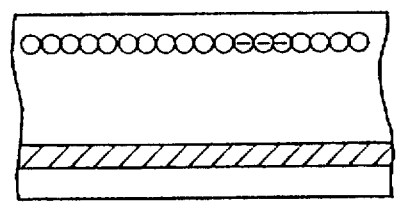
Figure 38C:
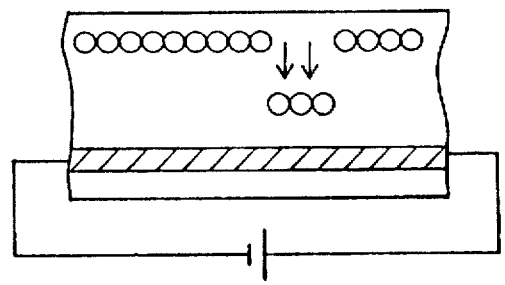
Figure 39A:
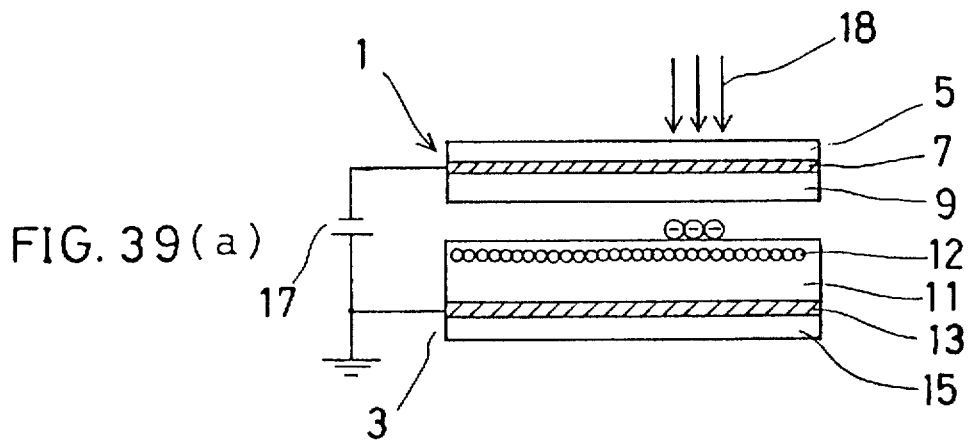
Figure 39B:
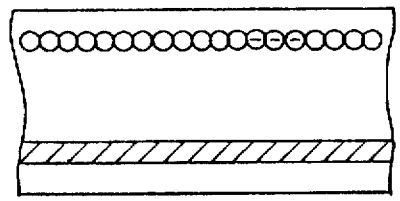
Figure 39C:
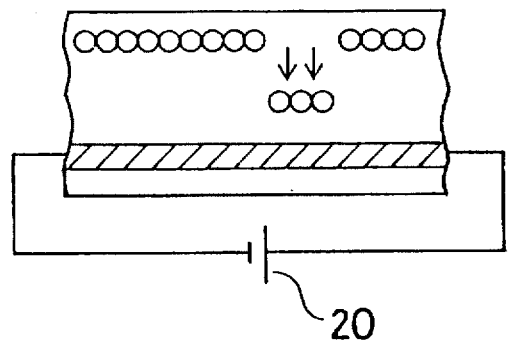

Reference will now be made to a specific embodiment of the electrostatic information recording process wherein electrostatic information is recorded as the positional information of fineparticles and played back as the electrostatic information. FIG. 38 is a view for illustrating an electrostatic information recording step in which the fineparticles used are photoconductive, and FIG. 39 shows an electrostatic information recording step in which electrically conductive microparticles are used according to the present invention.

Referring to an electrostatic information recording medium 3, an aluminium electrode of 1000 Å in thickness is vapor-deposited on a support 15 of 1 mm thick glass, and is then provided thereon with a resinous layer 19 containing a 10 μm thick charge transporting material, below which a photoconductive particulate layer 12 having a particle size of about 1 μm is spaced about 1 μm apart.

As illustrated in FIG. 38 (a), the electrostatic information recording medium 3 is arranged with respect to a photosensitive member 1 through a gap of about 10 μm, and voltage is applied between electrodes 7 and 13 to obtain polarity reverse to the transport polarity of the charge transport material contained in the resinous layer 19. Upon light 18 being incident from the photosensitive member 1, a portion of a photoconductive layer 9, upon which the light strikes, is made so electrically conductive that discharge takes place between it and the resinous layer 19, resulting in the accumulation of charges on the surface of the resinous layer 19. Even when there are previously uniform background charges, further storage of charges occurs on the portion on which the light strikes. Subsequently, a power source 17 is put off, and the electrostatic information recording medium 3 is released from the photosensitive member 1 and exposed on its overall surface to light, as shown at 22. Thereupon, electron and positive hole carriers are generated in particles 12 in the portion exposed to light, and are in turn caused to migrate by a high electric field defined by surface charges, so that the opposite charges are neutralized and stably stored in the particles 12 as the information-bearing charges. Referring then to FIG. 38 (c), when the electrostatic information recording medium is subjected to resistance heating or the resinous layer 19 is heated and softened by other suitable means, the particles having the information-bearing charges migrate toward the electrode substrate, in which they remain confined by the curing of resin, so that the information-bearing charges in the particles are converted to positional information.

The use of an electrically conductive material will now be explained with reference to FIG. 39.

Since the electrically conductive microparticles carry sufficient electrons and positive holes, unlike the photoconductive microparticles, no uniform exposure is needed. Stored on the electrically conductive particles are charges corresponding to surface charges. After the completion of the exposure, the particles are allowed to migrate by heating the resinous layer in a similar manner as mentioned above.

It is noted that the photosensitive member 1 may come in contact with the electrostatic information recording medium in contrast to the above non-contact arrangement. In this manner, the charges of the particulate layer 12 are fixed in the resinous layer in the form of positional information and stored over an extended period of time.

Figure 40A:
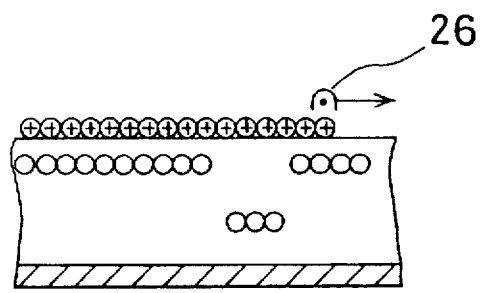
FIG. 40 is a drawing to explain the information reproducing method in the electrostatic information recording medium of this invention, in which the electrostatic information is converted to the position information.
Figure 40B:
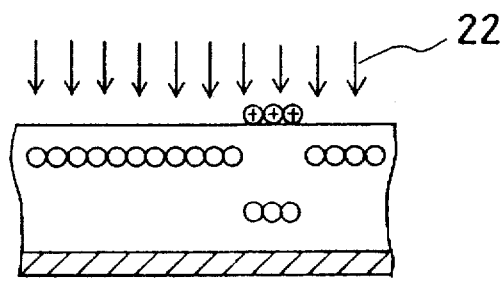
Figure 40C:
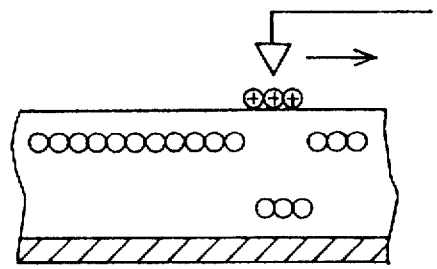

The present invention is characterized in that the positional information in the particulate layer is reproduced as electrostatic information. In order to reproduce the information stored as the position of the particles in the resinous layer in the case where the microparticles used are photoconductive, voltage polarity is first determined such that charges of the same polarity as that of the charge transport material in the electrostatic information recording medium are formed by corona electrical charging at 26, thereby electrifying the overall surface of the resinous layer in the recording medium, as illustrated in FIG. 40 (a). Then, the resinous layer is exposed on its overall surface to light shown at 22, as illustrated in FIG. 40 (b), whereby surface charges are accumulated on a region in which the information is stored, while carrier pairs of positive holes and electrons are generated in a region in which no information is stored, one charges serving to negative surface charges and the other charges migrating through the resinous layer and re-joining to the opposite charges of the electrode substrate, resulting in immediate erasion of the surface charges. Then, the surface charges of the region in which the information is stored are detected, as illustrated in FIG. 40 (c). Other means to form surface charges on the electrostatic information recording medium involves applying voltage to that recording medium through, e.g., opposite electrodes instead of applying corona electrical charging.

With the electrically conductive fineparticles, overall exposure may be dispensed with. The surface charges of the region in which no information is stored are erased by electrical conductivity, but the surface charges of the region in which the information is stored in the form of positional information may be easily reproduced as information-bearing charges.

How to read the information-bearing charges recorded in the electrostatic information recording medium will now be explained.

Figure 41:
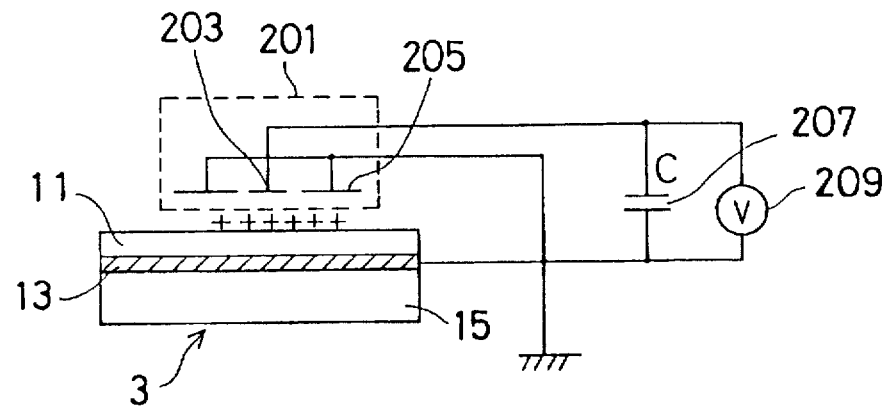
FIG. 41, FIG. 42 and FIG. 43 are the drawings to illustrate the potential reading method of DC amplifying type.

As an example, how to read potentials in the electrostatic information recording and playing-back processes according to the present invention is illustrated in FIG. 41 wherein the same parts as in FIG. 1 are indicated by the same reference numerals. It is noted that reference numeral 201 stands for a potential reader section, 203 a detection electrode, 205 a guard electrode, 207 a capacitor and 209 a voltmeter.

When the potential reader section 201 is located in opposition to the surface of an electrostatic information recording medium 3 on which charges are built up, the detection electrode 203 is subjected to an electric field defined by charges accumulated on a charge retaining layer 11 of the recording medium 3, thus generating on its surface induction charges in the amount equal to that of the charges on the recording medium 3. Since the capacitor 207 is charged with charges of polarity opposite to that of such induction charges in the same amount, there is a potential difference corresponding to the accumulated charges between the capacitor's electrodes, which is in turn read on the voltmete 209, thereby determining the potential of the charge retainer. Then, an electrostatic latent image can be produced in the form of electrical signals by scanning the surface of the electrostatic information recording medium with the potential reader section 201. It is noted that only with the detection electrode 203, there is a drop of resolving-power under the action of an electric field (an electric line of force) defined over a range wider than the region of the recording medium opposite to the detection electrode; hence, the guard electrode may be grounded around the detection electrode. According to such a system, since the electric line of force acts vertically to a plane, it can be obtained from only the region opposite to the detection electrode 203. Thus, it is possible to read the potential of a region having an area nearly equal to that of the detection electrode. Since the accuracy and resolving-power of potential reading vary largely depending upon the geometry and size of the detection and guard electrodes as well as the space between them and the electrostatic information recording medium, it is essentially required to design them while taking into account the optimum conditions to meet the performance demanded.

Figure 42:
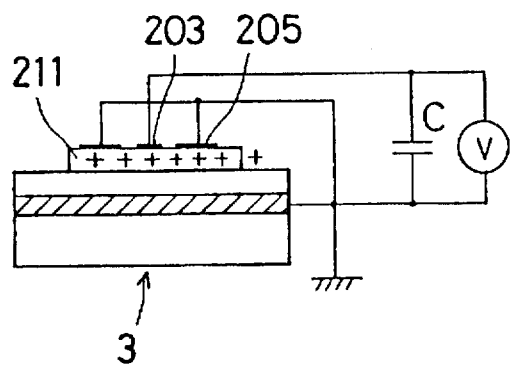

FIG. 42 illustrates another system to read potentials, which is similar to that illustrated in FIG. 41, provided that the potential is detected through an insulating protective film 211 on which the detection and guard electrodes are mounted.

According to this system designed to come in contact with the electrostatic information recording medium for the detection of potentials, it is possible to keep constant the space between the detection electrode and the recording medium.

Figure 43:
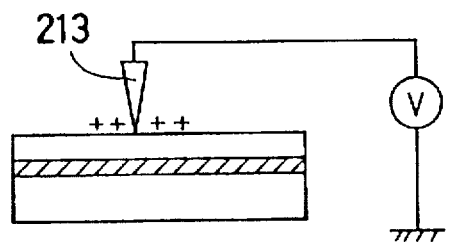

FIG. 43 is a view showing still another system of how to read potentials, wherein a needle-like electrode 213 is brought in direct contact with the electrostatic information recording medium to detect the potential of the region of contact. In this system, it is possible to obtain high resolving-power due to reductions in the area to be detected. Higher reading rates are also achievable by the provision of a plurality of needle-like electrodes.

The above systems are all of the DC amplification type designed to detect DC signals in contact or non-contact relation. In what follows, the AC amplification type of systems will now be explained.

Figure 44:
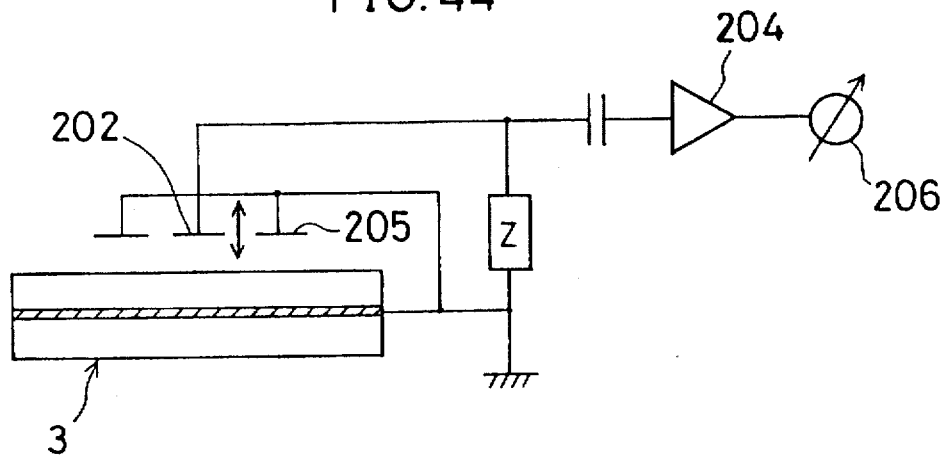
FIG. 44, FIG. 45 and FIG. 46 are the drawings showing the examples of the potential reading method of AC amplifying type.

FIG. 44 is a view for illustrating a vibration electrode type of potential reading system, wherein 202 is a detection electrode, 204 an amplifier and 206 a meter.

The detection electrode 202 vibrates and is driven such that as time goes by, it displaces with respect to a charged surface of an electrostatic information recording medium 3. As a consequence, a potential across the detection electrode 202 varies with time at an amplitude corresponding to the electrostatic potential of the charged surface. This potential change-with-time is then obtained in the form of a voltage change appearing across an impedance Z, and the AC component is in turn amplified by the amplifier 204 through a capacitor C to measure the electrostatic potential of the charged surface in terms of readings on the meter 206.

Figure 45:
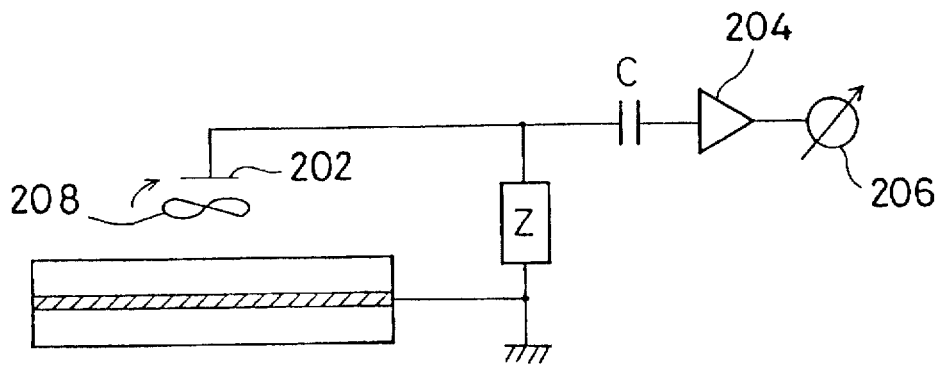

FIG. 45 shows an example of a rotary detector, wherein a rotary blade is indicated at 208.

Between an electrode 202 and a charged surface of an electrostatic information recording medium 3, there is the electrically conductive rotary blade 208 driven for rotation by driving means (not illustrated). As a result, the detection electrode 202 is periodically and electrically shielded relative to the electrostatic information recording medium 3. Potential signals varying periodically at an amplitude corresponding to the electrostatic potential of a charged surface is then detected by the detection electrode 202, and the AC component is in turn amplified by an amplifier 204 for reading.

Figure 46:
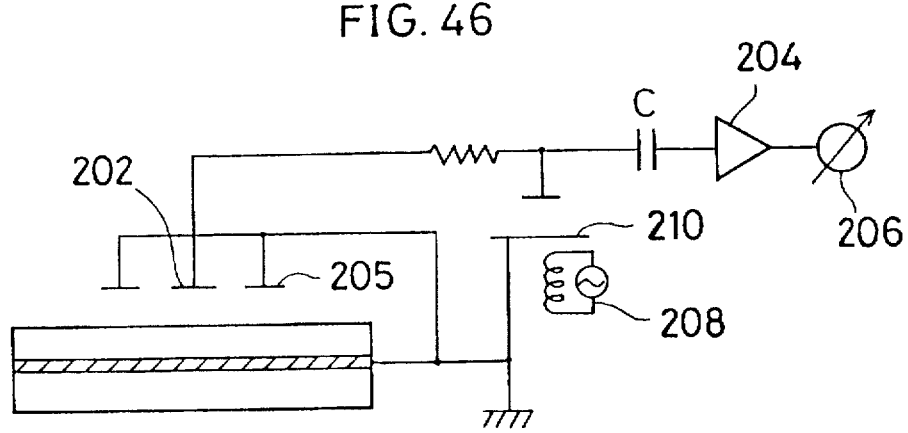

FIG. 46 illustrates an example of a vibrating-reed detector, wherein reference numerals 208 and 210 stand for a driving circuit and a vibrating reed, respectively.

The vibrating reed 210 of one electrode forming a capacitor is vibrated by the driving circuit 208 to change the capacitor's capacity. As a result, DC potential signals detected by the detector electrode 202 are modulated, and the AC component is then amplified and detected. With this detector designed to convert a direct current to an alternate current, it is possible to measure potentials with high sensitivity and satisfactory stability.

Figure 47:
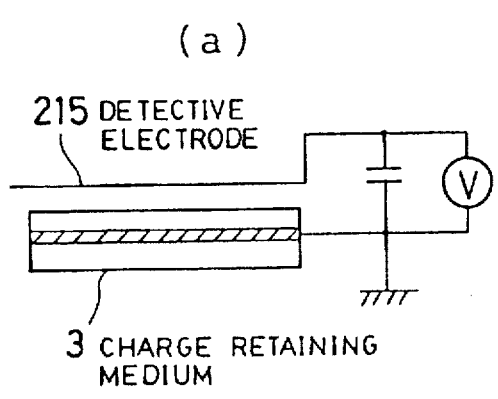
FIG. 47 and FIG. 48 are the drawings illustrating the examples of the potential reading method by CT scanning method.
Figure 47:
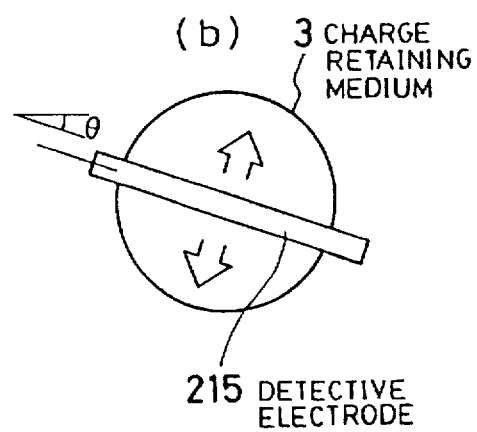

FIG. 47 is a view showing a further example of potential reading, in which potentials are detected by computed tomography (CT) with an elongate detector electrode.

Where a detector electrode 215 is located across and in opposition to a charge-accumulated surface, the data obtained are in the form of curvilinear integration values along the detector electrode. In other words, data corresponding to the CT data are obtained. Thus, the detector electrode is scanned on its overall surface as shown by an arrow in FIG. 47 (b) and at varied angles (θ) to gather the required data. The obtained data are then processed with CT algorithm, thereby determining a potential distribution on a charge retainer.

Figure 48:
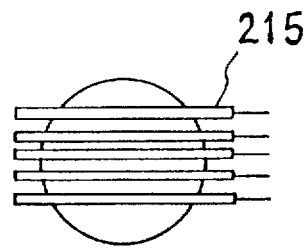

It is noted that if a plurality of detector electrodes 215 are arranged as shown in FIG. 48, then the data-gathering rates and hence the overall processing rates are improved.

Figure 49:
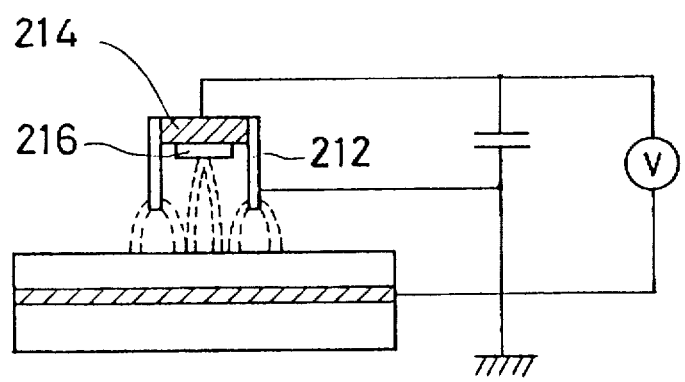
FIG. 49 is a drawing to give an example of the potential reading method of power collecting type.

FIG. 49 shows an example of a collector type detector, in which reference numeral 212 denotes a grounded type metallic cylinder, 214 an insulator and 216 a collector.

The collector 216 contains a radioactive substance which emits α rays. In the metallic cylinder, the air is thus ionized to form positive and negative ion pairs. Under natural conditions, these ions tend to disappear by recombination and diffusion and are at equilibrium. In the presence of an electric field, however, they collide repeatedly with air molecules through thermal motion and migrate statistically toward the electric field, thus carrying charges.

More specifically, for the reason that the air is made electrically conductive by ions, an equivalent electrical resistance passage is taken as being defined between the collector 216 and a surrounding object.

Consequently, holds for stationary state the following equation:

$$V_2 = R_2 V_1 / (R_1 + R_2)$$

wherein $R_0$ is the resistance between the charged surface of the electrostatic information recording medium 3 and the grounded metallic cylinder 212, $R_1$ is the resistance between the charged body and the collector 216, $R_2$ is the resistance between the collector 216 and the grounded metallic cylinder 212, $V_1$ is the potential of the charged body, and $V_2$ is the potential of the collector 216.

Thus, it is possible to find the potential of the electrostatic information recording medium by reading the potential of the collector 216.

Figure 50:
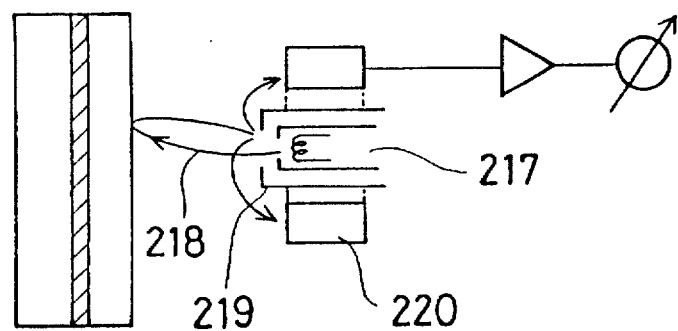
FIG. 50 is a drawing to show an example of the potential reading method of electron beam type.

FIG. 50 is a view showing an example of an electron beam type of potential reader system, in which reference numeral 217 denotes an electron gun, 218 electron beams, 219 a first diode and 220 a secondary electron amplifier section.

Electrons leaving the electron gun 217 are deflected by an electrostatic or electromagnetic deflector and scan a charged surface. A portion of the scanning electron beams joins to the charges of the charged surface into a charging current, and so the potential of the charged surface drops to the equilibrium potential, correspondingly. Another portion of the beams is modulated and returned to the electron gun 217, and then collides with the first diode 219. The resultant secondary electrons are amplified by the secondary electron amplifier 220 and obtained from the anode in the form of a signal output. As the return electron beams, reflected or secondary electrons may be used.

With the electron beam type of potential reader system, uniform charges are formed on the medium after scanning, but a current corresponding to a latent image is detected during scanning. When the latent image carries negative charges, the accumulation of charges by electrons is reduced in a region (unexposed) carrying much charges, so that the resultant charging current is limited. However, a maximum charging current occurs, for instance, in a region where any charge is not present. On the contrary, positive charges define a negative type.

Figure 51:
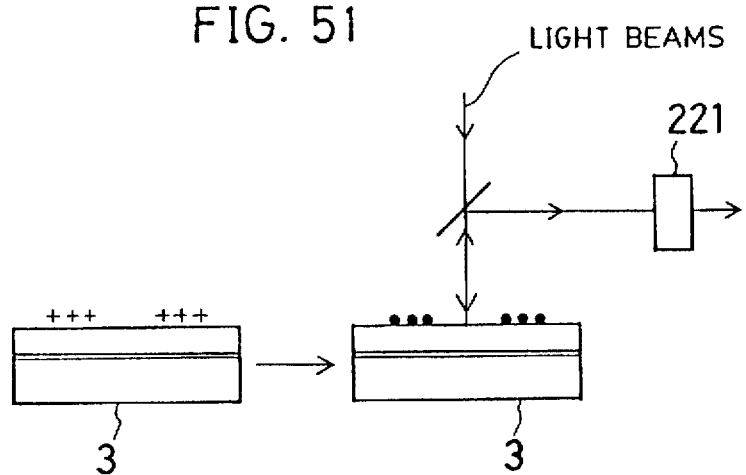
FIG. 51 and FIG. 52 are the drawings to explain the potential reading method utilizing the toner coloring.

FIG. 51 illustrates another example of the potential reader system. An electrostatic information recording medium 3, on which an electrostatic latent image is formed, is toner-developed. The colored surface is then irradiated with light beams for scanning. The reflected light is converted to electrical signals by a photoelectric converter 221. With such a system, high resolving-power is attainable by reducing the diameter of light beams and the detection of electrostatic potentials can be easily carried out in optical fashion.

Figure 52:
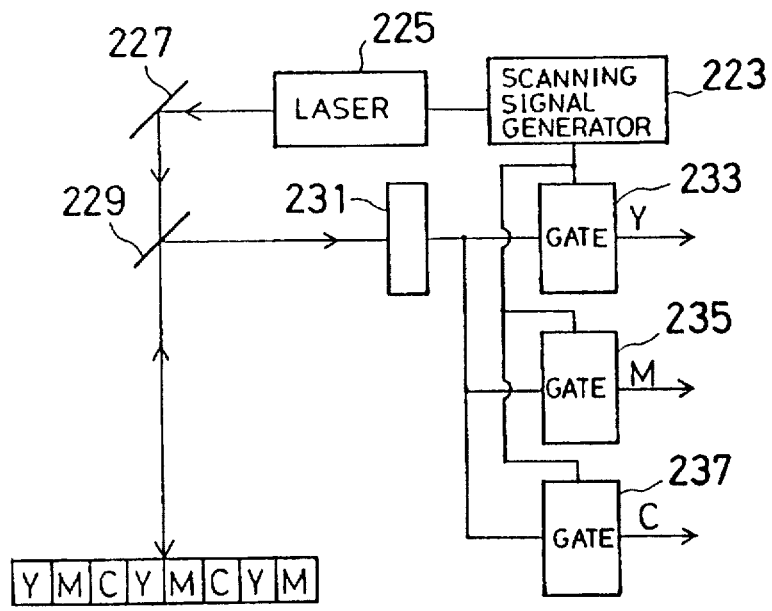

FIG. 52 shows a further example of the potential reader system. Prismatic images R, G and B formed by such fine color filters as will be described later are toner-developed. Then, the colored surface is irradiated with light beams to convert the reflected light to signals Y, M and C. In FIG. 52, reference numeral 223 denotes a scanning signal generator, 225 a laser, 227 a reflector, 229 a half mirror, 232 a photoelectric converter and 233, 235 and 235 gate circuits.

With scanning signals from the generator 223, a colored surface is irradiated with laser beams from the laser 225 through the reflector 227 and half mirror 229 for scanning. The light reflected from the colored surface is then fed into the photoelectric converter 231 to convert it to electrical signals. If the gate circuits 233, 235 and 237 are controlled for opening or closing synchronously with the signals from the generator 223, then they are controlled for opening or closing synchronously with the pattern of the fine filters. Thus, it is possible to obtain signals Y, M and C, even when they are not previously colored.

It is noted that even when a color image is split into three planes as will be described later, signals Y, M and C are quite similarly obtainable, again, without previously coloring them.

In the systems illustrated in FIGS. 51 and 52, it is required for the toner-developed image to have the γ characteristic corresponding to the quantity of electrical charging of the latent image. For that reason, it is required to provide no threshold value with respect to an analog change in the quantity of electrical charging. Given the corresponding relationship, it is then possible to correct γ by electrical processings, even when the γ characteristic is in no coincidence with the quantity of electrical charging.

Figure 53:
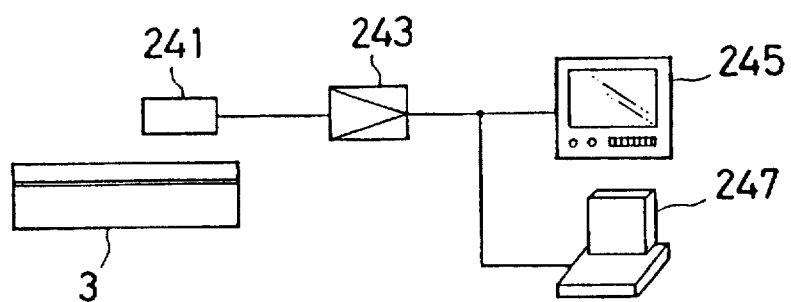
FIG. 53 is a drawing to show approximate configuration of the electrostatic image reproduction of this invention.

FIG. 53 is a schematical view showing the process for reproducing electrostatic images according to the present invention, in which reference numeral 241 stands for a potential reader, 243 an amplifier, 245 a CRT and 247 a printer.

Referring to this figure, a charge potential is detected by the potential reader 241, and the resultant output is amplified by the amplifier 243 for display on the CRT 245 or printing-out with the printer 247. In this case, the region to be read may be arbitarily selected and output at any time, or may be repeatedly reproduced. With the electrostatic latent image obtained in the form of electrical signals, it may then be recorded in other recording media, if required.

For the reproduction of surface charges with the printer 247, use may be made of printing means such as thermal dye transfer, ink jet, hot-melt transfer, microcapsules, silver salts, toners or the like and display means such as flat CRTs, plasma CRTs, liquid crystal displays, projection, LEDs, ELs, TV telephones, word processors, CGs, presentation or the like.

Reference will now be made to a protective film laminated on the charge retaining layer in which information is recorded in this manner for the purpose of improving the charge retainability of that layer.

Figure 54A:
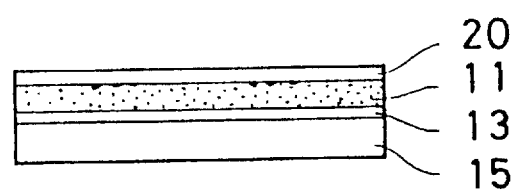
FIG. 54 is a schematical cross-sectional view of the electrostatic information recording medium equipped with protective film by the present invention.
Figure 54B:
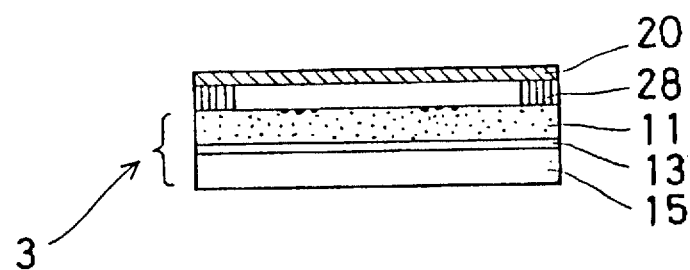

In the electrostatic information recording media according to the present invention, it is preferred that as illustrated in FIG. 54 (a), a protective layer 20 is laminated on the surface of the charge retaining layer to prevent its failure or the attenuation of information-bearing charges.

In order to form the protective film, use is made of one or a mixture of materials showing such adhesion that it is releasable for reading during the reproduction of information such as reclaimed rubber, styrene-butadiene rubber, polyisoprene, butyl rubber, Buna-N (butadiene-acrylonitrile rubber), polyvinyl ethers (including ethyl or higher hydrocarbon groups), polyacrylate esters (having ethyl or higher hydrocarbon groups), silicone rubber, polyterpene resins, gum rosins, rosin esters, rosin derivatives, oil-soluble phenolic resins, cumarone-indene resins and petrolic hydrocarbon resins. Such a material or mixture is then formed into a film of hundreds Å to tens μm in thickness, which is in turn laminated on the surface of the electrostatic information recording medium. Alternatively, an insulating plastic film may be laminated on that surface with a releasable close contact adhesive agent. As such adhesive agents, use may be made of materials having a specific resistance of $10^{14}$ Ω·cm or higher such as silicone oil, dimethyl silicone oil, methylphenyl silicone oil, higher fatty acid-modified silicone oil, methyl chlorinated phenyl silicone oil, alkyl-modified silicone oil, methyl hydrogen silicone oil, cyclic dimethyl polysiloxanes, silicone polyether copolymers, amino-modified silicone oil, epoxy-modified silicone oil and insulating oil, which may be used alone or in combination of two or more.

It may also be possible to laminate an insulating plastic film on the charge retaining layer with the use of a bonding agent.

Furthermore, with the application of suitable means such as vapor deposition or spinner coating, a solution of an insulating plastic film in a solvent may be applied on the charge retaining layer into a film of hundreds Å to tens μm in thickness as measured upon drying.

The hot-melt transfer materials used may include EVA (ethylene-vinyl acetate copolymers), EEA (ethylene-ethylene acrylate copolymers), polyamide resins, rosinous resins, hydrogenated petrolic resins, pinene-base resins, hydrocarbonic resins, synthetic rosinous resins, terpenic resins and wax which, if required, may be used in the form of a mixture of two or more or with the addition of inorganic powders. Preference is given to a material allowing the protective layer to be subjected to hot-melt transfer at a temperature sufficient to prevent the attenuation-by-heating of charges on the charge retaining layer.

Information reading may be feasible from above the protective layer, and it is preferred to decrease the thickness of the protective film so as to improve the resolution of reading. This is because a sensor for reading should preferably have access to a region in which more charges are stored for the purpose of improving the resolution of reading. Where the resolution of reading is negligible, it is possible to increase the thickness of the protective film.

If the protective film used is of such an adhesive type as mentioned above, then it may be released from the charge retaining layer to reproduce the information on its surface.

As illustrated in FIG. 54 (b), a protecting film 20 may be laminated on a charge retaining layer 11 in a non-contact state. In this case, it is preferable that a plastic film is used as the protective film and laminated on that layer 11 through a spacer 28. A suitable space between the charge retaining layer and the protective layer is in a range of 1 to 50 μm, and a suitable spacer is formed of an organic material such as plastics. In order to reproduce the recorded information, the protecting film 20 may be released from the charge retaining layer 11 to read the information-bearing charges thereon. It is required that the spacer 28 be releasably bonded to the charge retaining layer 11 with the above close contact adhesive agents such as silicone oil.

Figure 55:
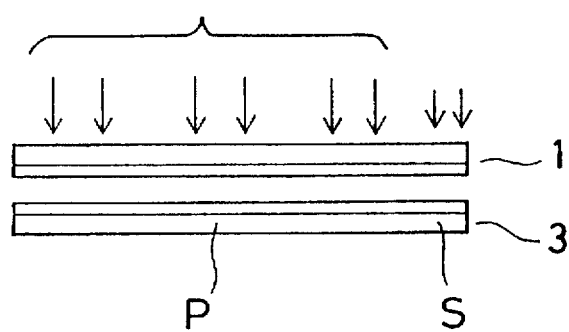
FIG. 55 is a drawing to show the electrostatic information recording medium of the present invention, in which audio and image information is recorded.

FIG. 55 is a view showing an electrostatic information recording medium in which audio and image information items are recorded according to the present invention.

Predetermined voltage is impressed between a photosensitive member 1 and an electrostatic information recording medium 3, and an electrostatic latent image is recorded in that medium by subsequent exposure. In the present invention, image information carried by natural light, image information carried by light of an illumination light source reflected from a manuscript and the like are applied to the photosensitive member 1 to record their latent images on the electrostatic information recording medium 3. At the same time, a laser light source or the like is modulated by audio signals and audio information is applied to the photosensitive member 1 in the form of optical information to record it in the electrostatic information recording medium 3. Thus, the image information along with the audio information is recorded in the electrostatic information recording medium 3.

Figure 56:
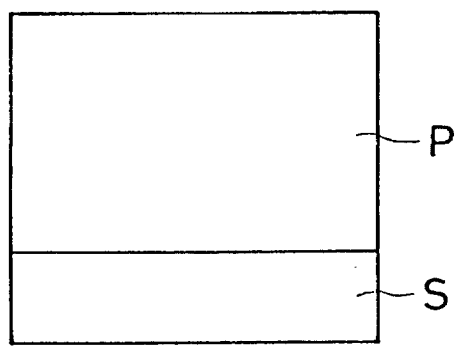
FIG. 56 and FIG. 57 are the drawings giving the memory region for the image information and audio information.
Figure 57:
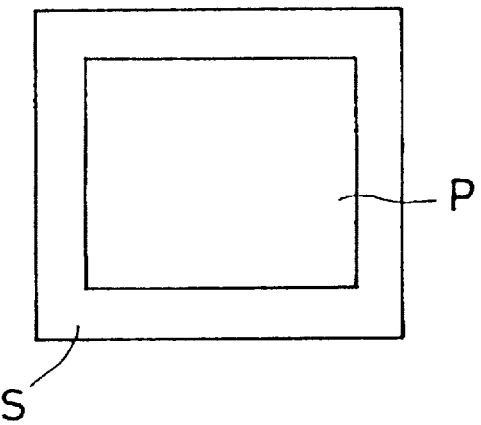

FIGS. 56 and 57 are views showing zones for storing image and audio information items. Since the volume of audio information is much smaller than that of image information, an image information storing zone P is located at a central portion of the recording medium, while an audio information storing zone S is positioned at an end or edge portion thereof.

Figure 58:
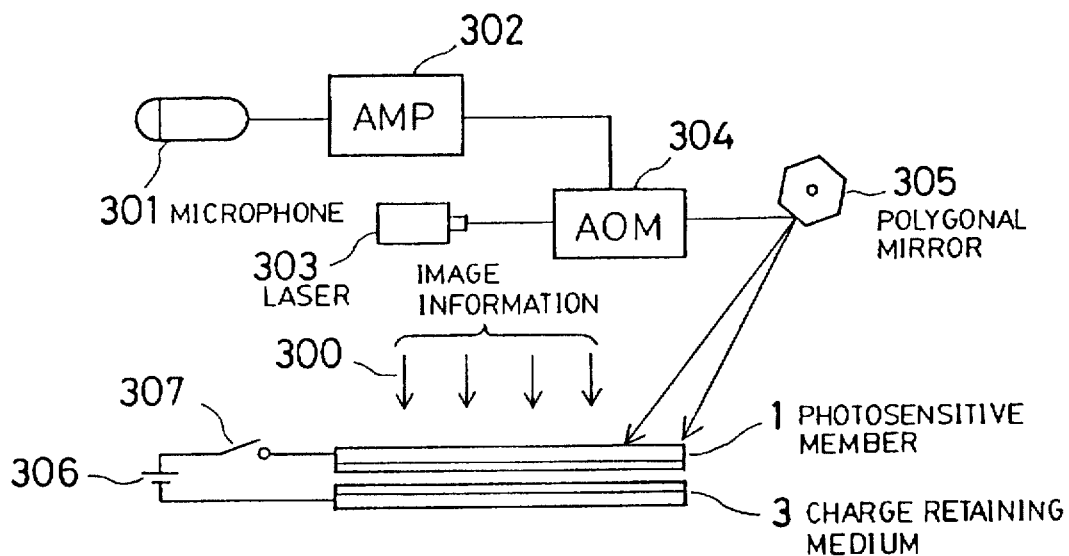
FIG. 58 and FIG. 59 are the drawings illustrating the method to record audio information together with image information to the electrostatic information recording medium of this invention.

A process for recording image information along with audio information in the electrostatic information recording medium according to the present invention is illustrated in FIG. 58, wherein reference numeral 301 stands for a microphone, 302 an amplifier, 303 a laser, 304 an acoustic to optical converter, 305 a polygonal mirror and 306 a power source.

The power source 306 is designed to apply predetermined voltage between the photosensitive member 1 and the electrostatic information recording medium 3 by putting a switch 307 on or off. While the predetermined voltage is applied, the photosensitive member is then exposed to light 300 carrying image information to form on the recording medium 3 a latent image potential corresponding to the image. Electrical signals fed in through the microphone 301 and corresponding to a sound are amplified by the amplifier 302, and laser beams from the laser 303 are modulated in response to audio signals by the acoustic to optical converter 304. The modulated signals are then applied to the photosensitive member 1 by the scanning of the polygonal mirror 305 to form on the recording medium 3 a latent image potential corresponding to the audio signals. Thus, the audio information is recorded along with the image information in the electrostatic information recording medium 3. As a result, when an image such as a landscape is recorded on the electrostatic information recording medium 3, photographing conditions, etc. may be recorded in the form of sounds. It is thus possible to reproduce that image with appropriate comments.

In the foregoing embodiment, the light is modulated by a combination of the optical modulator with the polygonal mirror for scanning and exposure purposes. It is noted, however, that electron beam scanning may be performed through a combination of CRTs with modulation means as is the case with, e.g., a flying spot scanner (FSS for short) to conduct scanning and exposure through the photosensitive member with light emanating from blips on a cathode-ray tube. Alternatively, the electrostatic information recording medium may be located in proximity and opposition to the tube plane of a sort of CRT including thereon a group of needle electrodes for direct discharge recording in the recording medium through the needle electrodes upon which scanning electron beams strike.

Figure 59:
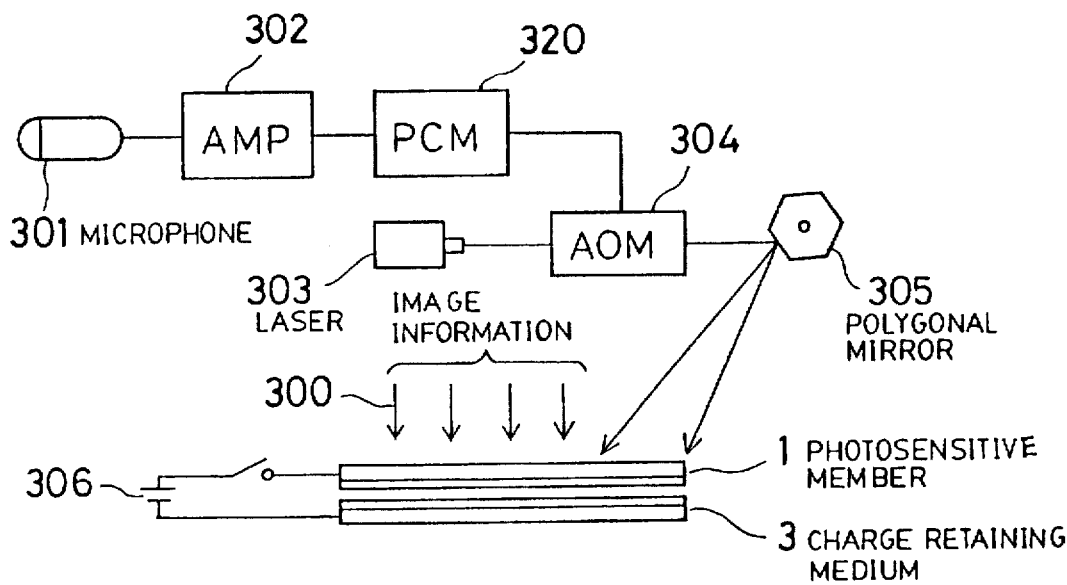

FIG. 59 is a view illustrating another recording process making use of PCM modulation, wherein the same parts as illustrated in FIG. 58 are indicated by the same reference numerals. With the process of FIG. 59, it is possible to record high-quality audio information resistive to noises, since audio signals are converted to digital signals by PCM 320.

Figure 60A:
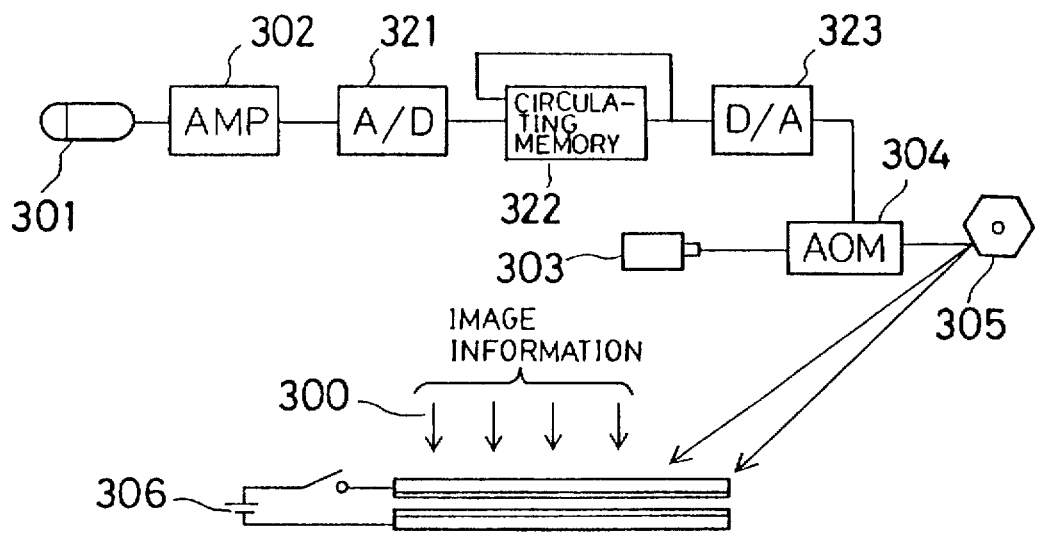
FIG. 60 is a drawing to illustrate another recording method using cyclic memory.
Figure 60B:
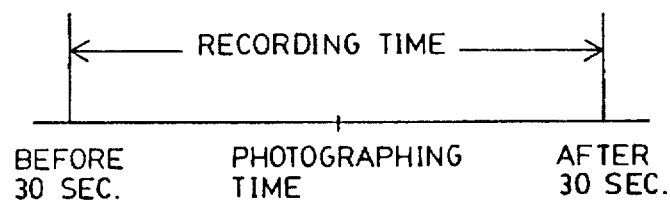

FIG. 60 is a view showing a further recording process making use of a circulatory memory, in which reference numeral 321 denotes an A/D converter, 322 a circulatory memory and 323 a D/A converter.

In the instant embodiment, audio signals are subjected to A/D conversion for recording in the circulating memory 322, and the output of that memory 322 is subjected to D/A conversion for recording. The circulating memory 322 has a storage capacity capable of storing audio information over a constant period of time with its stored content being successively renewable, so that the audio information can be always stored from a certain previous time up to the present time. For instance, if the storage capacity of the circulating memory is such that audio information is recordable for one minute, then the audio information can be recorded from before 30 seconds of photographing to after 30 seconds. It is thus possible to achieve a reproduction of the photographed situation with real presence. For instance, if an image of a steam locomotive can be photographed with sounds generated therefrom and a shutter sound, then the reproduced image will remind a viewer of the situation where photographing was conducted.

Reference will now be made to the structure of card members in which the electrostatic information recording medium of the present invention is used.

Figure 61A:
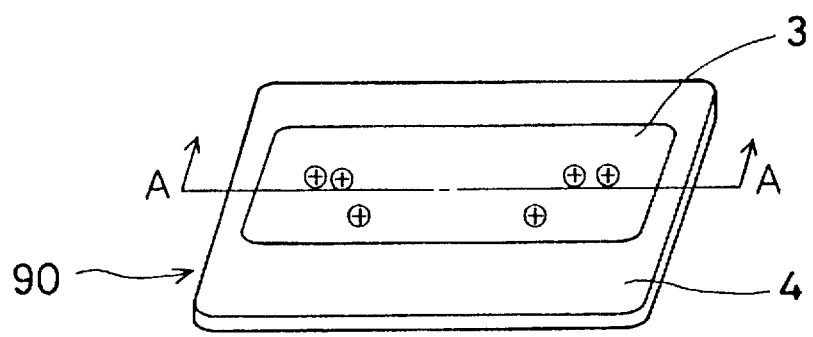
FIG. 61 and FIG. 62 are the drawings to show the electrostaticinformation recording card of this invention.
Figure 61B:
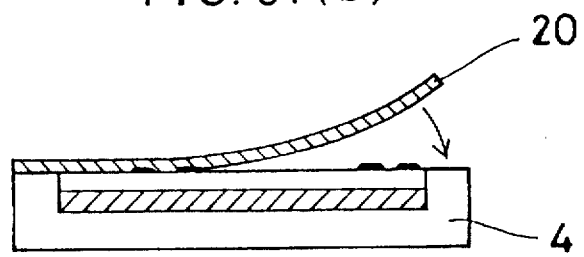
Figure 62A:
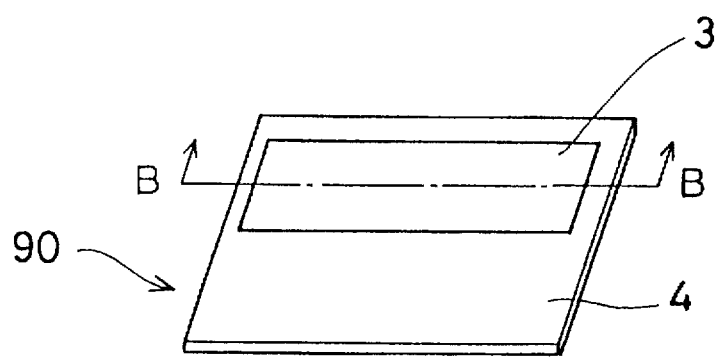
Figure 62B:
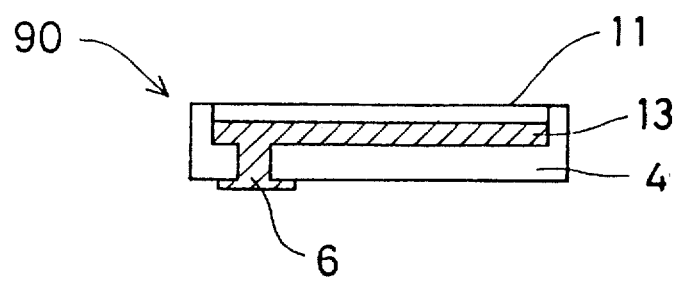
Figure 63A:
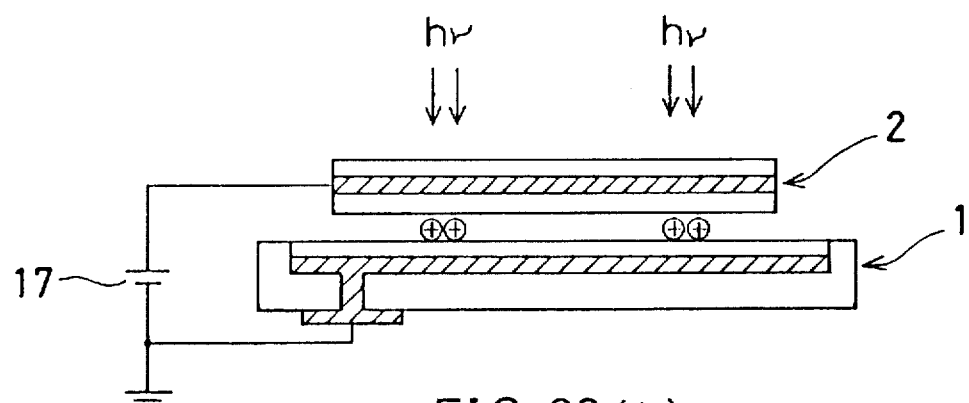
FIG. 63 is a drawing to explain the electrostatic information recording method to the electrostatic information recording card of this invention.
Figure 63B:
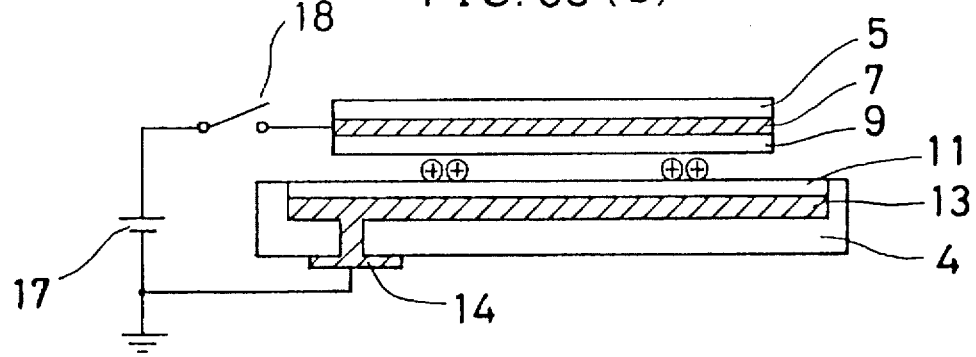
Figure 63C:
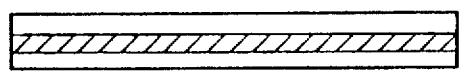
Figure 63C:
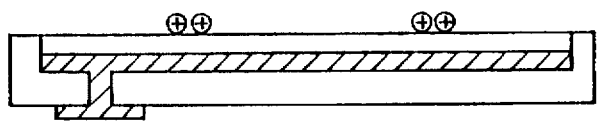

FIG. 61 (a) is a perspective view of a ROM type of electrostatic information recording card according to the present invention and FIG. 61 (b) a sectional view taken along the line A—A of FIG. 61 (a) for showing a protective film provided in place. FIG. 62 (a) is a perspective view of a DRAW type of electrostatic information recording medium and FIG. 62 (b) a sectional view taken along the line B—B of FIG. 62 (a).

A card substrate 4 on which an electrostatic information recording medium 3 is to be placed may be formed of any material of any thickness, if its strength is sufficient to support the recording medium 3. For instance, use may be made of flexible plastic sheets such as vinyl chloride sheets or rigid sheets such as glass sheets, ceramic sheets and metal sheets (which may also serve as electrodes). Without recourse to an electrostatic information recording medium support 15, an electrode 13 and a charge retaining layer may be laminated directly on the card substrate 4 in that order. As the support, use may be made of a metal sheet which may also serve as an electrode.

The electrostatic information recording medium 3 may be embedded in or sticked to the card substrate 4 as shown in FIG. 61 or FIG. 62, after or before the reocrding of information.

Information recording cards 90 are broken down into a ROM type in which information has already been recorded in the electrostatic information recording medium as shown in FIG. 61 and a DRAW type in which information is not or partly recorded as shown in FIG. 62. For the DRAW type, for instance, an adhesive plastic film, as already mentioned, may releasably be applied to the surface of an insulating layer as the protective film. For recording, the protective film may be peeled off to record information in an unrecorded region. After recording, the protective film may be again applied to the surface of the insulating layer.

The recording mode of the electrostatic information recording media according to the present invention may be used as forgery-safe means for cards, etc. due to its unvisibleness. With the present recording media, planar information processing may be possible because of their increased storage capacity and plane recording being acheivable once by planar exposure. Input or output of electrical signals and planar input of image data are also possible. In addition, various data such as analog, digital, image, sound and (0·1) data are recordable. The present media may further be used as computer's external memories. The information recorded are easily erasable.

The electrostatic information recording media of the present invention are not only usable as electrostatic recording cards but also applicable to magnetic cards and IC cards as well as ROM, DRAW and EDRAW types of optical cards and marking cards by changing information input means while using the present media as masters. Further, they are usable in varied recording regions.

Therefore, the present media may be used as the recording media for, e.g., ID cards, prepaid cards, credit cards, electronic calculators, electronic pocketbooks, cameras, clinical charts, timetables, maps, charge locks (keys), miniature books, name cards, sensors, dust removers, batteries, bar cords, Karaoke (playback and sound input combinations), communications means such as post cards, records, games, teaching aids and so on. The electrophotographic recording cards according to the present invention may be used as the recording media in banking systems, ID systems, prepaid systems, credit systems, ticket issuing systems, medical diagnosis systems, navigation systems, charge lock systems, communications systems, game systems, teaching systems and other systems.

The present invention will now be explained with reference to the following examples.

[EXAMPLE 1]

Preparation of Electrostatic Information Recording Medium and its Charge Retainability On a film of tetrafluoroethylene-hexafluoropropylene copolymer (FEP) (DuPont) having specific resistance of $10^{18}$ Ω·cm or more, water absorption of 0.01%, and film thickness of 12.5 μm, aluminum electrode was laminated in thickness of 1000 Å by vacuum deposition ($10^{-5}$ Torr), and electrostatic information recording medium was obtained.

On this electrostatic information recording medium, electric charge was provided by corona charging to have the surface potential of +100 V or −100 V, and the electric charge retaining property was measured.

When measured after leaving at room temperature and humidity for 30 days, the surface potential was maintained at 95 V in both (+) and (−). (The same applies hereinafter.) In the acceleration test leaving at 60° C. and 20% R.H. for 30 days, the surface potential of 95 V was maintained. Under high humidity condition, leaving it at 40° C. and 95% R.H. for 30 days, the surface potential of 94 V was maintained.

[EXAMPLE 2]

To a film of tetrafluoroethylene-perfluoroalkylvinylether copolymer (PFA) (DuPont) having specific resistance of $1\times10^{18}$ Ω·cm or more, water absorption of 0.03%, and film thickness of about 12 μm, aluminum electrode was laminated in thickness of 1000 Å by vacuum deposition method ($10^{-5}$ Torr), and electrostatic information recording medium was obtained.

On the electrostatic information recording medium thus obtained, electric charge was provided by corona charging to have the surface potential of +100 V or −100 V, and the electric charge retaining property was measured.

When measured at room temperature and humidity for 30 days, the surface potential was maintained at 93 V in both (+) and (−). (The same applies hereinafter.) In the acceleration test leaving at 60° C. and 20% R.H. for 30 days, the surface potential was maintained at 90 V. Under high humidity condition, leaving at 40° C. and 95% R.H. for 30 days, the surface electric charge of 90 V was maintained.

[EXAMPLE 3]

On a glass substrate of 1 mm thick, aluminum electrode was vacuum-deposited in thickness of 1000 Å by vacuum deposition method ($10^{-5}$ Torr). Fluorine-containing resin CYTOP (trade name; Asahi Glass Co.; water absorption 0.01%, specific resistance $1\times10^{18}$ Ω·cm) was dissolved in perfluoro(2-butyltetrahydrofuran, and 5% solution of this was coated on the above aluminum electrode by blade coater. After drying this at 150° C., electrostatic information recording medium of 3 μm thick was prepared.

On the electrostatic information recording medium thus obtained, electric charge was provided by corona charging to have the surface potential of −100 V, and the electric charge retaining property was measured.

When measured after leaving at room temperature and humidity for 30 days, the surface potential was −90 V. In the acceleration test, leaving it at 60° C. and 20% R.H. for 30 days, the surface potential was maintained at −85 V. Under high humidity condition leaving at 40° C. and 95% R.H. for 30 days, the surface electric charge of −90 V was maintained.

[EXAMPLE 4]

To a film of about 25 μm thick (Nitto Denko) consisting of polytetrafluoroethylene (PTFE) having specific resistance of $1\times10^{18}$ Ω·cm or more, water absorption of 0.01% or less, aluminum electrode was laminated in thickness of 1000 Å by vacuum deposition method ($10^{-5}$ Torr), and the electrostatic information recording medium was obtained.

On the electrostatic information recording medium thus obtained, electric charge was provided by corona charging to have the surface potential of +100 V or −100 V, and the electric charge retaining property was measured.

When measured after leaving at room temperature and humidity for 30 days, the surface potential was maintained at 93 V in both (+) and (−). (The same applies hereinafter.) In the acceleration test, leaving at 60° C. and 20% R.H. for 30 days, the surface potential was maintained at 90 V. Under high humidity condition leaving at 40° C. and 95% R.H. for 30 days, surface electric charge was maintained at 93%. Further, under high temperature condition, leaving at 150° C. for 10 hours, the surface potential was maintained at 90 V.

[EXAMPLE 5]

On a glass substrate of 1 mm thick, aluminum electrode was laminated in thickness of 1000 Å by vacuum deposition method ($10^{-5}$ Torr). A copolymer was prepared, which has repeating unit given by the above general formula (1) (n=1) and intrinsic viscosity [η] of 0.50 at 30° C. in a solvent, the main component of which is Florinat FC-75 (trade name; 3M Company; perfluoro(2-butyltetrahydrofuran), and having glass transition temperature of 69° C., water absorption of 0.01% and specific resistance of $1\times10^{18}$ Ω·cm. This was dissolved in perfluoro(2-butyltetrahydrofuran) and 5% solution of this was coated on aluminum electrode by spin coating at 1500 rpm for 20 sec. After drying, the electrostatic information recording medium of about 3 μm thick was prepared.

On the electrostatic information recording medium thus obtained, electric charge was provided to have the surface potential of −100 V by corona charging, and the electric charge retaining property was measured.

When measured after leaving at room temperature and humidity for 30 days, the surface potential was −93 V. In the acceleration test, leaving at 60° C. and 20% R.H. foe 30 days, the surface potential of −78 V was maintained. Under high humidity condition, leaving at 40° C. and 95% R.H. for 30 days, the surface electric charge of −90 V was maintained.

[EXAMPLE 6]

On a glass substrate of 1 mm thick, aluminum electrode was laminated in thickness of 1000 Å by vacuum deposition method ($10^{-5}$ Torr). A copolymer was prepared, which has repeating unit given by the above general formula (1) (n=2) and (2) (n=2) and instrinsic viscosity of 0.55 at 30° C. in a solvent, main component of which is Florinat FC-75 (trade name; 3M Company; perfluoro(2-butyltetrahydrofuran), and having glass transition temperature of 108° C., water absorption of 0.01%, and specific resistance of $1\times10^{18}$ Ω·cm. This was dissolved in perfluoro(2-butyltetrahydrofuran), and 7% solution of this was coated on the above aluminum electrode at 1500 rpm for 20 sec. by spin coater. After drying, electrostatic information recording medium of about 3 μm thick was prepared.

On the electrostatic information recording medium thus obtained, electric charge was provided to have the surface potential of −100 V by corona charging, and the electric charge retaining property was measured.

When measured after leaving at room temperature and humidity for 30 days, the surface potential was −90 V. In the acceleration test, leaving at 60° C. and 20% R.H. for 30 days, surface potential of −85 V was maintained. Under high humidity condition leaving at 40° C. and 95% R.H. for 30 days, the surface electric charge of −90 V was maintained.

[EXAMPLE 7]

On a glass substrate of 1 mm thick, aluminum electrode was laminated in thickness of 1000 Å by vacuum deposition method ($10^{-5}$ Torr). A copolymer was prepared, which has repeating unit given by the above general formula (1) (blended substance of n=1 and n=2) and general formula (2) (n=2) and has intrinsic viscosity [η] of 0.44 at 30° C. in a solvent, main component of which is Florinat FC-75 (trande name; 3M Company; perfluoro(2-butyltetrahydrofuran), and having glass transition point of 91° C., water absorption of 0.01%, and specific resistance of $1\times10^{18}$ Ω·cm. This was dissolved in perfluoro(2-butyltetrahydrofuran), and 5% solution of this was coated on the above aluminum electrode by spin coater. After drying, electrostatic information recording medium of about 3 μm thick was prepared.

On the electrostatic information recording medium thus obtained, electric charge was provided to have the surface potential of −100 V by corona charging, and the electric charge retaining property was measured.

When measured after leaving at room temperature and humidity for 30 days, the surface potential was −90 V. In the acceleration test, leaving at 60° C. and 20% R.H. for 30 days, the surface potential of −80 V was maintained. Under high humidity condition, leaving at 40° C. and 95% R.H. for 30 days, the surface electric charge of −90 V was maintained.

[EXAMPLE 8]

On a glass substrate of 1 mm thick, aluminum electrode was laminated in thickness of 1000 Å by vacuum deposition method ($10^{-5}$ Torr). A copolymer was prepared, which has repeating unit given by the above general formula (1) (n=1) and —(CF$_2$—CF$_2$)— and in which cyclic structural unit derived from perfluoroallylvinylether accounts for 81 wt %, and which has intrinsic viscosity [η] of 0.425 at 30° C. in a solvent, the main component of which is Florinat FC-75 (trade name; 3M Company; perfluoro(2-butyltetrahydrofuran), and having water absorption of 0.01% and specific resistance of $1\times10^{18}$ Ω·cm. This was dissolved in perfluoro(2-butyltetrahydrofuran), and 5% solution was coated on the above aluminum electrode by spin coater. After drying, electrostatic information recording medium of about 3 μm thick was prepared.

On the electrostatic information recording medium thus obtained, electric charge was provided by corona charging to have the surface potential of −100 V, and the electric charge retaining property was measured.

When measured after leaving at room temperature and humidity for 30 days, the surface potential was −93 V. In the acceleration test, leaving at 60° C. and 20% R.H. for 30 days, the surface potential of −70 V was maintained. Under high humidity condition leaving at 40° C. and 95% R.H. for 30 days, the surface electric charge of −90 V was maintained.

[EXAMPLE 9]

On a glass substrate of 1 mm thick, aluminum electrode was laminated in thickness of 1000 Å by vacuum deposition method ($10^{-5}$ Torr). A copolymer was prepared, which consists of repeating unit given by the above general formula (1) (n=1) and:

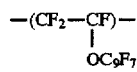

and in which cyclic structural unit derived from perfluoroallylvinylether occupies 89 wt %, and which has intrinsic viscosity [η] of 0.35 at 30° C. in a solvent, main component of which is Florinat FC-75 (trade name; 3M Company; perfluoro(2-butyltetrahydrofuran), and having glass transition temperature of 61° C., water absorption of 0.01%, and specific resistance of $1\times10^{18}$ Ω·cm. This was dissolved in perfluoro(2-butyltetrahydrofuran), and 5% solution was coated on the above aluminum electrode by spin coater. After drying, electrostatic information recording medium of about 3 μm thick was prepared.

On the electrostatic information recording medium thus obtained, electric charge was provided to have the surface potential of −100 V by corona charging, and the electric charge retaining property was measured.

When measured after leaving at room temperature and humidity for 30 days, the surface potential was −90 V. In the acceleration test, leaving at 60° C. and 20% R.H. for 30 days, the surface potential of −60 V was maintained. Under high humidity condition leaving at 40° C. and 95% R.H. for 30 days, the surface electric charge of −90 V was maintained.

[EXAMPLE 10]

An aluminium electrode was formed to a thickness of 1000 Å on a glass substrate of 1 mm in thickness by vacuum vapor deposition ($10^{-5}$ Torr). With the use of a blade coater, the electrode was then overcoated with a solution of a polyester resin having a glass transition temperature of 67° C. and a specific resistance of $7\times10^{17}$ Ω·cm (available under the trade name of Vylon 200 from Toyobo) dissolved in a mixed solvent of 37.5 parts by weight of methyl ethyl ketone and 37.5 parts by weight of toluene, followed by drying, thereby obtaining an electrostatic information recording medium having a polyester film thickness of about 10 μm.

The thus obtained recording medium was charged thereon at +100 V or −100 V of surface potential by the control of corona charging and the electric charge retaining property was measured.

Figure 65:
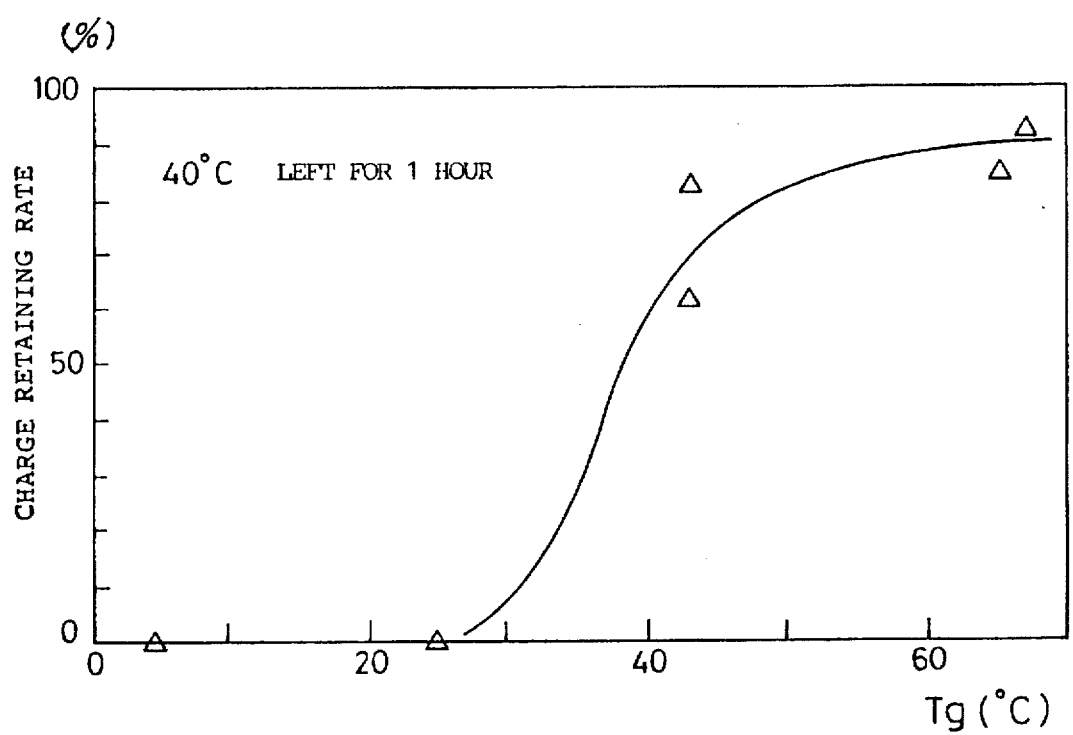
FIG. 65 is a drawing to explain the method to prepare a—Si: H photosensitive member.

After allowed to stand at room temperature and humidity for 30 days, the surface potential was found to be 80 V, both +and −. When the recording medium was left to an environment of 80° C. and 20% R.H. in an accelerated test, the surface potential reduced to 0 V, both +and −, within one day. In a similar manner as mentioned above, some of electrostatic information recording media were formed as charge retaining layers by using polyester resins having varied glass transition temperatures (available under the trade names of Vylon 500, GK150 and GK103 from Toyobo with glass transition temperatures of 4° C., 26° C. and 47° C., respectively). After allowed to stand at 40° C. for one hour, the relation between the glass transition temperatures and the surface potentials was found. The results are plotted in FIG. 65, wherein A shows the charge retaining ratio for each glass transition temperature.

[EXAMPLE 11]

An aluminium electrode was formed to a thickness of 1000 Å on a glass substrate of 1 mm in thickness by vacuum vapor deposition ($10^{-5}$ Torr). The Al electrode was then vapor-deposited at several Torr with poly-p-xylylene (available under the trade name of Parylene from Tomoe Kogyo/Union Carbide and having a glass transition temperature of 80° to 100° C., a specific resistance of $9\times10^{16}$ Ω·cm and a water absorption of 0.01%), thereby obtaining an electrostatic information recording medium having a film thickness of about 10 μm.

The thus obtained recording medium was charged thereon at +100 V or −100 V of surface potential by the control of corona charging and its charge retaining property was measured.

After allowed to stand at room temperature and humidity for 30 days, the surface potential was found to be 80 V. Under accelerated testing conditions expressed in terms of 60° C., 20% R.H. and 30 days, a surface potential of 60 V was obtained. Even after allowed to stand at 40° C. under high-humidity conditions of 95% R.H. for 30 days, the surface potential were maintained at 60 V. This indicates that the obtained electrostatic information recording medium is a superior recording medium.

[EXAMPLE 12]

After an aluminium electrode was formed to a film thickness of 1000 Å on a polyester resin (PET) film (having a thickness of 12 μm, available under the trade name of Lumirror S available from Toray, and having a glass transition temperature of 69° C., a water absorption of 0.4% and a specific resistance of $1\times10^{18}$ Ω·cm) by vacuum vapor deposition ($10^{-5}$ Torr). A film was laminated on a glass substrate of 1 mm in thickness faced to the electrode with a double-side adhesive tape to make an electrostatic information recording medium.

The thus obtained recording medium was charged thereon at +100 V or −100 V of surface potential by the control of corona charging and its charge retaining property was measured.

After allowed to stand at room temperature and humidity for 30 days, the surface potential was 50 V, both +and −.

[EXAMPLE 13]

An aluminium electrode was formed to a film thickness of 1000 Å on a polyethylene naphthalate (PEN) film (having a thickness of 12 μm, available under the trade name of Q Film from Teijin, and having a glass transition temperature of 113° C. and a water absorption of 0.4%) by vacuum vapor deposition ($10^{-5}$ Torr) to make an electrostatic information recording medium.

The thus obtained recording medium was charged thereon at +100 V or −100 V of surface potential by the control of corona charging and its charge retaining property was measured.

After allowed to stand at room temperatuer and humidity for 30 days, the surface potential was found to be 80 V, both +and −, by measurement. Under accelerated testing conditions expressed in terms of 60° C. and 20% R.H. for 30 days, the surface potential was found to be 80 V by measurement.

[COMPARISON EXAMPLE]

An aluminium electrode was formed to a thickness of 1000 Å on a glass substrate of 1 mm in thickness by vacuum vapor deposition ($10^{-5}$ Torr). With the use of a blade coater, the Al electrode was then overcoated with a solution of styrene-butadiene rubber (available under the trade name of Kaliflex TR4113 from Shell) having a glass transition temperature of −70° C., a water absorption of 0.3% and a specific resistance of $1\times10^{15}$ Ω·cm dissolved in a mixed solvent of 37.5 parts by weight of methyl ethyl ketone and 37.5 parts by weight of toluene, followed by drying, whereby an electrostatic information recording medium having a film thickness of about 10 μm was obtained.

The thus obtained recording medium was charged thereon at +100 V or −100 V of surface potential by the control of corona charging and its charge retaining property was measured.

After allowed to stand at room temperature and humidity for 30 days, the surface potential was found to be 0 V by measurement. Upon exposed to an environment of 60° C. and 20% R.H., the surface potential was also found to be 0 V after the lapse of one day.

[EXAMPLE 14]

Under sufficient agitation, 1% by weight (0.2 g) of a curing agent (a metal catalyst available under the trade name of CR-15) was added to a mixed solution composed of 10 g of a methylphenyl silicone resin in an 1:1 solvent of xylene and butanol. With the use of a doctor blade 4 mill, the resulting solution was coated on a glass substrate vapor-deposited with Al at a thickness of 1000 Å. Subsequent 1-hour drying at 150° C. gave an electrostatic information recording medium (a) having a film thickness of 10 μm.

In a similar manner as mentioned above, the above mixed solution was coated on a 100 m polyester film vapor-deposited with Al at a thickness of 1000 Å, followed by drying, to obtain a film-like electrostatic information recording medium (b).

The above mixed solution was also coated on a 4-inch disc-like acryl substrate (having a thickness of 1 mm) vapor-deposited with Al at a thickness of 1000 Å by means of a spinner at 2000 rpm. Subsequent 3-hour drying at 50° C. gave a disc-like electrostatic information recording medium (c) having a film thickness of 7 μm.

Similar coating with the above mixed solution containing additionally 0.1 g of zinc stearate and drying gave an electrostatic information recording medium (d) having a film thickness of 10 μm.

On a glass substrate (thickness: about 500 A, 100 Ω/□) provided with ITO, the above mixture solution was coated by the same procedure and was dried. Thus, electrostatic information recording medium having transparent support member, electrode and electric charge retaining layer was obtained.

On a PET film of 125 μm (Mitsubishi Kasei; 300–400 Ω/□) provided with ITO, the above mixture solution was coated by the same procedure and was then dried. Thus, electrostatic information recording medium having transparent and flexible support member, electrode and electric charge retaining layer was obtained.

[EXAMPLE 15]

10 g of 2,2-[4-(4-aminophenoxy)phenyl]propane was dissolved in 100 g of N-methylpyrolidone. Adding 10 g of pyromelitic acid dianhydride to it gradually, this was agitated at room temperature for 5 hours.

Then, this solution was coated on the surface of transparent ITO electrode layer (thickness: 550 Å, 80 Ω/□ on glass substrate, which had been moistened ill advance by N-methylpyrolidone solvent by blade coater. After drying this at 150° C. for one hour, it was heated at 250° C., and the electrostatic information recording medium of about 10 μm thick was obtained.

On the surface of the electrostatic information recording medium thus obtained, electric charge was provided to have the surface potential of +100 V or −100 V, and the electric charge retaining property was measured.

When measured after leaving it at 60° C. and 20% R.H. for 10 days, surface potential of 70 V was maintained. When it was left on a heating plate kept at 150° C. for 6 hours, surface potential of 78 V was maintained.

Preparation of photosensitive member

[EXAMPLE 16]

Single-Layer Photosensitive Member

A mixed solution composed of 10 g of poly-N-vinylcarbazole (available from Anan Koryo), 10 g of 2,4,7-trinitrofluorenone, 2 g of a polyester resin (a binder available under the trade name of Vylon 200 from Toyobo) and 90 g of tetrahydrofuran (THF) was prepared in a dark place and it was then spread on a glass substrate (of 1 mm in thickness) sputtered with $In_2-O_3SnO_2$ at a thickness of about 1000 Å with the use of a doctor blade. The product was dried at 60° C. for about 1 hour while supplying air thereto to obtain a photosensitive layer having a photoconductive layer of about 10 μm in thickness. For complete drying purposes, air drying was carried for further one day.

[EXAMPLE 17]

a-silicon Photosensitive Member

Production of an amorphous silicon aSi:H inorganic photosensitive member (1) Cleaning of substrate A 23 mm long, 16 mm wide and 0.9 mm thick, optically polished glass substrate, sold by Corning under product designation 7059 glass, and having a thin transparent $SnO_2$ electrode layer formed on its one face, was subjected to ultrasonic cleaning in each of trichloroethane, acetone and ethanol in the described order. The glass was cleaned in each cleaning liquid for 10 minutes.

(2) Preparation of equipment

A reaction receptacle and gas pipes were placed within a reaction chamber 404, which was evacuated by a diffusion pump to $10^{-5}$ Torr for carrying out heating at 150°–350° C. for one hour, and after heating the chamber was cooled.

(3) Deposition of aSi:H(n$^+$)

Figure 64:
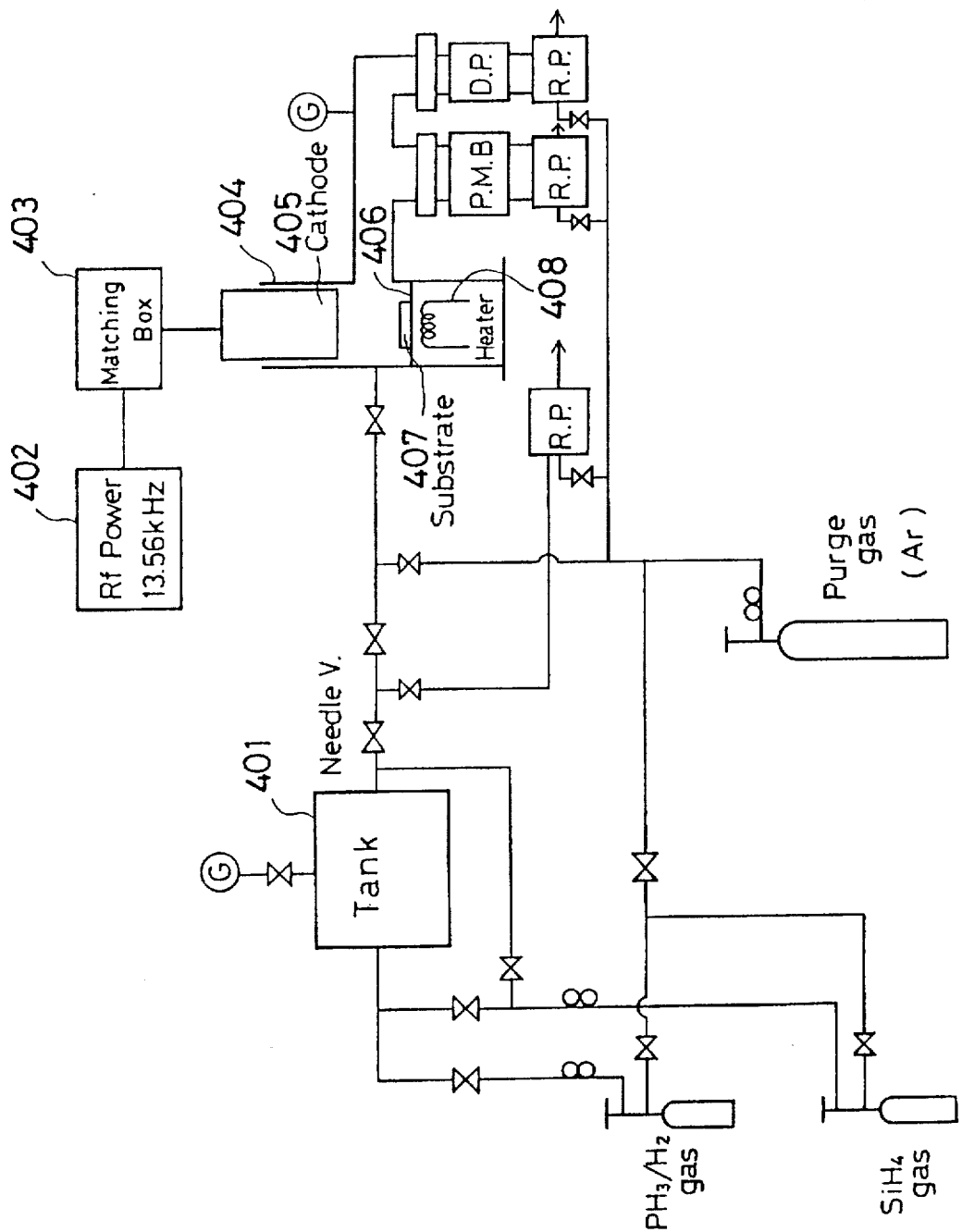
FIG. 64 is a drawing to show the relationship between glass transition temperature and the electric charge carrying ratio when various types of polyester resin are used as electric charge carrying layer.

The substrate cleaned was set on the anode 406 in the reaction chamber 404 in FIG. 64 with good thermal conduction, and the reaction chamber was evacuated to $10^{-5}$ Torr by the diffusion pump, in which condition the heater 408 was adjusted so that the glass substrate was increased to 250° C. At this temperature condition, a gas of $B_2H_6/SiH_4$ (1000 ppm) was allowed to flow into the reaction chamber 404 by controlling the needle valve and the rotation of the PMB so that pressure in the chamber was 200 m Torr. After the inner pressure of the reaction chamber became constant, 40 W of Rf power 402 (13.56 MHz) was put to work through the Matching box 403 to form plasma between the cathode and the anode. The deposition was performed for 4 minutes, then Rf power was disconnected, and the needle valve was closed. This resulted in about 0.2 μm thick aSi:H(n$^+$) which constituted a blocking layer was deposited on the substrate.

(4) Deposition of aSi:H

A silane gas of 100% ($SiH_4$) was entered into the reaction chamber in the same manner as in (3) Deposition of aSi:H. When the inner pressure in the chamber became constant, 40 W Rf power 402 (13.56 MHz) was similarly connected through the matching box 403 to form a plasma which was maintained for 70 minutes. After the deposition was completed, the Rf power was disconnected and the needle valve was closed. After the substrate was cooled by turning off the heater 408, it was taken out. As a result, about 18.8 μm thick film was deposited on the aSi:H(n$^+$) film. Thus, a photosensitive member including $SnO_2$/aSi:H(n+) blocking layer/aSi:H(non doped) 20 μm was produced.

[EXAMPLE 18]

Fabrication of amorphous selenium-tellurium inorganic photosensitive member

A mixture of metallic particles obtained by mixing selenium (Se) with tellurium (Te) in a proportion of 13% by weight was used. A Se-Te thin film was formed on an ITO glass substrate by vapor depositing the metallic mixture at a vacuum degree of $10^{-5}$ Torr under resistance heating. The film has a thickness 1 μm. Subsequently at the same vacuum level, Se vapor deposition was similarly carried out under resistance heating to form a 10 μm a-Se layer on the a-Se-Te layer.

[EXAMPLE 19]

Production of function separated photosensitive member (forming of charge generation layer)

A liquid mixture consisting of 0.4 g of chlorodianeblue and 40 g of dichloroethane was placed in a stainless receptacle having a volume 250 ml, and then 180 ml of glass beads No. 3 was added. These material was pulverized by a vibrating mill (sold by Yasukawa Denki Seisakusho under product designation ED9-4) for about 4 hours to produce chlorodianeblue with particle size 5 μm or smaller, to which after the glass beads being filtered, 0.4 g of polycarbonate, sold by Mitsubishi Gas Kagaku under trade name Upiron E-2000 was stirred for about 4 hours to form a solution, which was coated by using a doctor blade on the 1 mm thick glass substrate, having about 1000 Å thick $In_2O_3$-$SnO_2$ film sputtered on it, to form an about 1 µm thick charge generation layer which was dried at room temperature for one day.

Formation of a charge transport layer

A liquid mixture, containing 0.1 g of 4-dibenzylamino-2-methylbenzaldehyde-1,1'-diphenylhydrazone, 0.1 g of polycarbonate (Upiron E-2000), and 2.0 g of dichloroethane, was coated by a doctor blade over the charge generation layer, above mentioned, to form an about 10 µm thick charge transport layer, which was dried at 60° C. for 2 hours.

[EXAMPLE 20]

Formation of a charge generation layer 10 g of butyl acetate, 0.25 g of butylal resin, (sold by Sekisui Kagaku, Japan under trade name SLEC), 0.5 g of a $ClO_4$ salt of azulenium having the following equation:

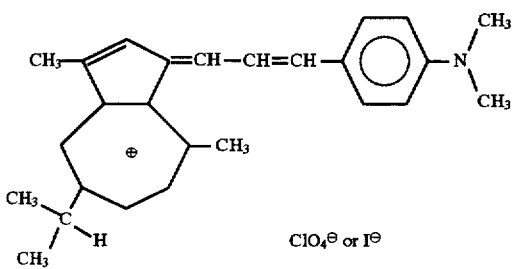

and 33 g of glass beads No. 1 were mixed and stirred by a touch mixer for one day to prepare sufficiently dispersed material, which was coated by using a doctor blade or applicator on ITO deposited on a glass plate and then dried at 60° C. for more than 2 hours to form a dried film having a thickness 1 µm or less.

Formation of a charge transport layer 9.5 g of tetrahydrofuran, 0.5 g of polycarbonate, sold by Mitsubishi Gas Kagaku, Japan, under trade name of Upiron E-2000, 0.5 g of a hydrazone derivative (sold by Anan Koryo, Japan, under product designation CTC191) having the following equation:

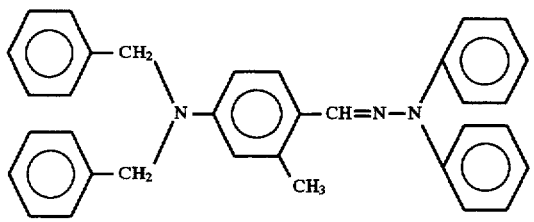

were mixed and then coated by using a doctor blade over the charge generation layer above described to form a coating, which was dried at 60° C. for 2 hours with a film thickness 10 µm or less.

[EXAMPLE 21]

Formation of an electron generation layer 20 g of tetrahydrofuran, 0.5 g of a butylal resin, sold by Sekisui Kagaku, Japan, under trade name of SLEC, 0.25 g of titanylphthalocyanine, 0.25 g of 4,10-dibromoanthanthrone, and 33 g of glass beads No. 1 were stirred by a touch mixer for one day to obtain a sufficiently dispersed material, which was coated by using a doctor blade or applicator over ITO laminated over a glass plate and then dried at 60° C. for 2 or more hours to produce a dried coating with a thickness 1 µm or less.

Fabrication of a charge transport layer 0.5 g of polycarbonate (produced by Mitsubishi Gas Kagaku, Japan, under the trade name of Upiron E-2000), and 0.5 g of the above-described hydrazone derivative (sold by Anan Koryo, Japan, under product designation CTC191) were dissolved into 9.5 g of dichloroethane to prepare a coating material, which was coated by using a doctor blade over the charge generation layer, above described, and then dried for 2 hours at 60° C. for 2 hours or more to form a film having a thickness 10 µm or larger.

[EXAMPLE 22]

Forming of a barrier layer of charge injection layer

A soluble polyamide (sold by Toa Gosei Kagaku, Japan, under product designation FS-175SV10) was coated by a spin coater with a thickness 0.5–1 µm on ITO laminated on a glass plate and then dried at 60° C. for 2 hours or more.

Forming of a charge generation layer 10 g of butyl acetate, 0.25 g of a butylal resin (sold by Sekisui Kagaku, Japan, under the trande name SLEC), 0.5 g of the above-described $ClO_4$ salt of azulenium and 33 g of glass beads No. 1 were mixed and stirred by a touch mixer for one day to produce a sufficiently dispersed material, which was coated by using a doctor blade or an applicator over the barrier layer of charge injection above mentioned and then dried at 60° C. for 2 hours or more to form a dried coating having a thickness 1 µm or less.

Formation of a charge transport layer 0.5 g of polycarbonate (sold by Mitsubishi Gas Kagaku, Janan, under trade name Upiron E-2000) and 0.5 g of the above-described hydrazone derivative (sold by Anan Koryo under product designation CTC191 were dissolved into 9.5 g of tetrahydrofuran to prepare a coating material, which was coated by using a doctor blade on the charge generation layer and then dried at 60° C. for 2 hours or more to form a coating with a thickness 10 µm or less.

[EXAMPLE 23]

Formation of a barrier layer of charge injection layer

A soluble polyamide (sold by Toa Gosei Kagaku under product designation FS-175SV10) was applied with a thickness 0.5–1 µm over ITO, laminated on a glass plate, and then dried at 60° C. for 2 hours or more.

Formation of a charge generation layer 20 g of tetrahydrofuran, 0.5 g of a butylal resin (sold by Sekisui Kagaku under the trande name SLEC), 0.25 g of titanylphalocyanine, 0.25 g of 4,10-dibromoansuansuron and 33 g of glass beads No. 1 were stirred by a touch mixer for one day to form a sufficiently dispersed material, which was applied by a doctor blade or an applicator on the above-mentioned barrier layer of change injection and was then dried at 60° C. for 2 hours or more to form a dried coating having a thickness 1 µm or less.

Formation of a charge transport layer 0.5 g of polycarbonate (sold by Mitsubishi Gas Kagaku under the trande name Upiron E-2000) and 0.5 g of the above-mentioned hydrazone derivative (sold by Anan Koryo under product designation CTC191) were dissolved into 9.5 g of dichloroethane as a solvent to prepare a coating material, which was coated by using a doctor blade over the above-mentioned charge generating layer and then dried at 60° C. for 2 hours to form a dried coating having a thickness 10 µm or larger.

[EXAMPLE 24]

Formation of an electrode layer for a photosensitive member

An indium tin oxide (ITO) having specific resistance 100 Ω·cm² was coated by sputtered over a blue glass plate in condition of 100° C. by the substrate temperature and $10^{-3}$ Torr under oxy-atmosphere. This material may be deposited by EB method.

Formation of a barrier layer of charge injection

Silicon dioxide was sputtered over the above-described electrode layer. The thickness of the silicon dioxide may be 100–3000 Å and aluminum oxide may be used in place of silicon dioxide. EB method may be adopted instead of sputtering for deposing the layer.

Formation of charge generation layer

A selenium-tellurium layer containing 13% by weight of tellurium was deposited on the above barrier layer of charge injection by resistance heating with a thickness 2 μm or less.

Formation of a charge transport layer

A selenium layer was deposited on the above-mentioned charge generation layer by resistance heating with a thickness 10 μm or less.

[EXAMPLE 25]

The photosensitive member given by FIG. 9 (c) was prepared as follows:

On one side of a glass substrate, acqueous solution of modified alkyl silicate (ETSB-5000; TSB Development Center, Inc.) was formed by screen printing method. After drying and curing at 150° C., recessed portion was furnished.

Then, the electrode layer of ITO electrode (thickness: 500 Å; surface resistance 100 Ω/□) was formed by sputtering.

On this substrate, photoconductive layer of PVK was formed by the same procedure as in the Example 16.

[EXAMPLE 26]

The photosensitive member as given in FIG. 9 (d) was prepared as follows:

Electrically conductive paste (3301C; Three Boud Co.) was prepared on ITO electrode (thickness 500 Å; surface resistance 100 Ω/□) by screen printing method. After drying and curing at 150° C., electrically conductive recessed portion was furnished.

The photoconductive layer of PVK was formed by the same procedure as in the Example 16 on this substrate.

[EXAMPLE 27]

The photosensitive member as given in FIG. 9 (e) was prepared as follows:

On one side of a glass substrate, ITO electrode (thickness 500 Å; surface resistance 100 Ω/□) was formed, and a stainless steel plate chip was placed on it. On this substrate, a-Se photoconductive layer was formed by the same procedure as in the Example 18 was formed. a-Se layer was 2 μm thick.

Next, the chip was removed, and the lacking portion of the photoconductive layer was formed.

[EXAMPLE 28]

The photosensitive member as given in FIG. 9 (f) was prepared as follows:

On one side of a glass substrate, a mask was closely fit, prepared from a partially perforated stainless steel plate. Then, light screening portion was formed by vacuum-depositing aluminum of about 1000 Å thick by vacuum depositoin method.

Next, on the side opposite to the vacuum-deposited side, ITO electrode (thickness 500 Å; surface resistance 100 Ω/□) was furnished by sputtering.

On this substrate of ITO electrode side, photoconductive layer was formed by the same procedure as in the Examples 16–21.

[EXAMPLE 29]

The photosensitive member as given in FIG. 9 (g) was prepared as follows:

On one side of a glass substrate, ITO electrode (thickness 500 Å; surface resistance 100 Ω/□) was furnished. Then, a mask, prepared from a partially perforated stainless steel plate, was closely fit to the electrode layer, and plasma processing was performed in $H_2$ atmosphere. Thus, ITO was reduced to a metal plate, and light screening portion was formed.

Next, photoconductive layer was formed by the same procedure as in the Examples 16–21.

[EXAMPLE 30]

The photosensitive member of FIG. 9 (h) was prepared as follows:

On one side of a glass substrate, a mask was closely fit, prepared from a partially perforated stainless steel plate. Then, aluminum of about 1000 Å thick was vacuum-deposited by vacuum deposition method to form light screening portion.

Next, on the same side as the vacuum-deposited side, the same ITO electrode as the above was formed.

On this substrate, photoconductive layer was formed by the same procedure as in the examplies 16–21.

[EXAMPLE 31]

The photosensitive member of FIG. 9 (i) was prepared as follows:

On one side of a glass substrate, ITO electrode (thickness 500 Å; surface resistance 100 Ω/□) was formed. Stainless steel plate chip was placed on it, and a-Se photoconductive layer was formed on this substrate by the same procedure as in the Example 18. Then, the chip was removed, and the lacking portion of the photoconductive layer was formed.

[EXAMPLE 32]

Aqueous solution of gelatin (solid components: 20%) was prepared by adding ammonium dichromate to gelatin by 10 wt %. This was heated at 40° C. and was coated on a glass substrate by spin coating method at 2000 rpm for 30 sec. Then, this was dried in an oven kept at 90° C. for one hour, and a gelatin photosensitive layer of 1 μm thick was obtained.

Next, chromium mask plate with striped pattern was placed on gelatin surface with mask surface and gelatin surface facing to each other. Ultraviolet ray contact exposure (mercury lamp) was performed from the side of chromium mask plate. After the exposure of 20 sec., the medium was taken out and was immersed in the aqueous solution at 40° C. The non-exposed portion was dissolved, and negative pattern was formed. After drying in an over for one hour, patterning was completed.

Next, the medium thus patterned was immersed in R-dye solution (Kayanol milling red RS; Nippon Kayaku); 5 g/liter, heated at 50° C. for 3 minutes and was taken out. After drying by water-washing drying at 2000 rpm for 10 sec., the patterned gelatin layer was dyed in red color. Further, acryl resin solution (JSS; Nippon Synthetic Rubber Co.) was coated as protective layer by spinner at 2000 rpm for 10 sec., and the film of 0.3 μm thick was obtained after curing at 150° C. for 30 minutes.

This process was repeated on G, and B by the same procedure, deviating the position of the patterned chromium mask plate. Finally, dyeing type striped color filter having R, G and B aligned at the line width of 10 μm was prepared. (G: Kayanol milling green 5 GW; B: Kayanol cyanine 6B; 5 g/liter aqueous solution was used in both cases.)

Next, acryl resin solution (JSS; Nippon Synthetic Rubber Co.) was coated as protective layer by the same procedure as above, after this was dried and cured to form a film of 0.3 μm, ITO electrode (thickness 500 Å; surface resistance 100 Ω/□) was formed.

On this substrate, photoconductive layer was formed by the same procedure as in the Examples 16–21.

[EXAMPLE 33]

A glass plate of 1 mm thick (Corning Glass; 7059 glass; square of 50 mm×50 mm) was polished on both sides (flatness: 0.1 μm). Aqueous solution of gelatin (solid components: 20%) was prepared by adding ammonium dichromate to gelatin by 10 wt %. This was heated at 40° C. and was coated on the above substrate by spin coating method at 2000 rpm for 30 sec. After drying in an oven kept at 90° C. for one hour, a medium having gelatin photosensitive layer of 1 μm thick was obtained.

Next, chromium mask plate (100 mm×100 mm square) having rectangular portion of 18 mm×13 mm to be exposed was placed on the above gelatin layer with the mask surface facing to the gelatin surface. Ultraviolet ray contact exposure (mercury lamp) was performed from the side of chromium mask plate. After the exposure of 20 sec., the medium was taken out and was immersed in water solution kept at 40° C. The nonexposed portion was dissolved, and negative pattern was formed. After drying it in an oven for one hour, the patterning was completed.

After the patterning was completed, the medium was immersed for 3 minutes in aqueous solution (5 g/liter) of R-dye solution (Kayanol milling red RS; Nippon Kayaku) heated at 50° C. After taking it out, it was dried by water-washing spin drying (2000 rpm; 10 sec.), and the patterned gelatin layer was dyed in red. Further, acryl resin solution (JSS; Nippon Synthetic Rubber Co.) was coated by spinner coating (2000 rpm; 10 sec.) and was cured (150° C.; 30 minutes).

Thus, a protective layer of 0.3 μm was formed, and color filter colored in red (R) was obtained.

By the same process as above, two patterned media were prepared. Instead of R-dye solution in the above dyeing process, the patterned media were dyed in the same condition in aqueous solution (5 g/liter) of G-dye solution (Kayaminol milling green 5GW) and B dyeing solution (Kayaminol cyanine 6B). The protective layer was formed by the same procedure, and color filters colored in green (G) and blue (B) were obtained.

The color filters of R, G and B thus obtained were cut by a glass cutter to leave only the dyed portions (18 mm×13 mm), and color separation filters of the same size for 3 colors were prepared.

Each of these color separation filters of R, G and B was disposed on the front of Ir, Ig and Ib of 3-plane division optical system as shown in FIG. 12 (b). The size of each of these Ir, Ig and Ib surfaces is the same as the size of color separation filter: 18 mm×13 mm. Next, a-Se photosensitive member prepared in the Example 18 was disposed with glass surface placed face-to-face to each surface of R, G and B color separation filters so that each of R, G and B images is formed on a-Se-Te layer of the electric charge generating layer on the photosensitive member.

Photographing procedure was as follows: The above photosensitive member and the electrostatic information recording medium prepared in the Example 3 were placed face-to-face using PET film (9 μm thick) with R, G and B portions removed as a spacer. With voltage of 750 V applied between two electrodes of the photosensitive member and the electrostatic information recording medium (positive electrode on the photosensitive member side), the optical shutter for 1/60 sec. was released, and outdoor scene was photographed with maximum exposure intensity of 1000 luxes on the light receiving portion.

As the result, positive electrostatic image corresponding to each of the separated colors of R, G and B were formed on the electrostatic information recording medium (size: 25 mm×50 mm).

[EXAMPLE 34]

Description is now given on the method to form holographic color filter.

For the photo mask 42 with slits in stripes, a normal photo mask can be used. In the present example, chromium was patterned on a glass substrate and was used. As the photosensitive material 41, an material having the resolution required and sensitivity to 3 primary colors can be used. Dichromate gelatin, photopolymer, etc. may be used. In the present example, a silver salt photosensitive material Kodak 649F was used.

(1) As shown in FIG. 17, photo mask 42 was set on the predetermined position on both sides of the photosensitive material 41. Krypton laser (647 nm) was irradiated from the opposite direction as R light, and the interference pattern by R light was recorded on the photosensitive material 41. Next, the photo mask was deviated by the predetermined distance, and the interference pattern was recorded using argon laser (514 nm) as G light. Further, the photo mask 42 was deviated by the predetermined distance, and interference pattern was recorded using argon laser (457 nm) as B light. (Exposure: 60 μJ/cm).

After this triplicate exposure, development was performed for 2 minutes by CWC-2 and bleaching was performed for one minute by PBQ-2. After washing with water for 10 minutes and drying in the air, holographic color filter was prepared.

Transmission type and reflection type differ from each other only in the direction of incident light, and the method to form color hologram is the same.

(2) The thickness of silver salt photosensitive material changes by swelling and shrinkage when it is processed by D-sorbitol water solution, for example. Thus, the spacing of interference fringes of hologram can be changed.

After the above Kodak 649F photosensitive material was immersed and swollen in 11.7% D-sorbitol water solution for one minute, photo mask 42 was set at the predetermined positions on both sides of this photosensitive material. By irradiating krypton laser (647 nm) from opposite direction, the green region of the photosensitive material was exposed to light, and interference pattern was recorded on green region.

Next, after the photosensitive material was immersed and swollen for one minute in 2% D-sorbitol water solution, photo mask 42 was deviated by the predetermined distance. The red region on the photosensitive material was exposed to the same krypton laser (647 nm), and the interference pattern was recorded.

Further, after the photosensitive material was immersed and swollen in 22.5% D-sorbitol water solution for one minute, photo mask 42 was deviated by the predetermined distance. Blue region of the photosensitive material was exposed to the same krypton laser (647 nm), and the interference pattern was recorded by the same procedure.

After the exposure, development was performed for 2 minutes by CWC-2, and bleaching was performed for one minute by PBQ-2. After washing with water for 10 minutes and drying in the air, holographic color filter was prepared.

The holographic color filter thus prepared was placed on a-Se photosensitive member prepared in the Example 18 as shown in FIG. 32 so that each of R, G and B images is formed on a-Se-Te layer of the electric charge generating layer on the photosensitive member.

The photographing procedure was as follows: The above photosensitive member and the electrostatic information recording medium prepared in the Example 3 were placed face-to-face using PET film (9 μm thick) with R, G and B portions removed as a spacer. With voltage of 750 W applied between two electrodes of the photosensitive member and the electrostatic information recording medium (positive electrode on photosensitive member side), optical shutter was released for 1/60 sec., and outdoor scene was photographed with maximum exposure intensity of 1000 luxes on the light receiving portion.

As the result, positive electrostatic charge image corresponding to each of R, G and B regions was formed on the electrostatic information recording medium (size: 25 mm×50 mm).

[EXAMPLE 35]

Electrostatic information recording and reproducing method on the first electrostatic information recording medium As shown in FIG. 33, single layer organic photosensitive member (PVK—TNF) prepared in the Example 16 and the electrostatic information recording medium prepared in the Example 1 were disposed with the surface of the medium placed face-to-face to the photoconductive surface of the above photoconductive layer and grounded. Next, DC voltage of 700 V was applied between two electrodes with the photosensitive member side as positive and the resin layer side as negative.

Under voltage application, exposure was performed for 1 second using halogen lamp of 1000 luxes as light source from the side of the photosensitive member, and the formation of electrostatic latent image was completed.

Next, the potential difference between the electrode and the medium surface was measured. The surface potential of 100 V was measured on the medium surface by surface potentiometer, and the surface potential on non-exposed portion was 0 V.

[EXAMPLE 36]

Process for recording electrostatic information in the first electrostatic information recording medium and reproducing it The photosensitive member (PVK—TNF) prepared in Example 16 was located in opposition to the polyester electrostatic information recording medium prepared in Example 10, using as the spacer a 10 μm thick polyester film. Subsequently, a DC voltage of −600 V was applied between both electrodes with the photosensitive member negatively and the resinous layer positively.

While the voltage was impressed, the recording medium was exposed from the photosensitive member to light emanating from a light source halogen lamp at a luminous intensity of 1000 luxes for one second.

As a result of the measurement of surface potentials, the surface potential of the recording medium was found to be −150 V by a surface electrometer. However, the unexposed region was found to have a surface potential of −35 V.

[EXAMPLE 37]

The photosensitive member 9PVK—TNF) of Example 16 and the electrostatic information recording medium of Example 14 (a) are laid on top of another with the electrode outside, and are then set in a camera. In order to provide a space between the photosensitive member and the recording medium, a 10 μm polyester film is disposed as the spacer around the surface to be exposed to light.

With the photosensitive member's electrode negatively and the recording medium positively, a voltage of −700 V was impressed. In that state, the optical shutter was clicked at an exposure f=1.4 and a shutter speed of 1/60 sec., or a voltage was applied for 1/60 sec. at an exposure f=1.4 with the shutter held open, thereby photographing a subject outdoors in the daytime. After the exposure and the application of voltage were put off, or the application of voltage was put off, the electrophotographic recording medium was removed out in a bright or dark place, and (1) CRT imaging was carried out by microarea potential reading and (2) imaging was performed by toner development.

In (1), X-Y axis scanning was carried out with a 100×100 μm probe for measuring microarea surface potentials to process potential data of 100 μm units, and imaging was performed on a CRT by potential brightness conversion. Formed on the electrostatic information recording medium is an analog potential latent image from a high potential −200 V of the exposed region to a low −50 V of the unexposed region, which could be developed on the CRT at a resolution of 100 μm.

In (2), the removed electrostatic information recording medium was immersed in a negatively charged wet toner (black) for 10 seconds, thereby obtaining a positive image. The resolution of the obtained toner image was as high as 1 μm.

Color images were photographed in the following manners.

(1) Prismatic Three Plane-Splitting

As illustrated in FIG. 12, the R, G and B filters were disposed on three planes of a prism. While the above media were set on the planes, a subject was photographed at f=1.4 and a shutter speed of 1/30 sec.

(2) Color CRT Displaying

The R, G and B latent images were read by scanning in a similar manner to form on a CRT fluorescences corresponding to the R, G and B latent images, and images separated into three colors were compounded on the CRT to obtain a color image.

(3) Toner Development

The electrostatic information recording medium subjected to color separation and exposure was developed with C (cyan), M (magenta) and Y (yellow) charged negatively with respect to the R, G and B latent images to form toner images. Before the toner were dried, paper was put on the medium on which the cyane toner image was formed, and was then positively charged by corona. Thereafter, the toner image was transferred to the paper upon released. While the images were in alignment, the magenta and yellow toners were successively transferred to the same position, whereby a color image is formed on the paper.

[EXAMPLE 38]

The photosensitive member (PVK—TNF) of Example 16 was superposed on the electrostatic information recording medium of Example 14 (a) in opposite relation through a spacer of a 10 μm thick polyester film. Then, a DC voltage of −700 V is applied between both electrodes with the photosensitive member negatively and the insulating layer positively.

It is noted that in the case of the amorphous silicon photosensitive member, voltage is applied with the photosensitive member negatively, while in the case of the amorphous selenium, voltage is applied with the photosensitive member positively.

While the voltage was impressed, the recording medium was exposed from the photosensitive member to light emanating from a light source halogen lamp at a luminous intensity of 1000 luxes. After the exposure, the voltage was put off. As a result, a surface potential of −220 V was measured on the exposed region of the recording medium by means of a surface electrometer, while a surface potential of −35 V was obtained on the unexposed region thereof.

Then, dimethyl silicon oil was used as contact material, and a polyester film was laminated by using dimethyl silicon as the close contact type adhesive agent to read potentials from above the film. As a result, a surface potential of −220 V was again measured by a surface electrometer. After this polyester film was peeled off, additional potential reading indicated that charges were retained in the insulating layer.

The recording medium was also similarly exposed to light, while a resolution pattern film was brought in close contact with the photosensitive member. Thereafter, the recording medium was subjected to X-Y axis scanning with a 50×50 μm probe surface for measuring microarea potentials to process potential data of 50 μm units, which were then displayed on a CRT by potential-brightness conversion on an enlarged scale. In consequence, resolution patterns of up to 100 μm were confirmed on the CRT. After the exposure, the electrostatic information recording medium was allowed to stand at room temperature of 25° C. and 35% R.H. for three months. Subsequent similar potential reading by scanning indicated that the obtained resolution patterns were quite similar to those just after the exposure.

After the exposure of the resolution pattern, an insulating film was laminated in place and a resolution of up to 100 μm was obtained on the CRT by reading from above the laminated film.

A subject was photographed with an ordinary camera at an exposure f=1 and a shutter speed of ⅟₆₀ sec. outdoors in the daytime, while a voltage of −700 V was impressed. After the exposure, the electrostatic information recording medium was subjected to X-Y axis scanning with a 50×50 μm probe surface for measuring microarea potentials to process potential data of 50 μm units, which were then displayed on a CRT by potential-brightness conversion on an enlarged scale. As a result, it was found that imaging of good gradation occurred. A similar film as stated above was laminated on the electrostatic information recording medium to measure imaging from above the laminated film. In consequence, it was found that imaging having gradation quite similar to that in the absence of any laminated film occurred.

[EXAMPLE 39]

Figure 66:
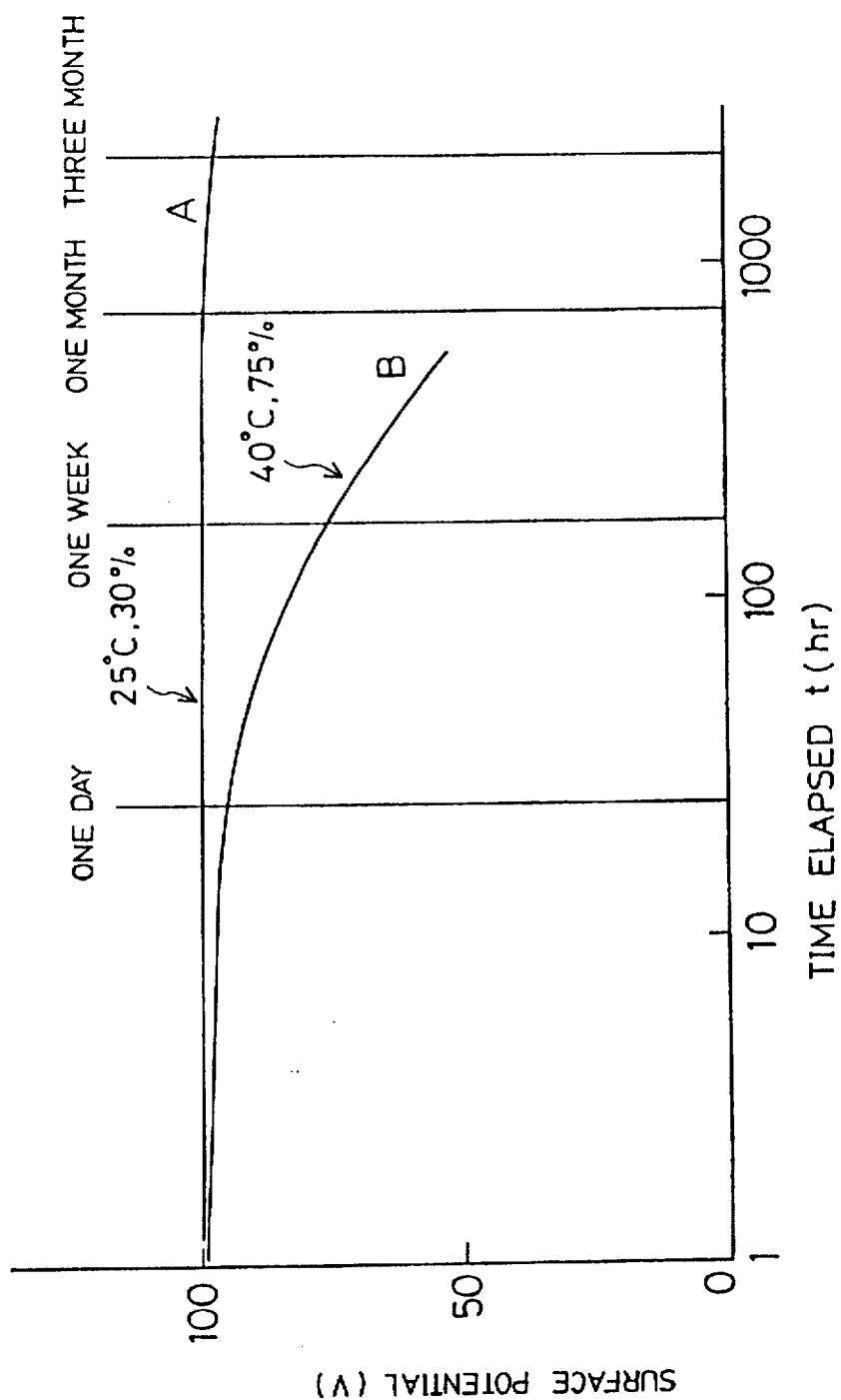
FIG. 66 is a drawing to show electric charge carrying property of the electrostatic information recording medium prepared by Example 10 (a)

FIG. 66 is a graphical view showing the charge retainability of the electrostatic information recording medium of Example 14 (a), in which the results of the surface potentials, as measured, are plotted with the time elapsed.

A line A refers to the recording medium allowed to stand at a temperature of 25° C. and a humidity of 30%. Even after the lapse of three months, the surface charges on the recording medium were not attenuated. A line B refers to the recording medium allowed to stand at a temperature of 40° C. and a humidity of 75%. After the lapse of one week, the attenuation of the surface charges was barely about 25%.

[EXAMPLE 40]

Photosensitive Member Provided with Discharge-Reinforcing Layer

The transparent electrode to be used was obtained by providing a 1000 Å thich $In_2O_3$-$SnO_2$ (ITO) film on a glass substrate of 1 mm in thickness by sputtering. A 10 μm thick a-Se film was then formed on the ITO film by vacuum vapor-deposition ($10^{-5}$ Torr, resistance heating) to construct a photoconductive material.

TiC was further formed to a thickness of 500 Å on the a-Se layer by sputtering ($10^{-2}$ Torr, argon plasma) to form a discharge-reinforcing layer. Thus, the final photosensitive member was formed using the above photoconductive material.

In order to obtain the electrostatic information recording medium, on the other hand, aluminium was formed to a thickness of 1000 Å on a glass substrate of 1 mm in thickness by vacuum vapor deposition ($10^{-5}$ Torr, resistance heating), and a silicone resin layer (CR-15, 2%, TSR-144, available from Toshiba Silicone) was provided by spinner coating (with a 10% toluenexylene solution and at 1000 rpm×10 sec.), followed by 1 hour heating at 150° C., thereby forming an insulating layer having a film thickness of 6 μm.

Both the members were arranged through an air gap of 10 μm with the film sides opposite to each other.

Referring to voltage application and exposure, a voltage of 400 V was applied between both electrodes while using the photosensitive member's electrode as the positive electrode. In that state, a half area of the photosensitive member was exposed through a mask to light emanating from a halogen lamp at 10 luxes for 1 second. After the exposure, the voltage was cut off, followed by the removal of the electrostatic information recording medium. Afterwards, the potentials stored on the exposed and unexposed regions were found to be 150 V and 30 V, respectively, by measurement with a surface electrometer.

On the other hand, a photosensitive member comprising the a-Se layer alone, i.e., which was not provided with any discharge-reinforcing layer, was impressed with voltage and exposed to light under similar conditions. As a consequence, no storage of potentials was observed on both the exposed and unexposed regions.

When this photosensitive member was impressed with a voltage of 700 V and exposed to light in a similar manner as mentioned above, it was observed that the surface potentials were 170 V on the exposed region and 40 V on the unexposed region, these numerical values being substantially equal to the accumulated potentials obtained when the discharge-reinforcing layer was provided.

From the foregoing, it has been found that the voltage to be externally impressed can be effectively reduced by the provision of such a discharge-reinforcing layer.

[EXAMPLE 41]

The discharge-reinforcing layer of Example 40 was formed on the a-Se layer to a thickness of 300 Å by EB vapor deposition ($10^{-5}$ Torr), provided however that $CeB_6$ was used in place of TiC. When the electrostatic information recording medium was subjected to similar voltage application and exposure, it was observed that surface potentials of 120 V and 40 V were obtained on the exposed and unexposed regions, respectively.

[EXAMPLE 42]

An $SnO_2$ film was formed on an 1 mm thick glass substrate to a thickness of 2000 Å by sputtering to prepare a transparent electrode. A 5% (calculated as solid) solution of an 1:1 (molar ratio) mixture of polyvinyl carbazole (available from Anan Koryo) and 2,4,7-trinitrofreonone (available from Junsei Chemical) in chloroform was then spread on the above substrate with a doctor blade (with a gap width of 200 µm). Subsequent one hour drying at 60° C. gave a photoconductive layer having a film thickness of 15 µm.

With an $LaB_6$ target, a 300 Å thick $LaB_6$ film was further sputtered on the above photoconductive layer to prepare a discharge-reinforcing layer.

An electrostatic information recording medium similar to that of Example 40 was used. For the impression of voltage and exposure, a voltage of 400 V was applied between both electrodes, while the photosensitive member's electrode was used as the negative electrode. As a result of the exposure of the recording medium to light under exposure conditions similar to those applied in Example 40, surface charges of −180 V and −55 V were obtained on the exposed and unexposed regions, respectively.

For the purpose of comparison, similar voltage impression and exposure were carried out with only the PVK—TNF layer, i.e., on which no $LaB_6$ film was formed. The result was that no charge was obtained at all on the electrostatic information recording medium. On the other hand, the externally applied voltage was increased to −1000 V. The results were that charges of −200 V and −80 V were obtained on the exposed and unexposed regions, respectively.

[EXAMPLE 43]

$TiO_2$ was formed on the inorganic photosensitive member of amorphous silicon (a-Si:H) prepared in Example 17 to a thickness of 500 Å by sputtering to form a discharge-reinforcing layer. The electrostatic information recording medium prepared in Example 40 was impressed with a voltage of −500 V, while the photosensitive member's electrode was used as the negative electrode, and was then exposed to light emanating from a halogen lamp at 10 luxes for $10^{-3}$ sec. The results were that surface potentials of −180 V and −110 V were measured on the exposed and unexposed regions, respectively.

On the other hand, similar experiment was carried out with a photosensitive member on which no discharge-reinforcing layer was formed. No surface voltage was observed at the same voltage. When the applied voltage was increased to, e.g., −800 V, the same potentials of −80 V appeared on both the exposed and unexposed regions, so that no image of the exposed region was formed. Hence, it was found that by the provision of a discharge-reinforcing layer, not only could the effective external voltage be decreased but the responsibility to light could also be increased.

[EXAMPLE 44]

Process for recording electrostatic information in the second electrostatic information recording medium and reproducing it With a micropipet, ω-phenylic acid was added dropwise in water to form a monomolecular film of ω-phenylic acid on the surface of the water. On the other hand, aluminium was vapor-deposited on an 1 mm thick glass substrate to form an electrode layer having a thickness of 1000 Å. Ten monomolecular films, each as mentioned just above, were laminated on the electrode surface at a surface pressure of 30 dynes/cm$^2$ and a drawing-up rate of 1 cm/min. to obtain a film having a thickness of 200 Å. Subsequent air-drying gave the electrostatic information recording medium 3 according to the present invention.

This recording medium 3 is located in opposition to the photosensitive member 1 prepared in Example 16 through a void of about 10 µm defined by a 10 µm thick polyester film used as the spacer. Then, a DC voltage of −500 V is applied between both electrodes with the photosensitive member negatively and the recording medium positively. In that state, the recording medium is exposed from the back side of the photosensitive member to light emanating from a light source halogen lamp at a luminous intensity of 1000 luxes for 1 second. After the completion of the exposure, the voltage is cut off. The formation of an electrostatic latent image is then completed by the removal of the recording medium 3. As a result, the charge retaining layer was found to have a surface potential of −20 V by measurement with a surface electrometer. However, the surface potential of the exposed region was 0 V.

Similar exposure was carried out while a resolution pattern film was brought in close contact with the back side of the photosensitive member. Afterwards, the electrostatic information recording medium was subjected to X-Y axis scanning with a 50×50 µm probe surface for measuring microarea potentials to process potential data of 50 µm units, which were then displayed on a CRT by potential-brightness conversion on an enlarged scale. As a result, resolution patterns of up to 100 µm were confirmed on the CRT. After the exposure, the electrostatic information recording medium was allowed to stand at room temperature of 25° C. and 35 R.H. for three months for similar potential reading by scanning. As a consequence, resolution pattern displays quite similar to those just after the exposure were obtained.

For alternative exposure, a subject was photographed with an ordinary camera at an impression voltage of −500 V, an exposure f=1.4 and a shutter speed of ¹⁄₆₀ sec. outdoors in the daytime. After the exposure, the recording medium was subjected to X-Y axis scanning with a 50×50 pm probe surface for measuring microarea potentials to process potential data of 50 µm units, which were then displayed on a CRT by potential-brightness conversion on an enlarged scale. As a result, imaging having gradiation occurred.

[EXAMPLE 45]

Octadecyl maleate was used as the material for an LB film, and an electrostatic information recording medium having a film thickness of 300 Å was prepared with similar substrate and process to those described in Example 44. For the estimation of the charge retainability of this recording medium, a surface potential of 50 V was given to the medium's surface by corona charging (which involves applying high voltage to a corona wire to give the discharged ions to an object along the electrified). Under such conditions expressed in terms of room temperature (25° C., 35% R.H.), 40° C. (dry) and 60° C. (dry), the surface potential attenuation characteristics were estimated. The results were that no potential change was found whatsoever at room temperature even after five months, and the potentials existed in stable for two months at 40° C. (dry) and up to as long as 15 days at 60° C. (dry).

For the purpose of comparison, in place of the LB film, a 10% by weight solution of a polyester resin (Vylon 200 available from Toyobo) in chloroform was coated to a thickness of 2 μm (on dry basis) with a doctor blade to form a charge retaining layer, of which similar estimation was then made. The results were that the surface potential attenuated to 40 V even after allowed to stand at room temperature for one day and dropped to 10 V at 40° C. even after the lapse of one day. At 60° C., no potential could be measured even after the lapse of one day.

[EXAMPLE 46]

An electrostatic information recording medium comprising octadecyl maleate was used. After a 2 μm resolution pattern had been formed on the surface of the charge retaining layer in such a manner as described in Example 44, the recording medium was allowed to stand at 40° C. (dry) for one day. Thereafter, toner development was carried out with a wet toner of (−) polarity. The resulting toner image reproduced faithfully the resolution pattern, and toner development having a resolution of 2 μm occurred.

For the purpose of comparison, similar estimation was made with a medium in which the charge retaining layer was formed of a polyester resin. The results were that the concentration of toner development dropped due to a surface potential attenuation and, at the same time, the resolution of the toner image itself was so reduced that the image faded.

[EXAMPLE 47]

Third Electrostatic Information Recording Medium (Thermal Electret)

Aluminium was deposited on a 20 μm thick polyvinylidene fluoride film to a thickness of 1000 Å by vacuum vapor deposition ($10^{-6}$ Torr, resistance heating) to form an electrostatic information recording medium, on which an electrostatic latent image was formed with a photoconductive member of the function-separated type.

A hot plate (3×3 cm) was first brought in contact with the aluminium substrate side of the recording medium to heat the recording medium to 180° C. Immediately after heating, the photosensitive member was located in opposition to the recording medium through an air gap of 10 μm in face-to-face relationship. A voltage of −550 V was applied between both electrodes (with the photosensitive member's electrode negatively), followed by exposure. This exposure was carried out at 10 luxes from the back side of the photosensitive member for a character pattern manuscript for 1 second, using a halogen lamp as the light source.

Afterwards, the film was air-cooled. The results were that a potential of −150 V was measured on the exposed (character) region, but no potential was measured on the unexposed region. Water was added dropwise to the film on which the charged pattern was formed, which film was then removed out to measure its potential. The result was that a potential of −150 V was again obtained on the exposed region. On the other hand, a similar electrostatic information recording medium was forcedly charged on its surface at −150 V by corona discharge. Thereafter, water was added dropwisely to the medium, which was then removed out. As a result, it was found that the exposed region, previously charged to −150 V, was completely deprived of charge. Hence, it was noted that in the process of charging with the application of heat, polyvinylidene fluoride was subjected to internal polarization, resulting in the formation of an electret.

With the thus formed electret used as an electrostatic information recording medium, such potential reading as mentioned above was possible.

[EXAMPLE 48]

Third Electrophotographic Information Recording Medium (Optical Electret)

Aluminium was laminated on an 1.1 mm thick glass support to a thickness of 1000 Å by sputtering to make a substrate, and zinc sulfide was then deposited (at $10^{-5}$ Torr and by resistance heating) on the resulting aluminium layer to a film thickness of about 1.5 μm. An ITO surface formed on glass was located in opposition to the surface of the zinc sulfide layer through an air gap of 10 μm, while a voltage of +700 V was applied between both electrodes (with the Al electrode negatively). In that state, exposure was carried out from the ITO substrate in a similar manner as described in Example 47. The results were that a potential of +80 V was measured on the exposed region, but not potential was found on the unexposed region. Again, similar water droplet experiment as in Example 47 was carried out. After the removal of water droplet, no potential change was found. Thus, there was obtained an electret in which charges were accumulated.

With the thus formed optical electret used as an electrostatic information recording medium, such potential reading as mentioned above was possible.

[EXAMPLE 49]

Fourth Electrostatic Information Recording Medium

An $SiO_2$ film was sputtered on a glass substrate vapor-deposited with 1000 Å aluminium to form a charge retainability-reinforcing layer 10 having a film thickness of 100 Å. Further coated on that film was a mixed solution composed of 1 g of a polyester resin (Vylon 200) and 10 g of chloroform by doctor blade coating to form an insulating layer having no charge injection. Subsequent 1 hour drying at 100° C. gave an insulating layer 11 having a film thickness of 10 μm.

[EXAMPLE 50]

In the process for making an electrostatic information recording medium, as described in Example 49, the order of lamination of the charge retainability-reinforcing layer and the insulating layer having no charge injection was reversed. In other words, a mixed solution of 1 g of a polyester resin (Vylon 200) and 10 g of chloroform was first coated on a glass substrate vapor-deposited with 1000 Å thick aluminium by doctor blade coating, and was then dried at 100° C. for 1 hour to form the insulating layer 11. Subsequently, an SiO$_2$ film having a film thickness of 100 Å was sputtered as the charge retainability-reinforcing layer 10 on the insulating layer.

[EXAMPLE 51]

A mixed solution composed of 1 g of a polyester resin (Vylon 200) and 10 g of chloroform was coated on a glass substrate vapor-deposited with 1000 Å thick aluminium by doctor blade coating, and was then dried at 100° C. for 1 hour to form an insulating layer having a thickness of 10 µm. On the other hand, ω-phenylic acid was added dropwise in water by a micropipet to form a monomolecular film of ω-phenylic acid on the surface of the water. Five monomolecular films, each as mentioned just above, were laminated on the above polyester resinous layer at a surface pressure of 30 dynes/cm$^2$ and a drawing-up speed of 1 cm/min. to a film thickness of 100 Å, followed by air-drying.

[EXAMPLE 52]

A mixed solution of 1 g of a polyester resin (Vylon 200) and 10 g of chloroform was coated by doctor blade coating, on a glass substrate with 1000 Å thick vapor-deposited aluminium, and was then dried at 100° C. for 1 hour, followed by further vapor-deposition of polyethylene to a film thickness of 100 Å.

[EXAMPLE 53]

The single layer organic photosensitive member of Example 16 was located in opposition to the electrostatic information recording medium 3 prepared in Example 49 through an air gap of 10 µm defined by a 10 µm thick polyester film used as the spacer. Then, a DC voltage of −700 V was applied between both electrodes with the photosensitive member negatively and the recording medium positively. In that state, exposure was carried out from the back side of the photosensitive member for 1 second, while using as the light source a halogen lamp having a luminous intensity of 1000 lux. After the completion of the exposure, the voltage was shut off. A surface potential of −200 V was measured on the exposed region of the recording medium by a surface electrometer, while a surface potential of 0 V was obtained on the unexposed region thereof.

Similar exposure was carried out, while a resolution pattern film was brought in close contact with the back side of the photosensitive member. Thereafter, the electrostatic information recording medium was subjected to X-Y axis scanning with a 50×50 µm probe surface for measuring microarea potentials to process potential data of 50 µm units, which were then displayed on a CRT by potential-brightness conversion on an enlarged scale. As a result, resolution patterns of up to 100 µm were confirmed on the CRT. After the exposure, the recording medium was permitted to stand at room temperature of 25° C. and 35 R.H. for three months. Afterwards, similar reading by scanning indicated that resolution pattern displays quite similar to those just after the exposure were obtained.

For alternative exposure, a subject was photographed with an ordinary camera at an impression voltage of −700 V, an exposure f=1.4 and a shutter speed of 1/60 sec. outdoors in the daytime. After the exposure, the electrostatic information recording medium was subjected to X-Y axis scanning with a 50×50 µm probe surface for measuring microarea potentials, which are then displayed on a CRT by potential-brightness conversion on an enlarged scale. As a result, imaging having gradiation was found to occur.

Color images were photographed in the following manners.

(1) Prismatic three-plane splitting

As illustrated in FIG. 12, the R, G and B filters were disposed on three planes of a prism, and the same media as described above were set on the planes to photograph a subject at an exposure f=1.4 and a shutter speed of 1/30 sec.

(2) Color CRT displaying

The R, G and B latent images were read by scanning in a similar manner to form on a CRT fluorescences corresponding thereto, and the resulting images separated into three colors were compounded on the CRT to obtain a color image.

[EXAMPLE 54]

Fifth Electrostatic Information Recording Medium

A solution of 10 g of a rosin ester resin (Stayberite Ester 10) dissolved in 90 g of n-butyl alcohol was coated on a glass substrate vapor-deposited with 1000 Å thick aluminium by spinner coating (at 1000 rpm for 90 seconds). In order to evaporate off the solvent, the substrate was permitted to stand at 60° C. for 1 hour. As a result, an evenly coated film having a film thickness of 2 µm was formed.

Amorphous selenium was vapor-deposited on this medium under the following conditions.

The medium is first fixed to a substrate holder in a vacuum chamber, while the glass surface comes in contact therewith. This substrate holder can be heated (by means of a heater) such that the substrate medium is heated to 100° C. during vapor deposition. Vapor deposition is carried out by ordinary resistance heating. In this case, selenium was vapor-deposited at a degree of vacuum as low as 0.1 Torr. As a result, selenium is deposited in the form of microparticles in the rosin ester resin layer to a depth of 0.1 µm, said particles having a mean particle size of about 0.5 µm. Thus, there was obtained an electrostatic information recording medium as illustrated in FIG. 4 (a).

[EXAMPLE 55]

As a resinous layer, a thermosetting epoxy resin (Aduldite available from Ciba Geigy) was coated on a similar substrate as used in Example 54 by spinner coating, in order to evaporate off the solvent, the substrate was permitted to stand at 60° C. for 30 minutes. Then, while the resin remained uncured, selenium was deposited on the resinous layer at a similar degree of vacuum as applied in Example 54. In this case, however, selenium was deposited at normal temperature without heating the substrate holder. As a result, the particulate layer was formed in the vicinity of the interior surface of the epoxy resin, as was the case with the rosin ester resin. In order to cure the epoxy resin, the substrate was thereafter permitted to stand at 120° C. for 1 hour. As a result, the resinous layer was cured to give a 15 µm thick electrostatic information recording medium in which selenium particles existed.

[EXAMPLE 56]

As a resinous layer, a modified acrylate resin (VDAL-388 available from Dainichi Seika) that was an ultraviolet curable resin was coated on a similar substrate as used in Example 54 by spinner coating (at 1000 rpm for 20 seconds) to provide thereon an uncured resinous layer. In that state, the vapor deposition of selenium was carried out under similar vacuum conditions as applied in Example 54.

Thereafter, the substrate was removed out from within the chamber, and was then irradiated with ultraviolet rays emanating from an ultraviolet lamp (a 365 nm peak lamp) in an quantity of light of 50 mJ/cm² to cure the resinous layer. As a result, there was obtained an electrostatic information recording medium comprising a resinous layer of 8 µm in thickness and a solenium layer being present in the form of a single layer located about 0.5 µm below the surface of the acrylate resinous layer with the selenium particles having a mean particle size of 0.3 µm.

[EXAMPLE 57]

A 50% solution of a silicone resin (TSR-144 available from Toshiba Silicone and containing 1% of a curing agent CR-15) diluted with xylene was coated on an 1 mm thick glass substrate vapor-deposited with 1000 Å thick aluminium by spinner coating (at 1000 rpm for 20 seconds). Thereafter, the solvent was evaporated off at 150° C. for 1 hour to cure the resin. As a result, an evenly coated film having a film thickness of 7 µm was formed.

Amorphous selenium was formed on this medium under the following conditions by vapor deposition. The medium is first fixed to a substrate heating holder within a vacuum chamber, while the glass surface comes in contact therewith. During vapor deposition, the substrate was heated to a temperature of 90° C. to vapor-deposit selenium at a degree of vacuum as low as 1 Torr. As a result, selenium was finely divided to a particle size of about 1 µm and laminated on the silicone resin in a single layer state.

Then, the material to be deposited was changed from selenium to a polyethylene (having a degree of polymerization of −20000). At a degree of vacuum as high as 1×10⁻⁵ Torr, a 0.1 µm polyethylene vapor-deposited film was formed on the selenium layer by resistance heating, thus resulting in the formation of an electrostatic information recording medium in which the granular layer of selenium was present within the resinous layer.

[EXAMPLE 58]

While the material to be deposited was changed from selenium to gold, deposition was carried at a low degree of vacuum under similar conditions as applied in Example 54. As a result, there was obtained an electrically conductive particle type of electrostatic information recording medium in which gold microparticles having an average particle size of 0.2 µm were in the form of a single layer located 0.1 µm below the surface of the Stayberite resin.

[EXAMPLE 59]

Aluminium was vapor-deposited on one side of a 12.5 µm thick fluorine film (an FEP film available from Daikin Kogyo) to obtain a substrate. Under similar vapor deposition conditions as applied in Example 42, selenium particles were vapor-deposited on the surface of the film. As a result, a uniform particulate layer of selenium having a particle size of about 0.4 µm was formed in a single layer state. Then, further sputtered on this selenium layer was a Teflon target (available from Kyodo International) at an argon pressure of 3 mTorr and a power density of 7 W/cm² with a sputter (an RF magnetron sputter) to form an about 1000 Å thick Teflon resin layer on the selenium layer. As a result, a film-like electrostatic information recording medium was obtained.

[EXAMPLE 60]

An organic photoconductive material poly-N-vinyl carbazole (PVK: Tubicol 210 available from Anan Koryo) was vapor-deposited under vacuum on the silicone resin (TSR-144) substrate (a glass substrate vapor-deposited with 1000 Å thick aluminium) prepared in Example 57 under the following conditions. Without applying heat to the substrate, resistance heating was carried out at normal temperature and a degree of vacuum of 10⁻³ Torr. As a result, PVK was laminated on the silicone resin in the particulate form having a mean particle size of about 5 µm. Further sputtered on this PVK layer was a Teflon target (available from Kyodo International) at an RF pressure of 3 mTorr and a power density of 7 W/cm² with a sputter (an RF magnetron sputter) to form an about 2000 Å thick Teflon resin layer, thereby making an electrostatic information recording medium.

[EXAMPLE 61]

A 50% solution of silicon resin (TSR-144 available from Toshiba Silicone and containing 1% of a curing agent CR-15) diluted with xylene was coated on a 1 mm thick glass substrate vapor-deposited with 1000 Å thick aluminium by spinner coating (at 1000 rpm for 20 seconds). Thereafter, the solvent was evaporated off at 150° C. for 1 hour to cure the silicone resin. As a result, there was formed a silicone resin layer having a film thickness of 7 µm.

Then, 10 g of a rosin ester resin (Steberite Ester 10) and 10 g of zinc oxide (having a mean particle size of 10 µm) were mixed with 80 g of n-butyl alcohol, and the mixture was put with 100 g of glass beads (3 mmφ) in a stainless-made cylindrical vessel of 300 ml in volume, followed by lidding. The solution was then dispersed with a vibration type dispersing machine (Red Devil) for 2 hours. The solution was removed out, and the zinc oxide layer was then coated on the silicone resin layer by spinner coating (at 500 rpm for 60 seconds), followed by drying at 60° C. for 3 hours. As a result, there was formed a laminated type of electrostatic information recording layer including a 3 µm thick dispersed layer, as illustrated in FIG. 4 (b).

[EXAMPLE 62]

The zinc oxide-resin dispersed solution prepared in Example 61 was coated directly on an aluminium vapor-deposited substrate with a whaler (at 200 rpm for 30 seconds), followed by drying at 60° C. for 3 hours. As a result, there was formed a dispersed type of electrostatic information recording medium having a film thickness of 15 µm, as illustrated in FIG. 4 (c).

[EXAMPLE 63]

The single layer organic photosensitive member (PVK—TNF) of Example 16 is located in opposition to the electrostatic information recording medium prepared in Example 54 through a spacer of a 10 µm thick polyester film, and a DC voltage of −700 V is applied between both electrodes with the photosensitive member negatively and the resinous layer positively. While the voltage is impressed, exposure is carried out from the photosensitive member for 1 second, using as the light source a halogen lamp having a luminous intensity of 1000 luxes. After the exposure, the recording medium is removed out and exposed on its entire surface to light, whereby the formation of an electrostatic latent image is completed.

As a consequence, a surface potential of −100 V was measured on the exposed region of the recording medium by a surface electrometer, while a surface potential of 0 V was obtained on the unexposed region thereof.

Prior to overall exposure, a surface potential of −110 V was measured on the exposed region, when the surface potential of the electrostatic information recording medium was measured in a dark place. It was thus found that charges were accumulated in the selenium particles by overall exposure.

Similar exposure was then carried out, while a resolution pattern film was brought in close contact with the glass substrate of the photosensitive member. Thereafter, the electrostatic information recording medium was subjected to X-Y axis scanning with a 50×50 μm probe surface for measuring microarea potentials to process potential data of 50 μm units, which were then displayed on a CRT by potential-brightness conversion on an enlarged scale. As a result, resolution patterns of up to 100 μm were confirmed on the CRT. After the exposure, the recording medium was permitted to stand at room temperature of 25° C. and 35% R.H. for 3 months. As a result of subsequent potential reading by scanning, resolution pattern displays quite similar to those just after the exposure were obtained.

For alternative exposure, a subject was photographed with an ordinary camera at an impression voltage of −700 V, an exposure f=1.4 and a shutter speed of ⅟₆₀ sec. outdoors in the daytime. After the exposure, the electrostatic information recording medium was subjected to X-Y axis scanning with a 50×50 μm probe surface for measuring microarea potentials to process potential data of 50 μm units, which were then displayed on a CRT by potential-brightness conversion on an enlarged scale. As a result, imaging having gradiation occurred.

Color images were photographed in the following manners.

(1) Prismatic three-plane splitting

As illustrated in FIG. 12, the R, G and B filters were disposed on three planes of a prism, and the same media as mentioned above were set on the planes to photograph a subject at f=1.4 and a shutter speed of ⅟₃₀ sec.

(2) Color CRT displaying

The R, G and B latent images were read by scanning in a similar manner to form on a CRT fluorescences corresponding thereto, and the images separated into three colors were then compounded on a CRT to obtain a color image.

Table 1 shows the charge retainability of the electrostaticinformation recording media of Examples 54 to 62, as expressed in terms of the surface potentials measured with the lapse of time. For the purpose of comparison, the surface potentials with time of electrostatic information recording media A and B consisting only of single rosin ester and silicone resin layers are also tabulated.

TABLE 1

Estimation of Stability with Time of Internally Accumulated Cahrges

| Ex. Nos. | Initial pot. (V) (1*) | Initial pot. (V) (2*) | 1-day stor. (60° C., dry) | 7-day stor. (60° C., dry) | 30-day stor. (60° C., dry) |
| --- | --- | --- | --- | --- | --- |
| 39 | −100 | −100 | −85 | −70 | −55 |
| A  | −105 | −105 | −40 | 0    | 0   |
| 40 | −80  | −75  | −60 | −45  | −30 |
| 41 | −140 | −120 | −100 | −85 | −50 |
| 42 | −150 | −135 | −130 | −115 | −85 |
| B  | −155 | −155 | −130 | −50  | 0   |
| 43 | −100 | −100 | −90 | −65  | −40 |
| 44 | −130 | −115 | −115 | −100 | −70 |
| 45 | −120 | −110 | −100 | −85  | −50 |
| 46 | −165 | −140 | −120 | −80  | −55 |
| 47 | −180 | −170 | −150 | −105 | −65 |

(1*): Initial potentials of the exposed regions before overall exposure.
(*2): Initial potentials of the exposed regions after overall exposure.
Note that the photosensitive members used were all PVK - TNF of Example 12 with external application of a voltage of −700 V.

[EXAMPLE 64]

Sixth Electrostatic Information Recording Medium

An aluminium electrode was laminated on a 1 mm thick glass substrate to a film thickness of 1000 Å by vacuum vapor deposition ($10^{-5}$ Torr). Coated thereon was spread a 50% solution of a silicone resin (TSR-144, 1% CR-15, available form Toshiba Silicone) in xylene by spinner coating (at 1000 rpm for 30 sec.), which was in turn dried at 150° C. for 1 hour for the provision of an insulating film having a film thickness of 7 μm. Then, the substrate was heated to 100° C. with a heater plate. In that state, selenium was vapor-deposited on the substrate at a low degree of vacuum (3 Torr) for 60 seconds, thereby providing on the silicone layer a crystalline granular layer of selenium having a mean diameter size of 0.5 μm.

Figure 5A:
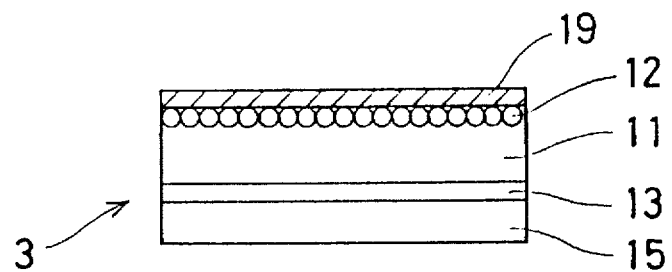
FIG. 5 is a cross-sectional view of the sixth electrostatic information recording medium of this invention.
Figure 5B:
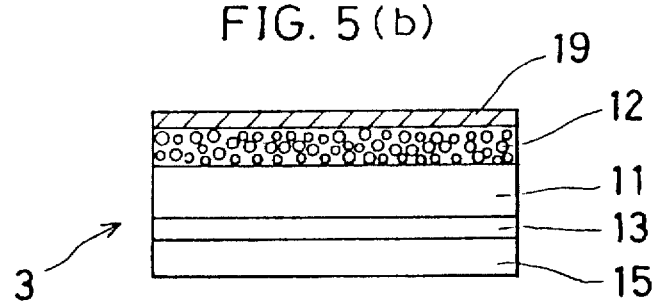
Figure 5C:
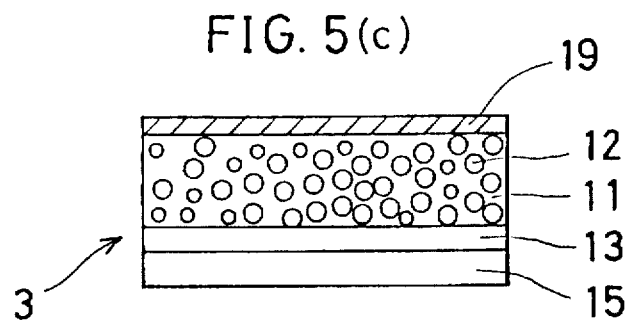
Figure 6A:
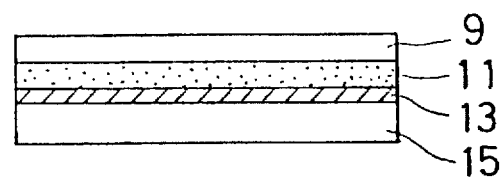
FIG. 6 is a cross-sectional view of the seventh electrostatic information recording medium of this invention.
Figure 6B:
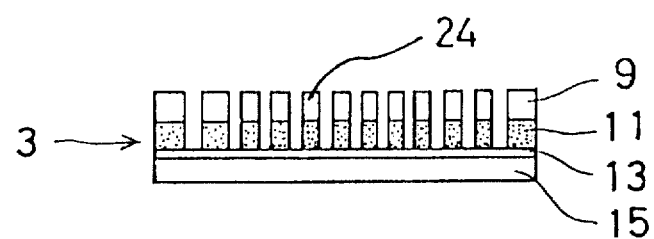
Figure 6C:
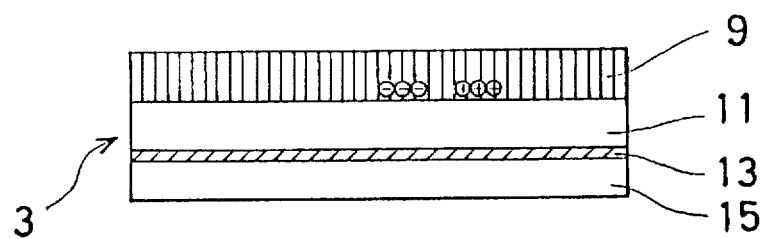
Figure 6D:
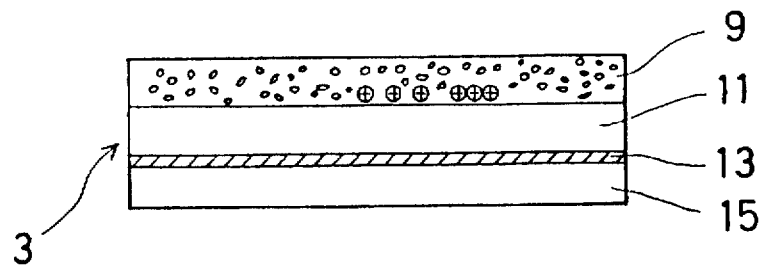

After removed out from the vapor depositor, a 5% solution of polyvinyl carbazole (PVK: Tubicol 210 available from Anan Koryo) in chloroform was spread on the amorphous granular layer of selenium by spinner coating (at 1000 rpm for 30 seconds), and was then dried at 60° C. for 1 hour to obtain a charge transport layer having a film thickness of 10 μm. In this manner, an electrostatic information recording medium as shown in FIG. 5 (a) was formed.

[EXAMPLE 65]

As a resinous layer, an epoxy resin (Aduldite available from Ciba Geigy) that was a thermosetting resin was spinner-coated on a similar substrate as used in Example 49. The epoxy resin was then cured at 120° C. for 1 hour to form a resinous layer having a film thickness of 15 μm, on which a substrate was deposited in a room temperature state at a similar degree of vacuum as applied in Example 49. As a result, amorphous selenium was formed on an insulating layer.

After removed out from the vapor depositor, a 5% solution of polyvinyl carbazole (PVK: Tubicol 210 available from Anan Koryo) in chloroform was spread on the amorphous granular layer of selenium by spinner coating (at 1000 rpm for 30 seconds), and was then dried at 60° C. for 1 hour to obtain a charge transport layer having a film thickness of 10 μm. In this manner, an electrostatic information recording medium according to the present invention was formed.

[EXAMPLE 66]

As a resinous layer, a modified acrylate resin (VDAL-383 available from Dainichi Seika) that was an ultraviolet curable resin was spinner-coated (at 1000 rpm for 20 seconds) on a similar substrate as used in Example 64, and was then irradiated with ultraviolet rays emitted from an ultraviolet lamp (a 365 nm peak lamp) at a dosage of 50 mJ/cm² to cure the resinous layer. Then, the vapor deposition of selenium was carried out under similar low vacuum conditions as applied in Example 64. As a result, the selenium layer was laminated on the acrylate resin layer having a thickness of 8 m in the form of a single granular layer having a mean granular size of 0.3 μm.

After removed out from the vapor depositor, a 5% solution of polyvinyl carbazole (PVK: Tubicol 210 available from Anan Koryo) in chloroform was spread on the amorphous granular layer of selenium by spinner coating (at 1000 rpm for 30 seconds), and was then dried at 60° C. for 1 hour to obtain a charge transport layer having a film thickness of 10 μm. In this manner, an electrostatic information recording medium according to the present invention was formed.

[EXAMPLE 67]

In lieu of the polyvinyl carbazole used in Example 64, a solution of 5 g of a hydrazone charge transport agent (CTC-191 available from Anan Koryo) and 5 g of polycarbonate (Upiron available from Nippon Gas Chemical) dissolved in 90 g of 1,2-dichloroethane was spread on the crystalline granular layer of selenium by spinner coating (at 1000 rpm for 10 seconds), and was then dried at 60° C. for 1 hours to obtain a charge transport layer of 10 µm in thickness.

[EXAMPLE 68]

While the material for vapor deposition was changed from selenium to gold, low-vacuum vapor deposition was carried out by crucible resistance heating under similar conditions as applied in Example 64. As a result, black gold microparticles having a mean particle size of 0.2 µm were formed on the silicone resin layer in a single layer state. Then, a 10 µm thick charge transport layer comprising a polyvinyl carbazole similar to that used in Example 64 was laminated on the gold layer to obtain an electrically conductive granular type of electrostatic information recording medium of the structure wherein charges were internally accumulated.

[EXAMPLE 69]

Aluminium was vapor-deposited on one side of a fluorine film (an FEP film available from Daikin Kogyo) to a thickness of 1000 Å to form a substrate. Under similar vapor deposition conditions as applied in Example 64, selenium particles were vapor-deposited on the surface of the film. As a result, a single layer of a uniform granular layer having a granular size of about 0.4 µm was formed. A 10 µm thick charge transport layer comprising a polyvinyl carbazole similar to that used in Example 64 was then coated with a blade coater having a gap width of 200 µm.

[EXAMPLE 70]

In the deposition of selenium in Example 64, the deposition time was increased from 60 seconds to 300 seconds. As a result, plural layers of crystalline selenium were formed on the silicone resin layer. This was confirmed under an optical microscope. In a similar manner, the polyvinyl carbazole was later laminated.

[EXAMPLE 71]

A 50% solution of a silicone resin (TSR-144 available from Toshiba Silicone and containing 1% of a curing agent CR-15) diluted with xylene was spinner-coated (at 1000 rpm for 20 seconds) on a 1 mm thick glass substrate vapor-deposited with 1000 Å thick aluminium, and was then dried at 150° C. for 1 hour to evaporate off the solvent and cure the resin. As a result, a silicone resin layer having a film thickness of 7 µm was formed.

Subsequently, 10 g of a rosin ester resin (Stayberite Ester 10) and 10 g of zinc oxide (having a mean particle size of 10 µm) were mixed with 80 g of n-butyl alcohol, and the mixture was introduced with 100 g of glass beads (3 mmφ) in a stainless-made cylindrical vessel of 300 ml in volume, followed by lidding. The mixture was then dispersed with a vibration type dispersing machine (Red Devil) for 2 hours. After removed out from within the vessel, the zinc oxide dispersed layer was coated on the silicone resin by spinner coating (at 500 rpm for 60 seconds), and was then dried at 60° C. for 3 hours. As a result, the film thickness of the dispersed layer was 3 µm. Then, a 10 µm thick charge transport layer similar to that used in Example 64 was laminated to obtain a medium as shown in FIG. 5 (b).

[EXAMPLE 72]

The zinc oxide/resin dispersed solution prepared in Example 71 was coated directly on an aluminium substrate with a whaler (at 200 rpm for 30 seconds), and was thereafter dried at 60° C. for 3 hours for the lamination of a zinc oxide-dispersed resin layer having a film thickness of 15 µm. Then, a 10 µm thick charge transport layer similar to that used in Example 64 was laminated on this resin layer to form a dispersed type of electrostatic information recording medium as illustrated in FIG. 5 (c).

[EXAMPLE 73]

The single layer organic photosensitive member (PVK—TNF) prepared in Example 16 was arranged with the electrostatic information recording medium prepared in Example 64 in such a manner that the charge transport layer's surface of the recording medium was grounded in opposition to the photoconductive layer's surface, using as the spacer a 10 µm thick polyester film. Then, a DC voltage of −700 V was applied between both electrodes with the photosensitive member negatively and the resinous layer positively.

While the voltage was impressed, exposure was carried out from the photosensitive member for 1 second, using as the light source a halogen lamp having a luminous intensity of 1000 luxes. After the completion of the exposure, the electrostatic information recording medium was removed out and exposed on its overall surface to light, whereby the formation of an electrostatic latent image was completed.

As a result, a surface potential of −100 V was measured on the exposed region of this recording medium by a surface electrometer, while a surface potential of 0 V was obtained on the unexposed region thereof.

When the surface potential of the electrostatic information recording medium was measured in a dark place prior to overall exposure, a surface potential of its exposed region was found to be −110 V. It was thus appreciated that charges were accumulated in the selenium particles by the overall exposure.

Then, similar exposure was performed while a resolution pattern film was brought in close contact with the glass substrate of the photosensitive meber. As illustrated in FIG. 53, the electrophotographic information recording medium was thereafter subjected to X-Y axis scanning with a 50×50 µm probe surface for measuring microarea potentials to process potential data of 50 µm units, which were then displayed on a CRT by potential-brightness conversion on an enlarged scale. As a result, resolution patterns of up to 100 µm were confirmed on the CRT. After the exposure, the electrostatic information recording medium was allowed to stand at room temperature of 25° C. and 35% R.H. for three months. Subsequent potential reading by scanning indicated that resolution pattern displays quite similar to those just after the exposure were obtained.

For alternative exposure, a subject was photographed with an ordinary camera at an impression voltage of −700 V, an exposure f=1.4 and a shutter speed of ⅟60 sec. outdoors in the daytime. After the exposure, the electrostatic information recording medium was subjected to X-Y axis scanning with a 50×50 µm probe surface for measuring microarea potentials to process potential data of 50 µm units, which were in turn displayed on a CRT by potential-brightness conversion on an enlarged scale. As a result, imaging having gradiation occurred.

Color images were photographed in the following manners.

(1) Prismatic three-plane splitting

As illustrated in FIG. 12, the R, G and B filters were disposed on three planes of a prism, and the same media as mentioned above were set thereon to photograph a subject at f=1.4 and a shutter speed of 1/30 sec.

(2) Color CRT displaying

The R, G and B latent images were read by scanning in a similar manner to form fluorescences corresponding thereto on a CRT, and the resulting images separated into three colors were compounded on the CRT to obtain a color image.

COMPARATIVE EXAMPLE (a)

A solution of 10 g of a rosin ester resin (Stayberite Ester 10) dissolved in 90 g of n-butyl alcohol was spinner-coated (at 1000 rpm for 20 seconds) on a 1 mm thick glass substrate vapor-deposited with 1000 Å thick aluminium, and was thereafter dried at 60° C. for 1 hour to evaporate off the solvent, thereby forming a resinous layer having a film thickness of 2 μm.

COMPARATIVE EXAMPLE (b)

A 50% solution of a silicone resin (TSR-144 available from Toshiba Silicone and containing 1% of a curing agent CR-15) diluted with xylene was spinner-coated on a 1 mm thick glass substrate vapor-deposited with 1000 Å thick aluminium, and was thereafter dried at 150° C. for 1 hour to evaporate off the solvent and cure the resin, thereby forming a silicone resin layer having a film thickness of 7 μm.

Table 2 shows the charge retainability of the electrostatic information recording media of Examples 64 to 72, as expressed in terms of the surface potentials measured with the lapse of time. The surface potentials of the media of Comparative Examples a and b, as measured with time, are also tabulated in Table 2.

TABLE 2

Estimation of Stability with Time of Internally Accumulated Charges

| Ex. Nos. | Initial pot. (V) (1*) | Initial pot. (V) (2*) | 1-day stor. (60° C., dry) | 7-day stor. (60° C., dry) | 30-day stor. (60° C., dry) |
|---|---|---|---|---|---|
| 49 | −120 | −100 | −95 | −70 | −35 |
| a | −105 | −105 | −40 | 0 | 0 |
| 50 | −150 | −135 | −120 | −65 | −30 |
| 51 | −130 | −120 | −100 | −60 | −25 |
| 52 | −165 | −140 | −135 | −110 | −90 |
| b | −155 | −155 | −130 | −50 | 0 |
| 53 | −95 | −95 | −90 | −75 | −50 |
| 54 | −160 | −150 | −150 | −140 | −115 |
| 55 | −200 | −180 | −140 | −80 | −30 |
| 56 | −100 | −90 | −80 | −40 | −10 |
| 57 | −150 | −120 | −110 | −80 | −45 |

(1*): Initial potentials of the exposed regions before overall exposure.
(2*): Initial potentials of the exposed regions after overall exposure.
Note that the photosensitive members used were all PVK - TNF of Example 12 with external application of a voltge of −700 V.

[EXAMPLE 74]

Seventh Electrophotographic Information Recording Medium

A mixed solution of 1 g of a polyester resin (Vylon 200) and 10 g of chloroform was coated on a 1 mm thick glass substrate by doctor blade coating, and was thereafter dried at 100° C. for 1 hour to form an insulating layer of 10 μm in thickness.

Further laminated thereon was amorphous selenium to a film thickness of 10 μm at a degree of vacuum of $10^{-5}$ Torr by vapor deposition, thereby preparing an electrophotographic information recording medium as shown in FIG. 6 (a).

[EXAMPLE 75]

An ITO transparent electrode is laminated on a 1 mm thick glass electrode support to a thickness of 1000 Å by sputtering to prepare an electrode member. This transparent electrode is spaced away from the electrostatic information recording medium prepared in Example 74 through a gap of 10 μm defined by a polyester film spacer in opposite relation to each other. A DC voltage of 700 V is applied between both electrodes with the ITO electrode positively. While the voltage is impressed, exposure is carried out from the transparent electrode for 1 second, using a halogen lamp having a luminous intensity of 1000 luxes. After the completion of the exposure, the voltage was shut off.

In order to release the photoconductive layer from the electrostatic information recording medium after the exposure, the recording medium was removed out in a dark place. Thereafter, the polyester film 80 coated thereon with the adhesive layer 90 was bonded to the photoconductive layer and then peeled therefrom, whereby the photoconductive layer 9 was released from the electrostatic information recording medium 3. Where the insulating layer after peeling-off was measured in terms of its surface potentials by a surface electrometer, a surface potential of 250 V was obtained on the exposed region and a surface potential of 50 V on the unexposed region.

Similar exposure was carried out, while a resolution pattern film was brought in close contact with the back side of the ITO electrode. Thereafter, the selenium layer was released in a similar manner. After peeling-off, the insulating layer was subjected thereon to X-Y axis scanning with a 50×50 μm probe surface for measuring microarea potentials to process potential data of 50 μm units, which were in turn displayed on a CRT by potential-brightness conversion on an enlarged scale. As a result, resolution patterns of up to 100 μm were confirmed on the CRT.

The electrostatic information recording medium after peeling-off was permitted to stand at room temperature of 25° C. and a humidity of 35% for three months. Subsequent potential reading by scanning indicated that resolution pattern displays quite similar to those just after the exposure were obtained.

[EXAMPLE 76]

A photoresist (under the trade name of OFPR-5000 available from Tokyo Oka) was coated on the electrostatic information recording medium prepared in Example 74 to a film thickness of 2 μm by spinner coating (at 3000 rpm for 15 seconds). While a chromium mask surface patterned at 3 μm pitches in the form of a ckeckerboard was brought in close contact with the photoresist surface, the obtained recording medium was subjected to pattern exposure at a dosage of 11.5 mW/cm² and 405 nm for 30 seconds. Thereafter, the exposed region was removed off by alkali development (with an NMD-3 developer) to form a positive type of resist pattern on the recording medium.

Then, the thus patterned recording medium was immersed for 5 minutes in 1000 cc of a 10 mole HCl solution mixed with 10 g of zinc powders to etch an amorphous-Se photosensitive layer in a portion not covered with the resist.

Thereafter, the electrostatic information recording medium was dipped in ethyl alcohol for 3 minutes to dissolve the remaining resist pattern. Thus, an electrophotographic information recording medium as shown in FIG. 6 (b) was obtained, in which the photoconductive layer were separated into picture element units.

[EXAMPLE 77]

With the electrostatic information recording medium of Example 76, an electrostatic latent image was formed by the resolution pattern exposure method used in Example 75.

In Example 75, the selenium layer was peeled off. In this case, however, the deterioration of the latent image was estimated with the selenium layer kept intact. As a result, it was understood that the resolving power of the latent image, similar to that achieved by peeling-off, was obtained by the micro-separation of the selenium layer.

[EXAMPLE 78]

By the same procedure as in the Example 74, polyester resin of 10 μm thick was coated on aluminum electrode on a glass substrate, on this substrate, photoconductive layer having electric anisotropy, consisting of CdS of about 3500 Å thick, was formed by r.f. magnetron sputtering method (Ar 30 cc/min.; $1 \times 10^{-2}$ Torr; 50 W) using CdS target, and the electrostatic information recording medium of FIG. 6 (c) was obtained.

When voltage was applied and exposure was performed by the same procedure as in the Example 75 on this electrostatic information recording medium, surface potential of 250 V was measured by surface potentiometer.

The voltage was applied and exposure was performed by the same procedure as in the Example 75 on this electrostatic information recording medium using resolution pattern film during exposure. The potential of the electrostatic information recording medium was read by potential scanning reading, as immediately as the information was recorded and after left at the room temperature of 25° C. and humidity of 30% for 1 month. The resolution pattern was not changed from the value immediately after the recording.

[EXAMPLE 79]

In Example 75, the recording medium was left in a dark place with the selenium layer kept intact, after pattern exposure. Three days later, its resolution was estimated at room temperature of 25° C. and 35% R.H. by potential reading by scanning. As a result, the initial resolution of 100 μm was already found to disappear. In other words, it was found from a uniform potential distribution that charges diffused throughout and along the film plane.

[EXAMPLE 80]

A mixed solution of 1 g of a polyester resin (Vylon 200) and 10 g of chloroform was coated on a 1 mm thick polyester film vapor-deposited with 1000 Å thick aluminium by doctor coating, and was then dried at 100° C. for 1 hour to form a 10 μm thick insulating layer.

A mixture composed of 10 g of ZnO powders, 0.1 g of bromophenol blue and 100 g of ethyl alcohol was then pulverized and kneaded together in a ball mill. The obtained product was thereafter introduced into a vessel, and the alcohol was evaporated off by drying to prepare ZnO powders having bromophenol blue adsorbed thereon. Subsequently, a mixture of 10 g of such ZnO powders having bromophenol blue adsorbed thereon, 10 g of polycarbonate (Pan-Light available from Teijin) and 20 g of ethyl cellosolve was dispersed with an ultrasonic stirrer to prepare a photosensitive liquid for coating. This liquid was coated on the above insulating layer with a blade coater (4 mm) and dried at 100° C. for 1 hour, whereby a photoconductive layer having a film thickness of 10 μm was laminated thereon to make a dispersed type of electrostatic information recording medium, as shown in FIG. 6 (d).

[EXAMPLE 81]

Electrostatic information recording medium in which electrostaticinformation was changed to positional information A solution of 10 g of a rosin ester resin (available under the trade name of Stayberite Ester 10) serving as a thermoplastic resin and 1 g of a hydrozone derivative (CTC-191 available from Anan Koryo) serving as an charge transport material, both dissolved in 50 g of tetrahydrofuran, was spinner-coated at 1000 rpm for 90 seconds on a glass substrate vapor-deposited with 1000 Å thick aluminium. The coated film was dried at 60° C. for 1 hour to evaporate off the solvent. As a result, a uniformly coated film having a film thickness of 2 μm was formed.

Amorphous selenium was laminated on this medium by vapor deposition under the following conditions.

The medium is first fixed to a substrate holder within a vacuum chamber, while the glass side comes in close contact therewith. The substrate holder is heatable (by means of a heater). During vapor deposition, the substrate medium is heated to 100° C. The vapor deposition of selenium was carried out at a degree of vacuum as low as 0.1 Torr by ordinary resistance heating. As a result, an electrophotographic information recording medium was obtained, in which selenium was formed to a depth of 0.1 μm in the rosin ester layer in the form of microparticles having a mean particle size of about 0.5 μm.

[EXAMPLE 82]

Ten (10) g of an AS resin (Stylac ASL-76 available from Asahi Kasei) were used in place of the rosin ester resin employed in Example 81 to obtain an electrostatic information recording medium in otherwise similar manners.

[EXAMPLE 83]

Ten (10) g of a terpenic resin (Picolastic A-75 available from Rika Hercules) were used in place of the rosin ester resin employed in Example 81 to obtain an electrostatic information recording medium in otherwise similar manners.

[EXAMPLE 84]

Seven (7) g of a terpenic resin (Picorite A-115 available from Rika Hercules) were used in place of the rosin ester resin employed in Example 81 to obtain an electrostatic information recording medium in otherwise similar manners.

[EXAMPLE 85]

Five (5) g of a terpenic resin (Picorite S-70 available from Rika Hercules) were used in place of the rosin ester resin employed in Example 81 to obtain an electrostatic information recording medium in otherwise similar manners.

[EXAMPLE 86]

In Example 81, low-vacuum vapor deposition was carried out using as the material to be vapor-deposited gold in place of selenium. As a result, an electrically conductive particle type of charge retaining medium was obtained, in which gold microparticles having a mean particle size of 0.2 μm was formed 0.1 μm below the surface of the Steberite resin in the form of a single layer.

[EXAMPLE 87]

The single layer organic photosensitive member (PVK—TNF) of Example 16 was positioned in opposition to the electrostatic information recording medium 3 prepared in Example 81 through a polyester film spacer having a film thickness of 10 μm. A DC voltage of −700 V was impressed between both electrodes with the photosensitive member negatively and the resinous layer positively.

While the voltage was applied, exposure was performed from the photosensitive member using as the light source a halogen lamp having a luminous intensity of 1000 luxes. As a result, a surface potential of −150 V was obtained on the exposed region.

After the completion of the exposure, the recording medium was removed out for overall exposure, whereby negative surface charges were transferred into the particles. Thereafter, the recording medium was heated to 80° C. by resistance heating, resulting in the charge accumulated particles passing into the resin.

After this electrostatic information recording medium was left for 7 days, positive charge of +450 V were imparted on the overall surface thereof by corona charging. Just after the overall exposure, its surface potential was read. As a result, the exposure pattern could be reproduced on a CRT.

The opposing electrode was placed face-to-face to the electrostatic information recording medium using polyester film of 10 μm thick as a spacer, and positive electric charge with voltage of 750 V were imparted on the overall surface of the electrostatic information recording medium instead of corona charging with the opposing electrode as positive and electrostatic information recording medium as negative. By the same procedure as in the corona charging, the exposure pattern could be reproduced on CRT.

Next, the same exposure was performed with the resolution pattern film closely fit on the photosensitive member glass substrate during exposure. Thereafter, the electrostatic information recording medium was subjected to X-Y axis scanning with a 50×50 μm probe surface for measuring microarea potentials to process potential data of 50 μm units, which were in turn displayed on a CRT by potential-brightness conversion on an enlarged scale. As a result, resolution patterns of up to 100 μm were confirmed on the CRT.

In electrophotographic image recording, the recording medium was subjected to pattern exposure with a resolution pattern film and heat-developed in a similar manner as mentioned above, after uniform electrification to −600 V. It was then found that a resolution pattern of 200 μm was only confirmed on a CRT during reproduction due to the occurrence of frost.

For alternative exposure, a subject was photographed with an ordinary camera at an impression voltage of −700 V, an exposure f=1.4 and a shutter speed of 1/60 sec. outdoors in the daytime. After the exposure, the recording medium was corona-electrified and exposed to light on its overall surface. This recording medium was subjected to X-Y axis scanning with a 50×50 μm probe surface for measuring microarea potentials to process potential data of 50 μm units, which were in turn displayed on a CRT by potential-brightness conversion on an enlarged scale. As a result, imaging having gradiation was found to occur.

Color images were photographed in the following manners.

(1) Prismatic three-plane splitting

As illustrated in FIG. 12, the R, G and B filters were disposed on three planes of a prism and the same media as mentioned above were set thereon to photograph a subject at f=1.4 and a shutter speed of 1/30 sec.

(2) Color CRT displaying

The R, G and B latent images were read by scanning in a similar manner to form on a CRT fluorescences corresponding thereto, and an image separated into three colors was compounded on the CRT to obtain a color image.

[EXAMPLE 88]

Protective Film-Laminated Electrostatic Information Recording Medium

The single layer organic photosensitive member (PVK—TNF) prepared in Example 16 is superposed on the electrostatic information recording medium prepared in Example 14 (a) in opposite relation through a polyester film spacer having a film thickness of 10 μm. A DC voltage of −700 V is applied between both electrodes with the photosensitive member negatively and the charge retaining layer positively. While the voltage was impressed, exposure was carried out from the photosensitive member for 1 second, using as the light source a halogen lamp having a luminous intensity of 1000 luxes. After the exposure, the voltage was cut off.

Ten (10) mg of dimethyl silicone oil (having a viscosity of 10000 cps and available from Toshiba Silicone) were added dropwise onto the surface of the charge retaining layer in which an electrostatic image was recorded. Further laminated on the charge retaining layer was a 20 μm thick polyester film to bring them in close contact with each other, thereby forming a protective film.

Charge retainability

After the above electrostatic image had been recorded, a surface potential of −180 V, as measured with a surface electrometer, was obtined on the charge retaining layer with no protective film laminated thereon. On the other hand, the unexposed region was found to have a surface potential of −40 V. As a result of further measurement of surface potentials from above the protective film, there was again obtained a surface potential of −180 V similar to that measured on the exposed region with no protective film laminated thereon.

[EXAMPLE 89]

In place of the silicone oil used in Example 88, silicone rubber (TSE 326 available from Toshiba Silicone) was coated on a 20 μm thick polyester film with a doctor blade, and was then dried at 100° C. for 1 hour to form a 2 μm thick film. This protective film was laminated on the surface of the charge retaining layer in which the electrostatic image was recorded by the same way as Example 88. From the measurement of the surface potential of that layer, it was found to have similar charge retainability as obtained with the silicone oil.

[EXAMPLE 90]

A 1 mm thick glass support was vapor-deposited with aluminium to a thickness of 1000 Å, on which polyp-xylene was then vapor-deposited as a charge retaining layer, thereby obtaining an electrophotographic information recording medium.

A solution of a fluorine-containing resin (available from Asahi Glass) dissolved in a fluorine base solvent was spinner-coated on the surface of the charge retaining layer to which a surface potential of −100 V was imparted, thereby forming a 3 μm thick protective layer. The measurement of surface potentials from above this protective film indicated that a surface potential of −100 V similar to that measured with no protective film laminated was obtained.

[EXAMPLE 91]

With a roll coater, a 30% solution of Stayberite Ester 10 (available from Rika Hercules) dissolved in monochlorobenzene was spread to a dry thickness of 7 μm on the surface of a 6 μm thick polyester film (available from Toray) one side of which had been release-treated with a silicone base release agent, thereby preparing a film for hot-melt transfer.

The electrostatic information recording medium prepared in Example 14 (a) was electrified to a surface potential of −100 V, and the above film for hot-melt transfer was then transferred thereon as a protective film with a heat sealer by a heat roll heated to 60° C.

Surface potential was measured from above this protective film. As a result, it was confirmed that a surface potential of −100 V similar to that measured with no protective film laminated was obtained and, hence, the protective film could be formed by hot-melt transfer.

[EXAMPLE 92]

Figure 67:
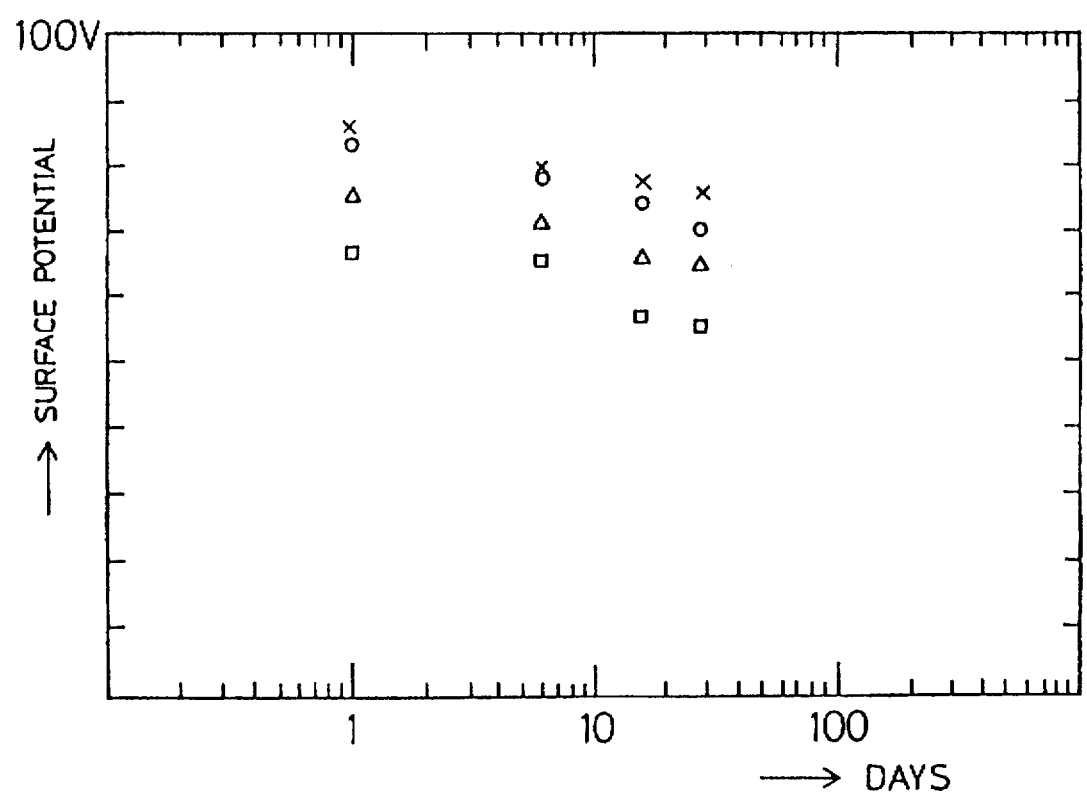
FIG. 67 is a drawing to show electric charge carrying property of the electrostatic information recording medium with the protective film prepared by Example 74.

FIG. 67 is a view showing changes-with-time of the charge retainability of the electrostatic information recording medium of Example 90. In FIG. 67, ○ and □ each refer to the charge retainability of the recording medium with no protective film laminated thereon; x and △ each stand for the charge retainability of the recording medium having the protective film laminated thereon; ○ and x each denote the results of measurement of the recording medium allowed to stand at room temperature and 50% humidity; and □ and △ each represent the results of measurement of the recording medium permitted to stand at a temperature of 40° C. and a humidity of 95%.

As can been seen from this figure, remarkable improvements are introduced in charge retainability by the provision of the protective film. Referring to the results of measurement with the electrostatic information recording media allowed to stand at room temperatrue and 50% humidity, the surface potential of the recording medium (shown at x) with the protective film layer laminated thereon suffered from no or little attenuation as compared with that of the recording medium (shown at o) with no protective film layer laminated thereon, even after the lapse of one month. Referring then to the results of measurement with the electrostatic information recording media permitted to stand at a temperature of 40° C. and a humidity of 95%, the surface potential of the recording medium (shown at □) with no protective film layer laminated thereon showed a 45% attenuation, but that of the recording medium (shown at △) having the protective film layer laminated thereon underwent a barely about 35% attenuation, after the lapse of one month.

It is to be understood that when the medium having no protective film laminated thereon was immersed in water, the charge was completely lost, while whereas the protective film-laminated medium was immersed in water, the potential could not be read from above the protective film as a consequence of water immersion; however, the original potential was observed with no change in resolution, when the protective film was released from the medium to measure its surface potential.

[EXAMPLE 93]

Electrostatic information recording medium in which audio information was recorded.

The amorphous silicon (a-Si) photosensitive member of Example 17, the electrostatic information recording medium of Example 14 (a) and a glass substrate, put one upon another, was incorporated in a camera with the electrodes outside. In this case, a void is provided between the photosensitive member and the recording medium by disposing a 10 μm polyester film spacer around its region except for the region to be exposed to light.

A voltage of 700 V was then applied with the photosensitive member's electrode negatively and the recording medium positively. In that state, an optical shutter was released at an exposure f=1.4 and a shutter speed of 1/60 sec., or a voltage was impressed for 1/60 sec. at an exposure f=1.4 with the shutter kept open, to photograph a subject outdoors in the daytime.

The camera has a microphone, an amplifier and an acoustic-optical modulator built-in to convert a sound into electrical signals when the subject is photographed. In addition, the camera has a semiconductor laser (780 nm: 1 mw) built-in so as to record audio signals in the recording medium in the form of electrostatic charge potential. The intensity of laser beams is then subjected to analog recording corresponding to the audio signals in combination with the above modulator. The laser beams are scanned by a polygonal mirror on time basis and recorded in some area of the recording medium in the form of potential signals.

For five seconds before and after the shutter was released, the audio information was actually converted to optical signals to record them in the recording medium in the form of potential information. As a result, the audio information during photographing was recorded between 0 V and −70 V in an analog manner separately from image information.

After the exposure and the application of voltage were both put off, the electrostatic information recording medium was removed out in a dark or bright place for imaging (1) on a CRT by microarea potential reading and (2) by toner development.

In (1), the recording medium was subjected to X-Y axis scanning with a 50×50 μm probe for measuring microarea potentials to process potential data of 50 μm units, which were then imaged on a CRT by potential-brightness conversion. Formed on the recording medium were analog potential latent images from a high 200 V potential of the exposed region to a low 0 V potential of the unexposed region, which could be developed on the CRT with a resolution of 100 μm.

In (2), the removed recording medium was immersed in a negatively charged wet toner (black) for 10 seconds, whereby a positive image was obtained. The resolution of the obtained toner image was as high as 1 μm.

Color images were photographed in the following manners.

(1) Prismatic three-plane splitting

As shown in FIG. 12, the R, G and B filters were disposed on three planes of a prism, and the above media were set thereon to photograph a subject at f=1.4 and an shutter speed of 1/30 sec.

(2) Color CRT displaying

The R, G and B latent images were read by scanning in a similar manner to form on a CRT fluorescences corresponding thereto, and images separated into three colors were compounded on the CRT into a color image.

(3) Toner development

The R, G and B latent images on the recording medium subjected to color separation and exposure were developed with negatively charged C (cyan), M (magenta) and Y (yellow) toners into toner images. Before the toner was dried out, paper was placed on the medium on which the cyan toner image was formed, and was then positively corona-charged. Subsequent release of the paper resulted in the transfer of the toner image thereon. While the images were in alignment, the magenta and yellow toners were successively transferred to the same place for compounding. As a result, a color image was formed on the paper.

[EXAMPLE 94]

Preparation of ROM Type of Electrostatic Charge Recording Card

As shown in FIG. 61, a 0.8 mm thick vinyl chloride sheet (85×55 mm) was used as the card substrate 4, and a rectangular recess for receiving the electrostatic charge recording member 3 is formed in the upper side of the card substrate. Then, a bonding agent is applied on a support surface of the recording member 3 in which information is recorded, and the member 3 is embedded in the recess with the charge retaining layer exposed to view, followed by pressing for integration. Finally, the polyester film 20 was provided on the card substrate to prepare an electrostatic charge recording card.

[EXAMPLE 95]

Preparation of DRAW Type of Electrostatic Charge Recording Card

As illustrated in FIG. 62, a vinyl chloride sheet (85×55 mm) was used as the card substrate 4, and a recess for receiving the electrostatic charge recording member 3 is formed in the upper side thereof. That recess is provided through its bottom with a hole leading to the back side of the substrate. On the other hand, the electrode 13 is provided on its back side with an exposed electrode portio 6 and an electrode by integral molding, followed by the lamination of the insulating layer 11. Thereafter, the electrostatic charge recording medium was placed and pressed in the recess in the card substrate 4 with the electrode portion 6 being exposed on the through-hole, thereby making the recording medium integral with the card substrate. A silicone rubber film was sticked to the surface of the recording medium (although not illustrated).

How to record information in this DRAW type of electrostatic charge recording medium is illustrated in FIG. 63. After the protective film was first released off, a voltage of 700 V was applied between both electrodes 7 and 13, as illustrated in FIG. 63 (a), while exposure was carried out for 1 second using a halogen lamp of 1000 luxes to record the information on the surface of the insulating layer. Thereafter, the protective film was again sticked in place. As a result of the measurement of surface potentials from above this film, it was found that the image information bearing charges were satisfactorily retained and did not attenuated at all after the lapse of three months.

What we claim is:

1. An electrostatic information recording medium comprising;
   (a) an electrode layer having a specific resistance of $10^{-6}$ $\Omega$·cm or less;
   (b) an electric charge retaining layer laminated to the electrode layer, said layer being fabricated of a macromolecular material having a glass transition temperature higher than that of the environmental temperature, a water absorption ratio of 0.4 wt % or less and a specific resistance of $10^{-12}$ $\Omega$·cm or more.

2. An electrostatic information recording medium as set forth in claim 1, wherein macromolecular material is a resin containing fluorine.

3. An electrostatic information recording medium as set forth in claim 1, wherein macromolecular material is polyester resin.

4. An electrostatic information recording medium as set forth in claim 1, wherein macromolecular material is polyparaxylylene.

5. An electrostatic information recording medium as set forth in claim 1, wherein macromolecular material is polyethylene naphthalate.

6. An electrostatic information recording medium as set forth in claim 1, wherein macromolecular material is methylphenyl silicone resin.

7. An electrostatic information recording medium as set forth in claim 1, wherein macromolecular material is polyimide resin.

8. An electrostatic information recording medium as set forth in claim 1, wherein the electric charge retaining layer consists of mono-layer film or built-up layers film with insulating property.

9. An electrostatic information recording medium as set forth in claim 1, wherein the electric charge retaining layer is optical electret.

10. An electrostatic information recording medium as set forth in claim 1, wherein the electric charge retaining layer is thermal electret.

11. An electrostatic information recording medium as set forth in claim 1, wherein the electric charge retaining layer consists of an electric charge retaining reinforced layer combined with the insulating layer with film thickness not to admit the injection of electric charge.

12. An electrostatic information recording medium as set forth in claim 11, wherein an electric charge retainability reinforced layer is formed on an electrode and an insulating layer with film thickness not to admit the injection of electric charge is formed.

13. An electrostatic information recording medium as set forth in claim 11, wherein an insulating layer with film thickness not to admit the injection of electric charge is formed on an electrode and an electric charge retainability reinforced layer is formed.

14. An electrostatic information recording medium as set forth in claim 11, wherein the electric charge retainability reinforced layer consists of inorganic insulating film, organic macromolecular insulating film, monolayer film or built-up layers film and the film thickness thereof is within the range of 10–1000 Å.

15. An electrostatic information recording medium as set forth in claim 11, wherein the film thickness not to admit the injection of electric charge is 100 Å or more.

16. An electrostatic information recording medium as set forth in claim 1, wherein the electric charge retaining layer consists of an insulating resin layer containing the photoconductive or electrically conductive particles and is capable to accumulate the electric chare in said particles.

17. An electrostatic information recording medium as set forth in claim 16, wherein the photoconductive or electrically conductive particles are present in single layer or multiple layers in the vicinity of the interior surface of the insulating resin layer.

18. An electrostatic information recording medium as set forth in claim 16, wherein the photoconductive or electrically conductive particles are dispersed in the insulating resin layer and are laminated on the insulating resin layer, which is piled up on the electrode.

19. An electrostatic information recording medium as set forth in claim 16, wherein the photoconductive or electrically conductive particles are dispersed in the insulating resin layer and are laminated on the electrode.

20. An electrostatic information recording medium as set forth in claim 1, wherein the electric charge retaining layer consists of photoconductive or electrically conductive particles laminated in single layer or in multiple layers on the insulating layer, the electric charge transport layers are sequentially laminated on said particle layer which primarily transport one polarity part of the electric charge and are laminated on the electrode from the said of insulating layer.

21. An electrostatic information recording medium as set forth in claim 1, wherein the electric charge retaining layer consists of photoconductive layer detachably laminated on the insulating layer and it is laminated on the electrode from the side of insulating layer.

22. An electrostatic information recording medium as set forth in claim 1, wherein the electric charge retaining layer is such that insulating layer and photoconductive layer are sequentially laminated, said photoconductive layer is made of the substance having orientation in thickness direction and is laminated on electrode from insulating layer side.

23. An electrostatic information recording medium as set forth in claim 1, wherein the electric charge retaining layer is such that insulating layer and photoconductive layer are sequentially laminated, and said photoconductive layer is made of the substance of photoconductive particle dispersion type and is laminated on electrode from the insulating layer side.

24. An electrostatic information recording medium as set forth in claim 1, wherein electrode is supported by support member, and electric charge retaining layer is laminated on electrode.

25. An electrostatic information recording medium as set forth in claim 24, wherein support member is made of flexible base material.

26. An electrostatic information recording medium as set forth in claim 24, wherein support member, electrode, and electric charge retaining layer are transparent.

27. An electrostatic information recording medium as set forth in claim 1, wherein the protective film is laminated on the electric charge retaining layer to increase the electric charge retaining property.

28. An electrostatic information recording medium as set forth in claim 27, wherein the protective film is the insulating plastic film.

29. An electrostatic information recording medium as set forth in claim 27, wherein the protective film is formed by coating the insulating plastic solution.

30. An electrostatic information recording medium as set forth in claim 27, wherein the protective film is formed by the melting transfer of the insulating melting plastics.

31. An electrostatic information recording medium as set forth in claim 1, wherein a part of the information recording region is the audio information recording region and audio information is recorded.

32. An electrostatic information recording medium with audio information recorded as set fort in claim 31, wherein the audio information recording region is at the periphery of the electrostatic information recording medium.

33. An electrostatic information recording medium as set forth in claim 1, wherein the electric charge retaining layer is laminated on the electrode and the electrode is laminated on the card base material.

34. An electrostatic information recording medium as set forth in claim 33, wherein the surface of the electric charge retaining layer is exposed and embedded in the card base material or the electric charge retaining layer is attached and laminated on the card base material.

35. An electrostatic information recording medium as set forth in claim 33, wherein the electric charge retaining layer is laminated with or without the recorded information.

36. An electrostatic information recording medium as set forth in claim 33, wherein the recording form of the information is either the electric charge or the toner by toner development.

37. An electrostatic information recording medium as set forth in claim 33, wherein the electrode is partially exposed and laminated at appropriate point of the card base material.

* * * * *